United States Patent
Rabani

(10) Patent No.: US 10,106,401 B1
(45) Date of Patent: Oct. 23, 2018

(54) CONVERGENT NANOFABRICATION AND NANOASSEMBLY METHODS, MEANS AND APPLICATIONS THEREOF, PRODUCTS AND SYSTEMS THEREFROM INCLUDING METHODS AND MEANS FOR CONVERSION OF POLLUTANTS TO USEFUL PRODUCTS

(76) Inventor: Eli Michael Rabani, Woodland Hills, CA (US)

(*) Notice: Subject to any disclaimer, the term of this patent is extended or adjusted under 35 U.S.C. 154(b) by 740 days.

(21) Appl. No.: 12/807,708

(22) Filed: Sep. 10, 2010

Related U.S. Application Data

(60) Provisional application No. 61/276,220, filed on Sep. 9, 2009.

(51) Int. Cl.
| | |
|---|---|
| *B82B 3/00* | (2006.01) |
| *B82Y 30/00* | (2011.01) |
| *B82Y 40/00* | (2011.01) |
| *H01H 1/00* | (2006.01) |

(52) U.S. Cl.
CPC .............. *B82B 3/00* (2013.01); *B82Y 30/00* (2013.01); *B82Y 40/00* (2013.01); *H01H 1/0094* (2013.01)

(58) Field of Classification Search
CPC ........ B82B 3/00; H01H 1/0094; B82Y 30/00; B82Y 40/00; B01J 19/004; B01J 2219/00049; Y02P 20/151; Y02P 20/152
USPC ............................. 700/95; 290/55; 136/256
See application file for complete search history.

(56) References Cited

U.S. PATENT DOCUMENTS

| | | |
|---|---|---|
| 5,659,477 A | 8/1997 | Collins |
| 5,764,518 A | 6/1998 | Collins |
| 7,687,146 B1 * | 3/2010 | Freitas, Jr. ............. C01B 32/25 423/447.1 |

(Continued)

OTHER PUBLICATIONS

U.S. Appl. No. 12/070,489, filed Feb. 18, 2008, Rabani, E. M.

(Continued)

*Primary Examiner* — Jafar Parsa
*Assistant Examiner* — Amy C Bonaparte

(57) ABSTRACT

Convergent nanofabrication and nanoassembly methods are disclosed. Molecules and/or nanostructures are bound to supported binding tools and manipulated to bond together in desired locations and orientations to yield desired precise structures. Methods for precise fabrication of materials including diamond, graphene, nanotube, β-SiC (and precise modifications thereof, e.g. color centers for quantum computation and information processing and storage), halite structured materials including MgO, MgS, TiC, VN, ScN, precisely Mn doped ScN, NbN, HfC, TaC, $Hf_xTa_yC$, and metals, and graphenoid structures for photovoltaic devices are disclosed. Systems disclosed performing these methods can fabricate systems with similar capabilities, enabling allo- or self-replication, and have capabilities including: conversion and storage of energy; obtainment and processing of matter from abundant environmental sources including on other planets and fabrication of desired articles using same; converting wind power (esp. high altitude wind) to electricity with concurrent capture of $CO_2$ and conversion thereof to useful feedstocks e.g. by reaction with $CH_4$ from oceanic methane clathrates; growth of algae crops including food. Fabrication of arbitrarily long carbon nanotubes enable construction of orbital elevators.

27 Claims, 58 Drawing Sheets

(56) References Cited

U.S. PATENT DOCUMENTS

| | | | | |
|---|---|---|---|---|
| 8,171,568 | B2* | 5/2012 | Freitas | C07C 2/00 850/61 |
| 8,276,211 | B1* | 9/2012 | Freitas, Jr. | C07C 2/00 850/61 |
| 9,221,685 | B2* | 12/2015 | Noyes | C01B 31/02 |
| 9,244,097 | B1* | 1/2016 | Freitas, Jr. | G01Q 70/18 |
| 2009/0056802 | A1* | 3/2009 | Rabani | 136/256 |

OTHER PUBLICATIONS

Moses, Matt, "A Physical Prototype of a Self-Replicating Universal Constructor," Master's Thesis, Department of Mechanical Engineering; University of New Mexico, 2001. Originally at: http://www.home.earthlink.net/~mmoses152/SelfRep.doc Presently at: https://web.archive.org/web/20060523020602/http://home.earthlink.net/~mmoses152/SelfRep.doc.

Allis, D. G.; Drexler, K. E.; Mar. 2005. "Design and Analysis of a Molecular Tool for Carbon Transfer in Mechanosynthesis," Journal of Computional and Theoretical Nanoscience, vol. 2 (Mar. 2005), pp. 45-55. American Scientific Publishers, Valencia, CA.

Peng. J.; Freitas, R. A., Jr.; Merkle, R. C.; Von Ehr, J. R.; Randall, J. N.; Skidmore G. D.; "Theoretical Analysis of Diamond Mechanosynthesis. Part III. Positional C2 Deposition on Diamond C(110) Surface using Si/Ge/Sn-based Dimer Placement Tools," Journal of Cornputional and Theoretical Nanoscience, vol. 3(Feb. 2006), pp. 28-41. American Scientific Publishers, Valencia, CA.

Lackner, K. S.; Wendt, C .H.; 1995. "Exponential growth of large self-reproducing machine systems," Mathematical and Computer Modelling, vol. 21, Issue 10, May 1995, pp. 55-81. Pergamon, Great Britain.

Pre-vision 2.0 systems at http://www.reprap.com.

\* cited by examiner

FIG. 1A.i.
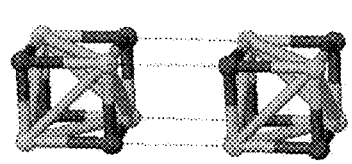
0fs
FIG. 1A.ii.
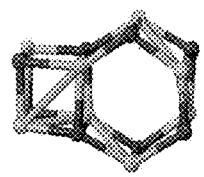
2500fs
FIG. 1A.iii.
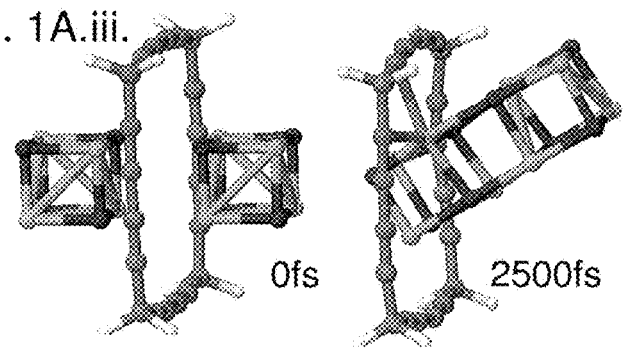
0fs          2500fs
FIG. 1A.iv.
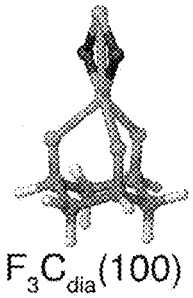
$F_3C_{dia}(100)$
FIG. 1A.v.
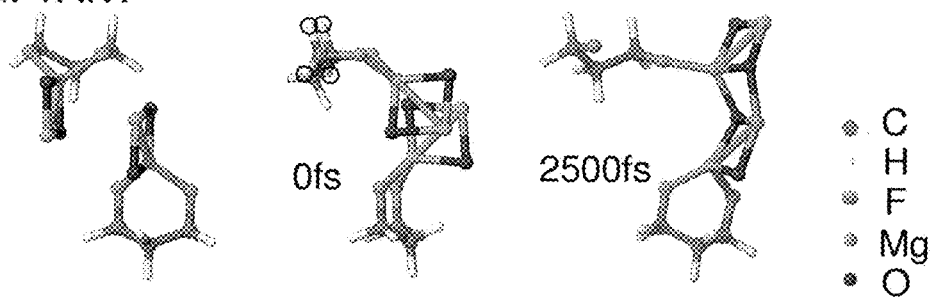
0fs                    2500fs
• C
• H
• F
• Mg
• O
FIG. 1A.vi.
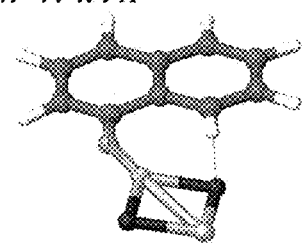
FIG. 1A.vii.
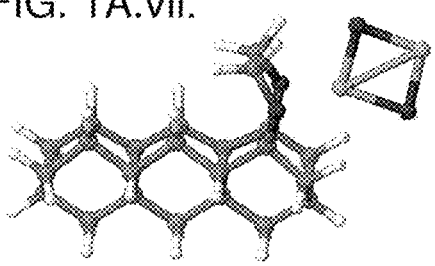
$Mg_2O_2:\{HC(O)CHO+[C_{dia}(100)2\times1\text{-}2H]+H_2\}$ FIG. 1A.viii.
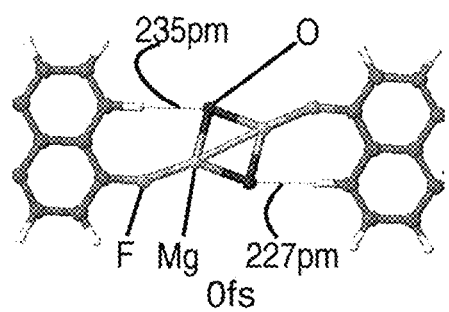
FIG. 1A.ix.
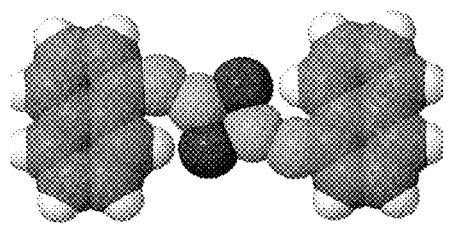
FIG. 1A.xi.
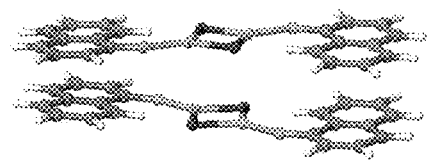
FIG. 1A.xiii.
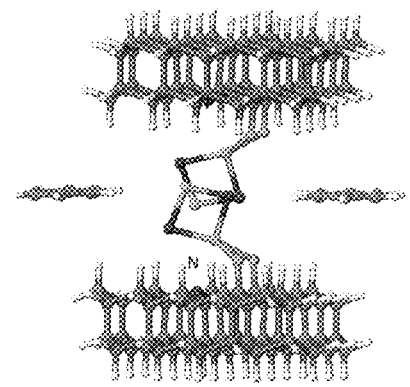
FIG. 1A.x.
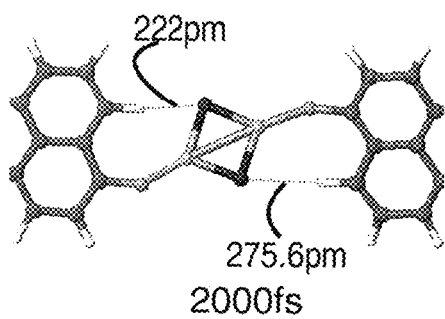
FIG. 1A.x.
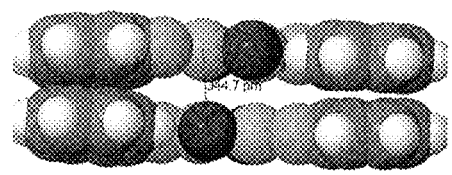
FIG. 1A.xii.
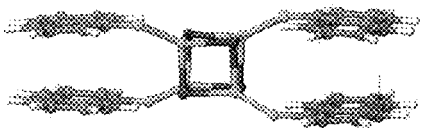
FIG. 1A.xiv.
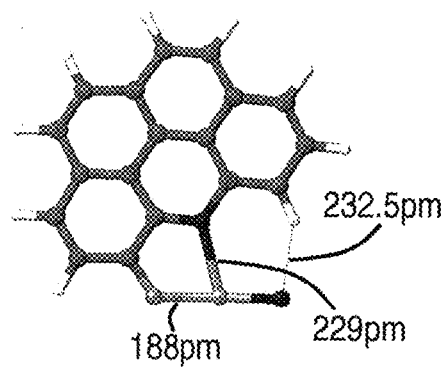

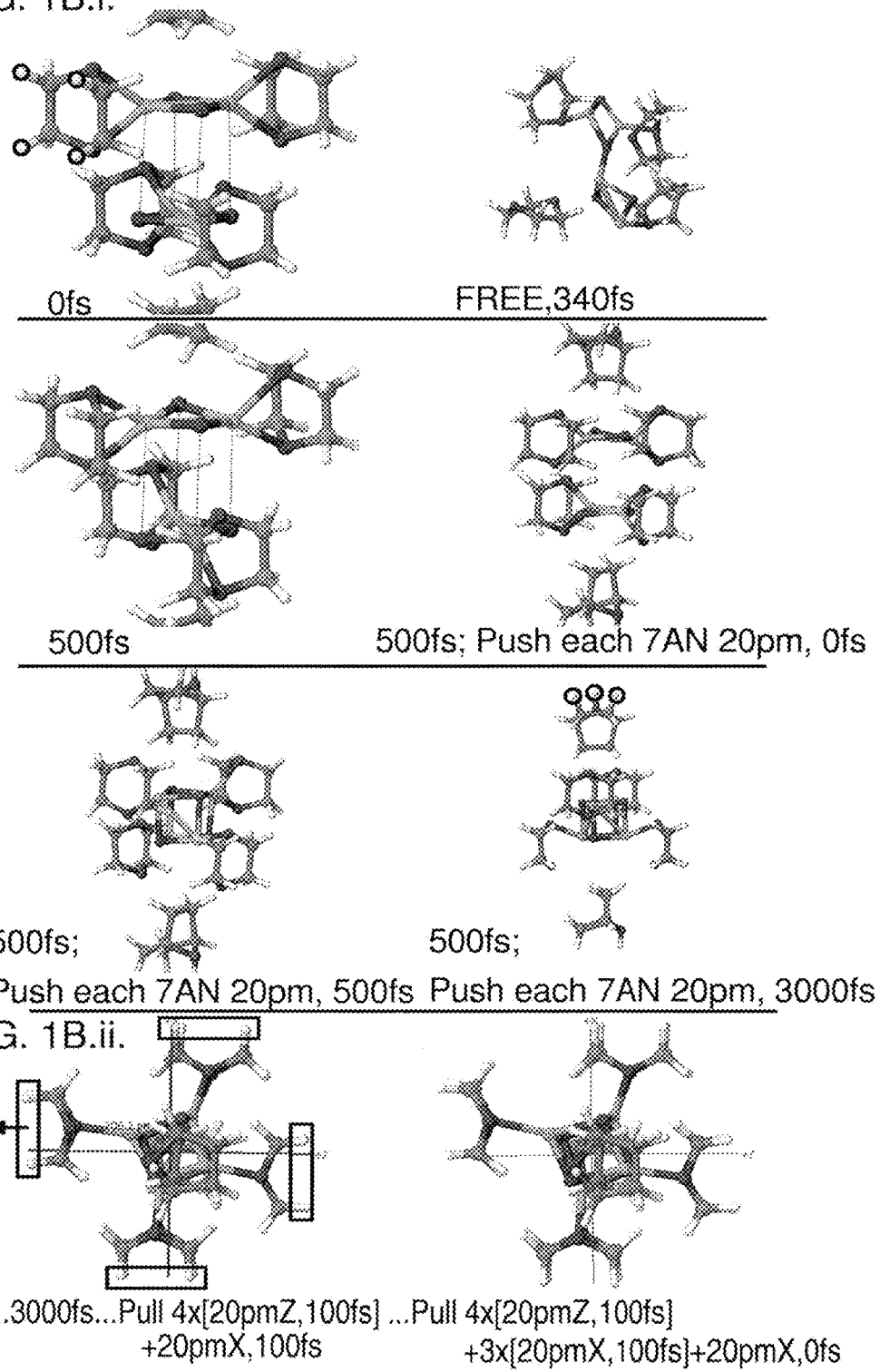

FIG. 1B.iii.
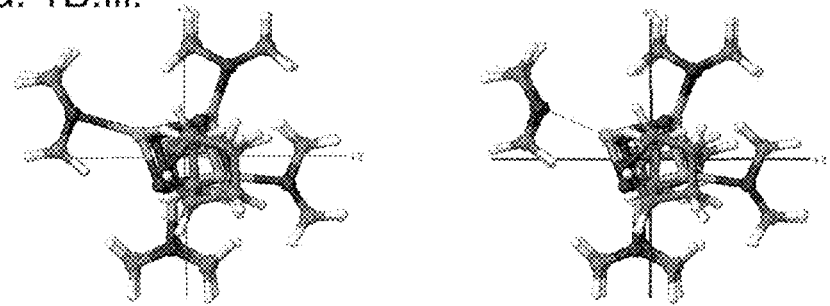
Pull 4x[20pmZ]+4x[20pmX,100fs]   Pull 4x[20pmZ]+5x[20pmX,100fs]
FIG. 1C
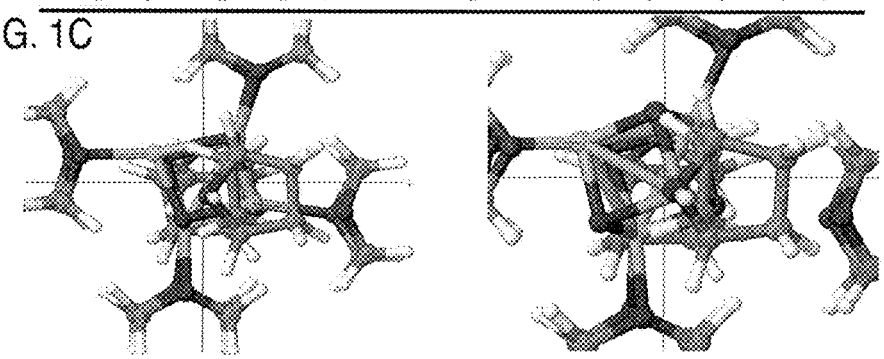
Pull 4x[20pmZ,100fs]+20pmZ,0fs   ...Pull 4x[20pmZ]+20pmZ,100fs
FIG. 1D
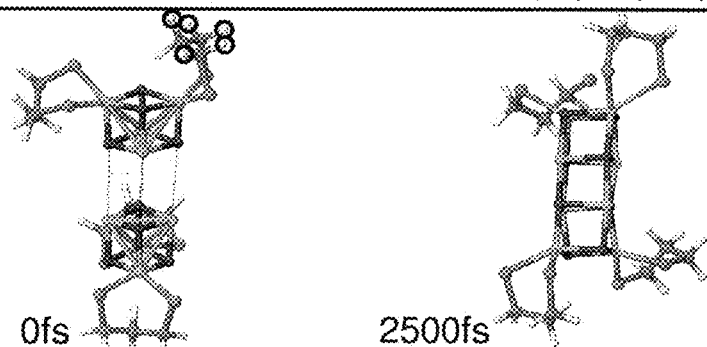
0fs                    2500fs
FIG. 1E
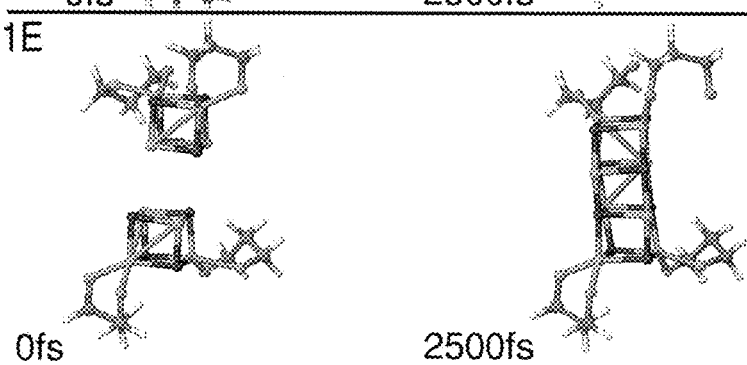
0fs                    2500fs FIG. 1F.i. 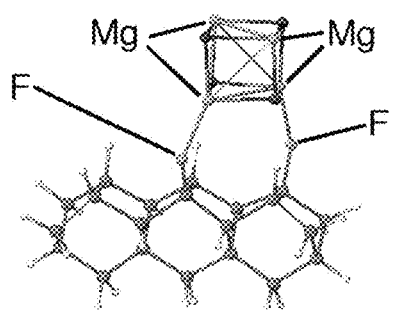
FIG. 1F.ii. 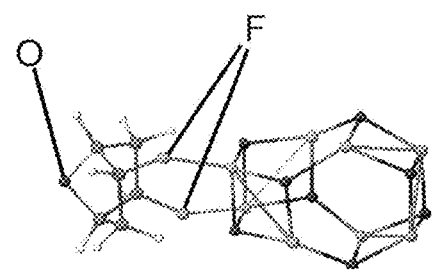
FIG.1G.i. 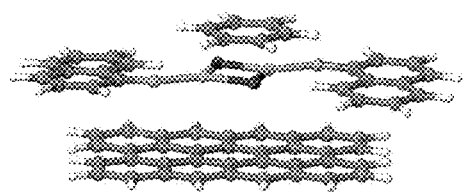 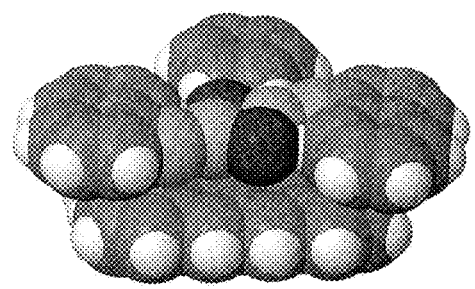
FIG.1G.ii. 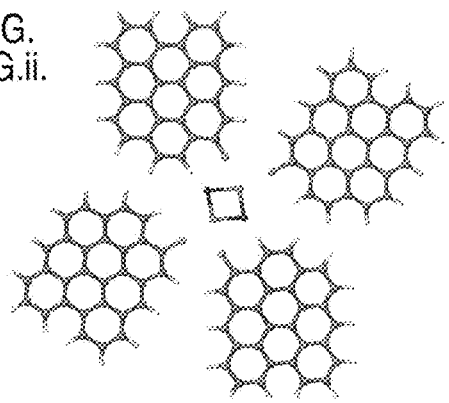 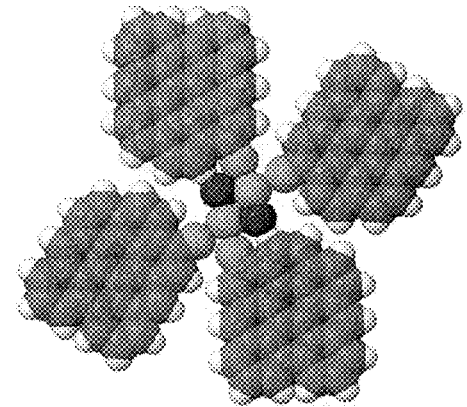
FIG.1G.iii. 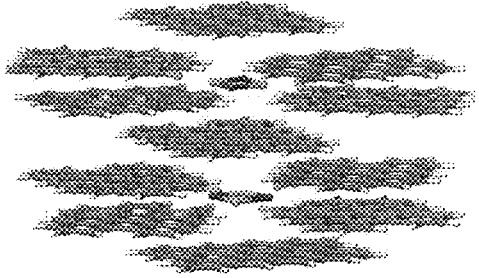 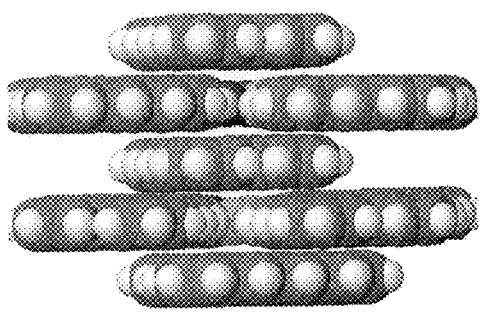

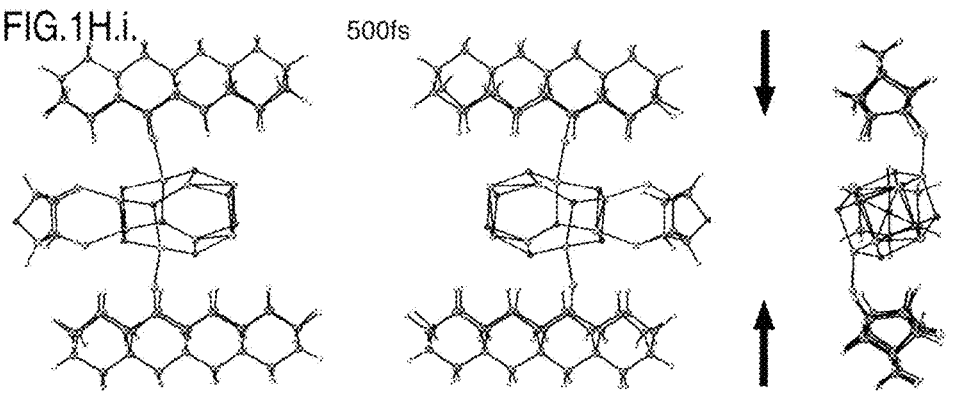
FIG.1H.i.    500fs
1500fs
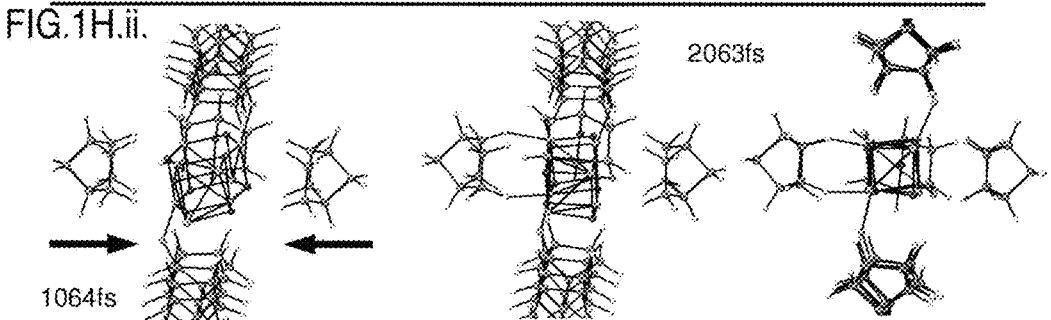
FIG.1H.ii.    2063fs
1064fs
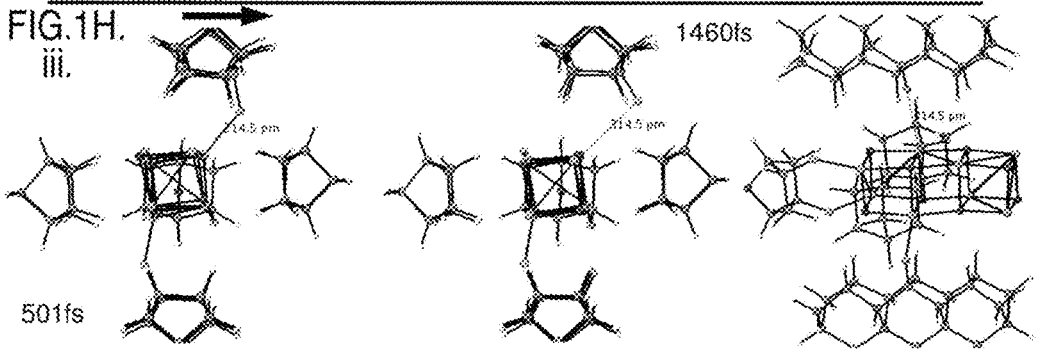
FIG.1H.iii.    1460fs
501fs

- C
- H
- F
- Mg
- O

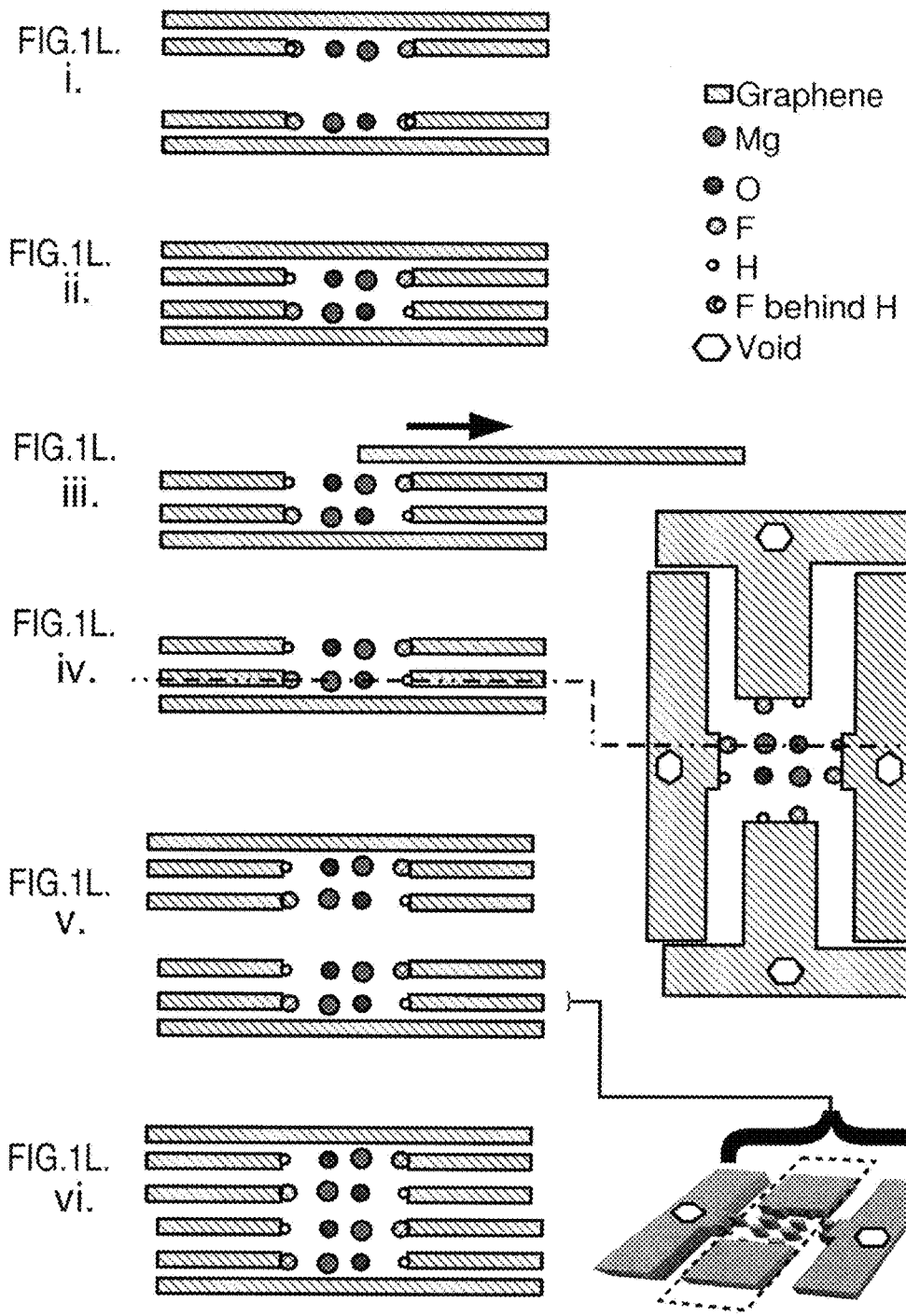

i.

ii.

iii.

iv.

v.

iii.b iv.b

FIG.1N. i.
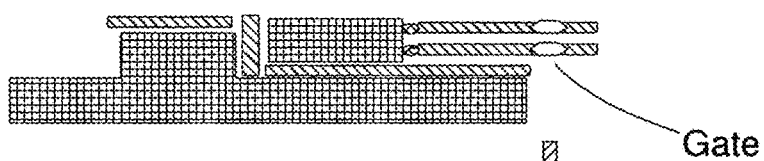
Gate
FIG.1N. ii.
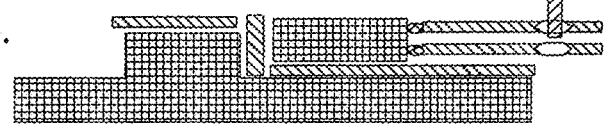
Graphene/Graphenoid
MgO
Void
FIG.1N. iii.
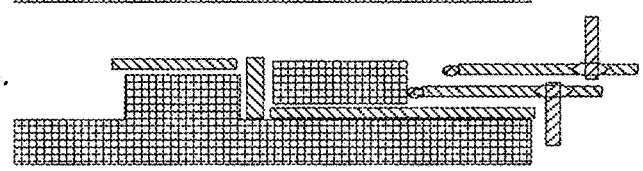
FIG.1N. iv.
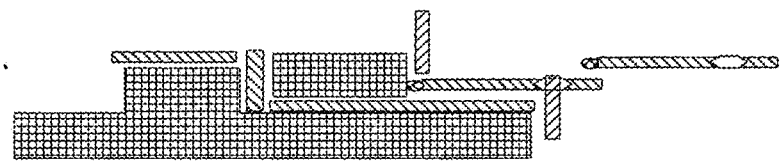
FIG.1N. v.
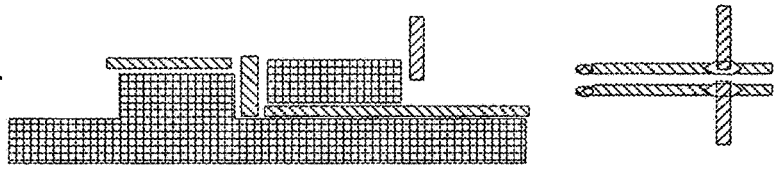
FIG.1N. vi.
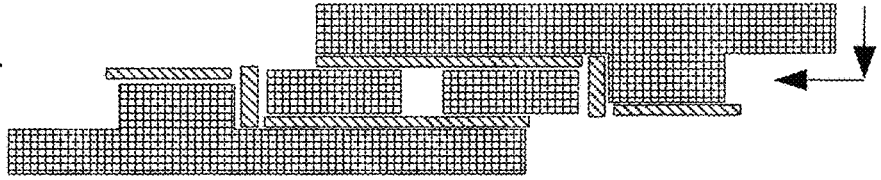
FIG.1N. vii.
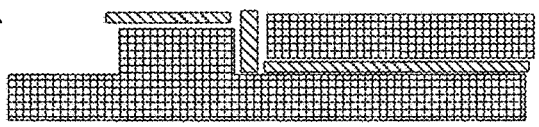

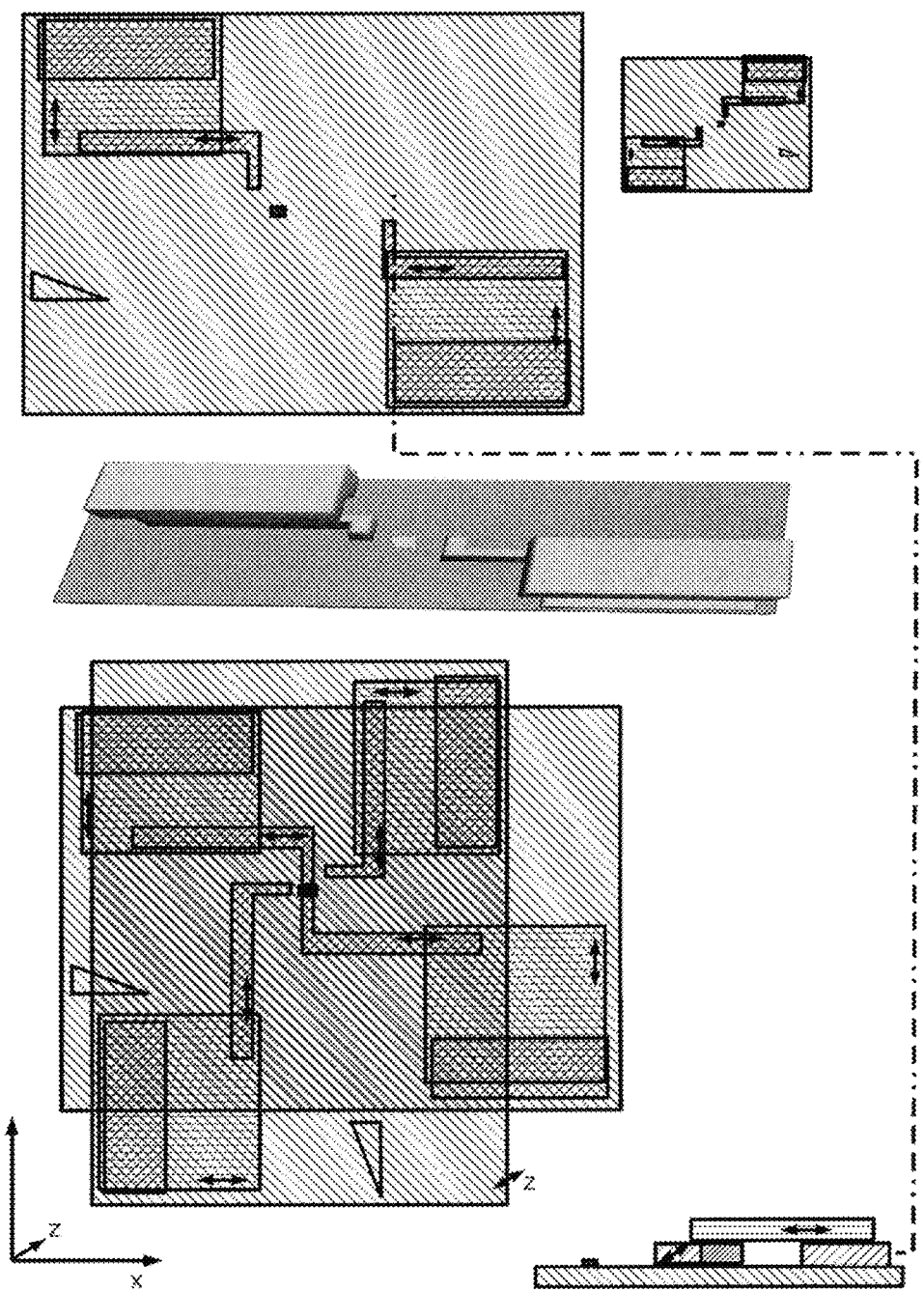
FIG.1.o

FIG.1P.i.
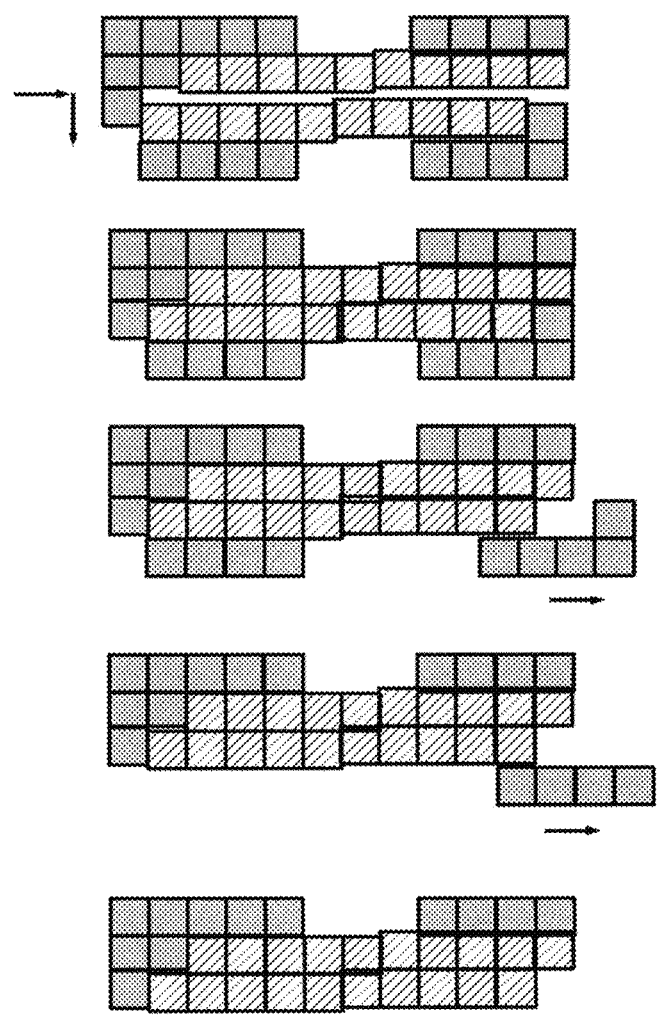

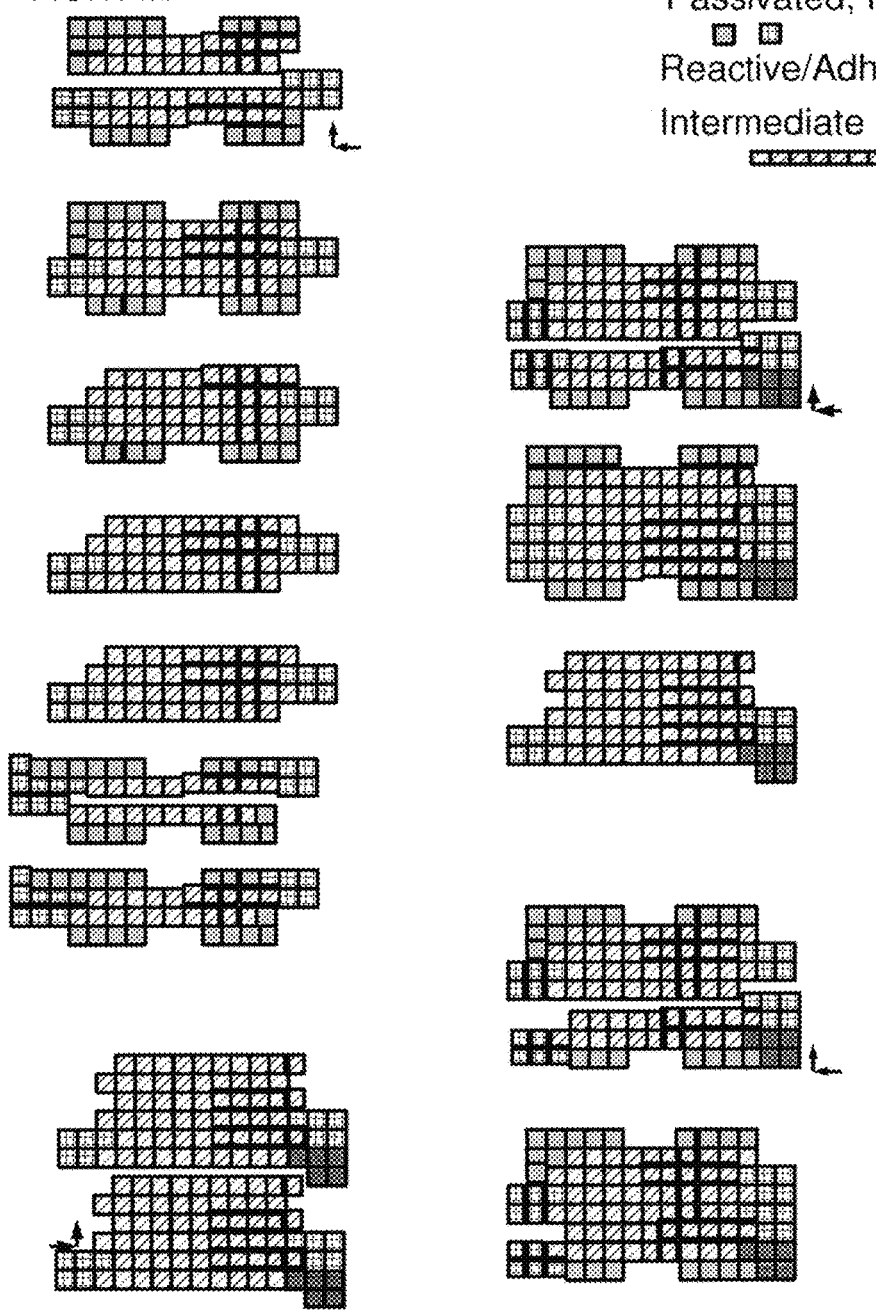

FIG.1P.iii.
FIG.1P.iv.
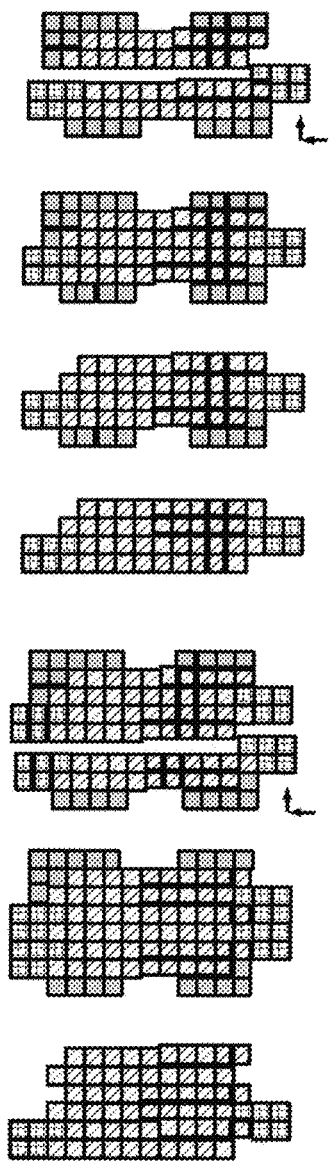
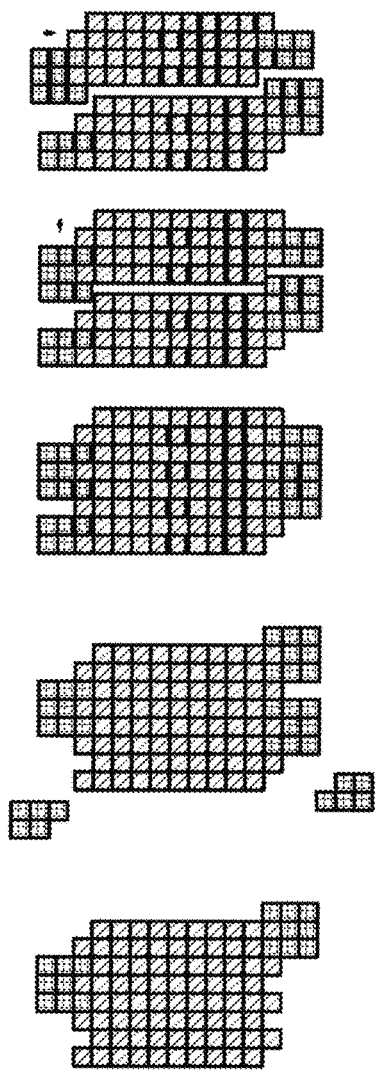

FIG.1P.v.
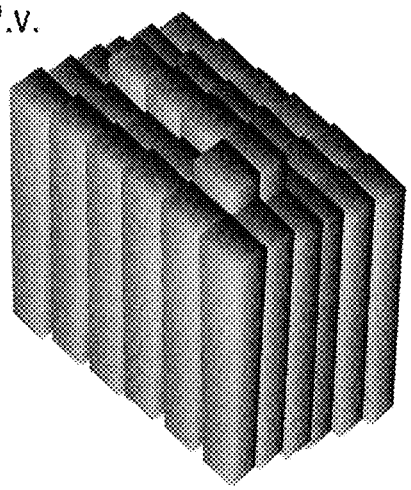
Adjustable Position Rod Array
Reconfigurable Relief

FIG.1P.vi. 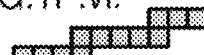 FIRST SURFACE RELIEF FEATURE (PASSIVATED)
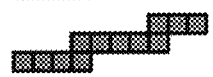 SECOND SURFACE RELIEF FEATURE (PASSIVATED)
 MATERIAL FABRICATED (RE/ACTIVE)
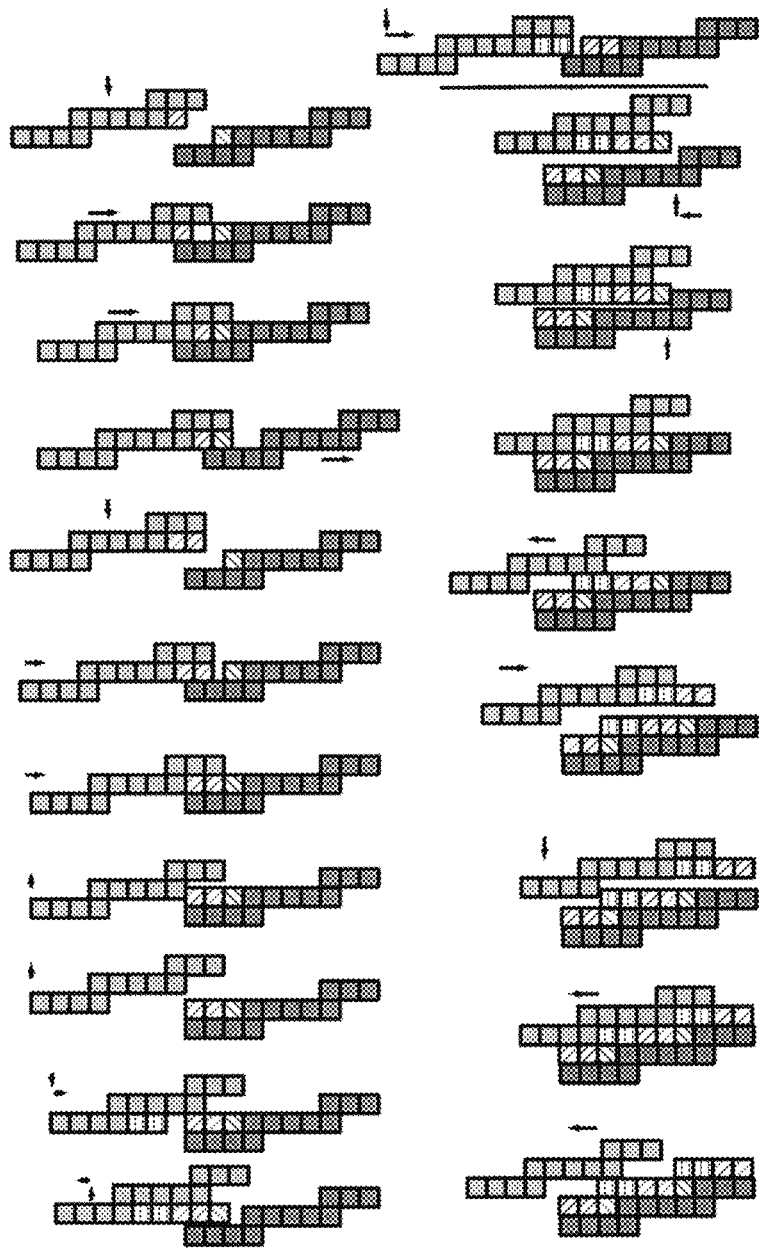

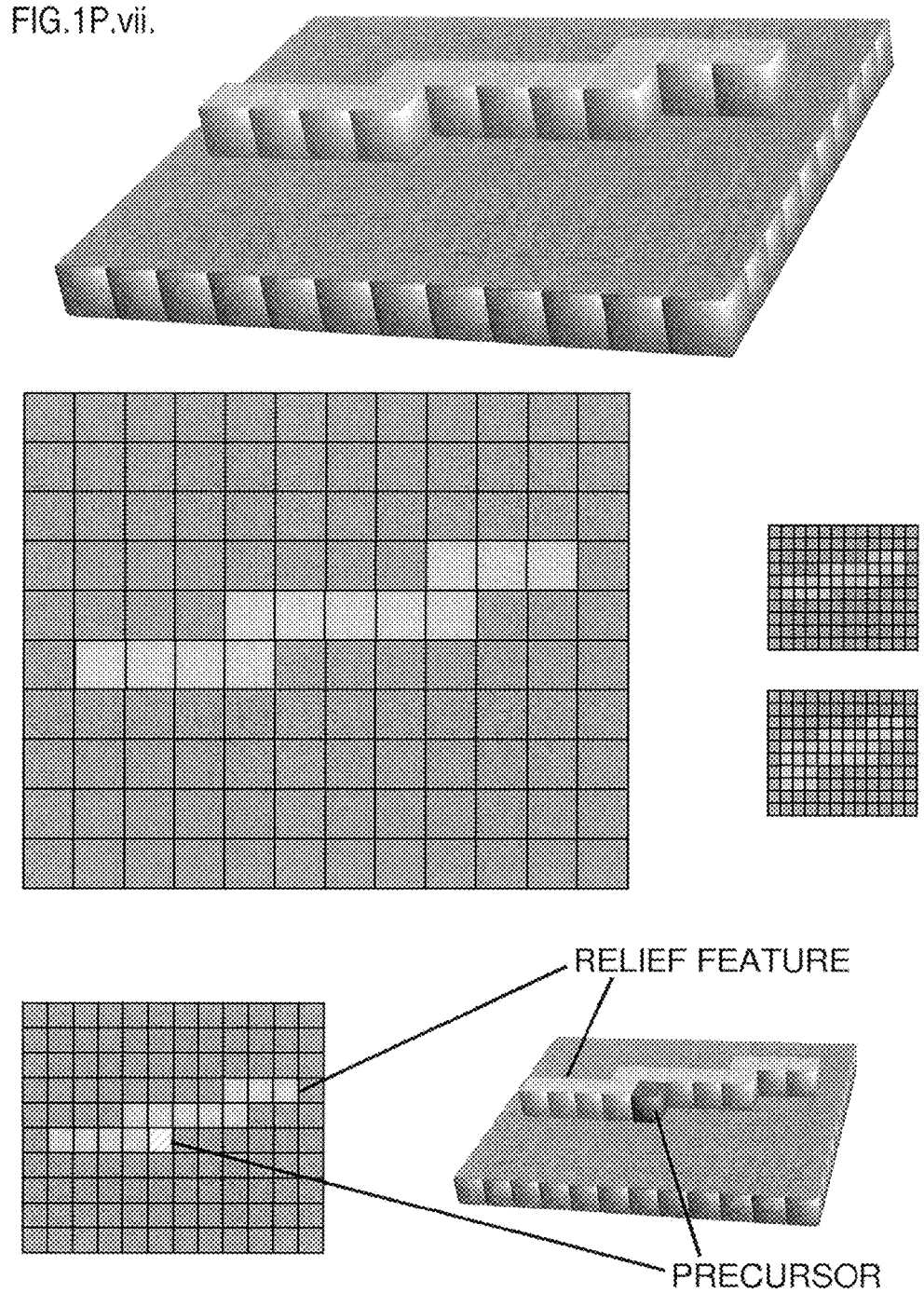

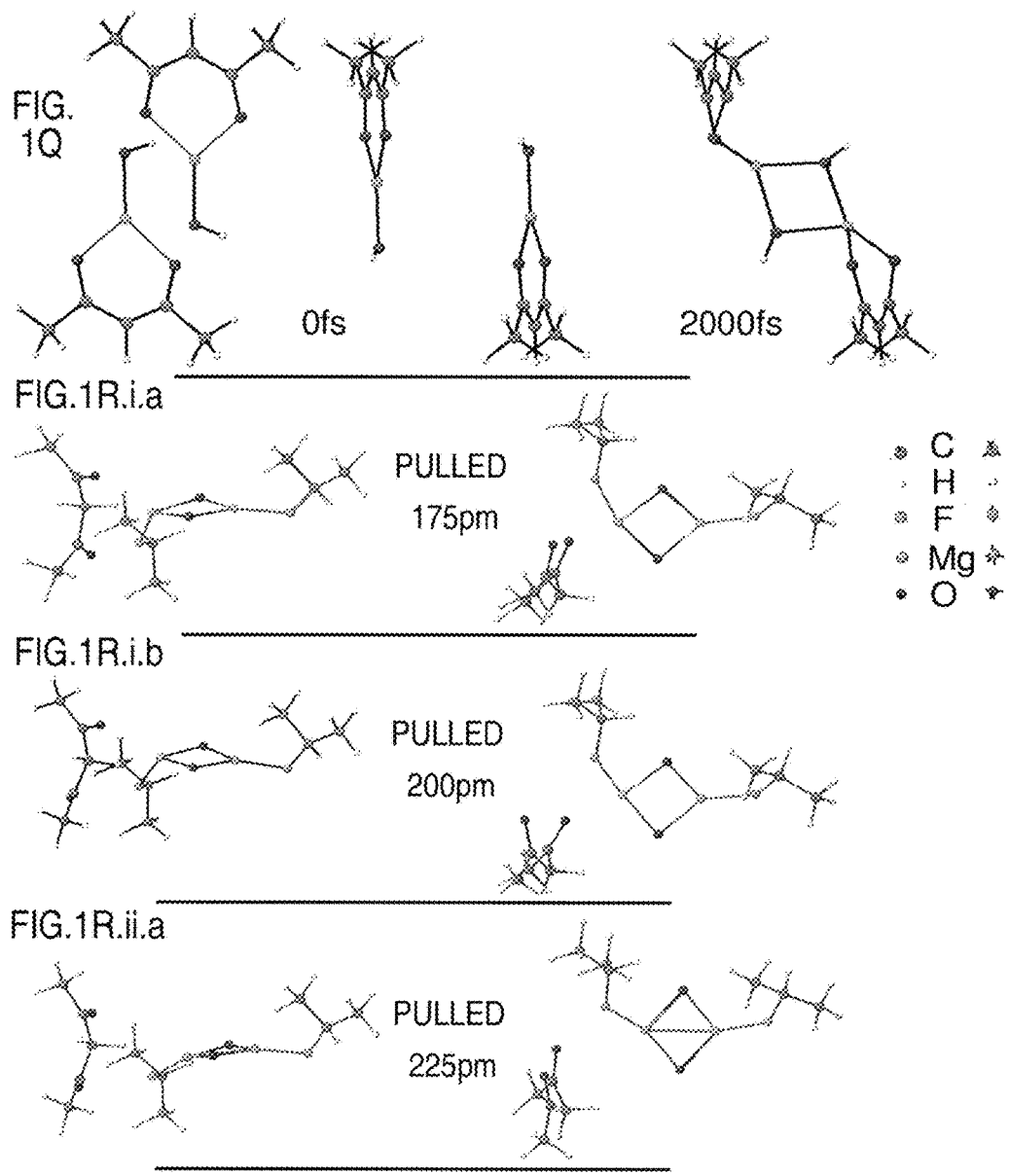

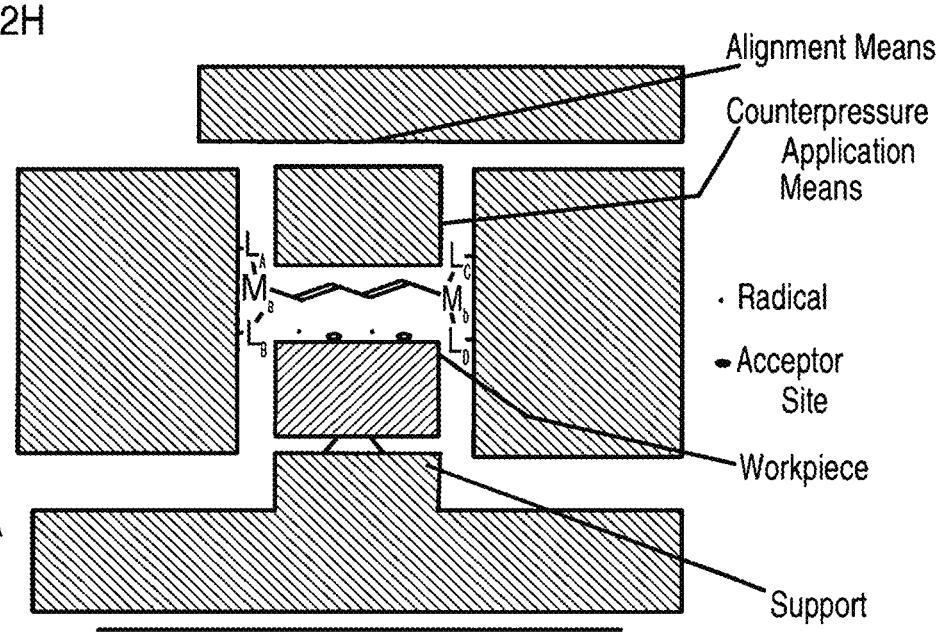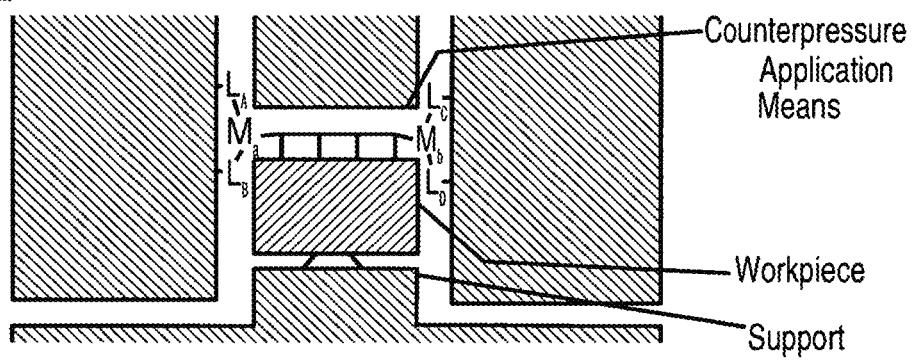

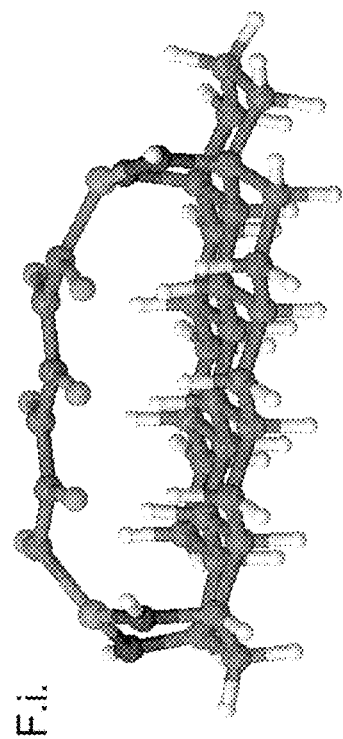
FIG. 3F.i.
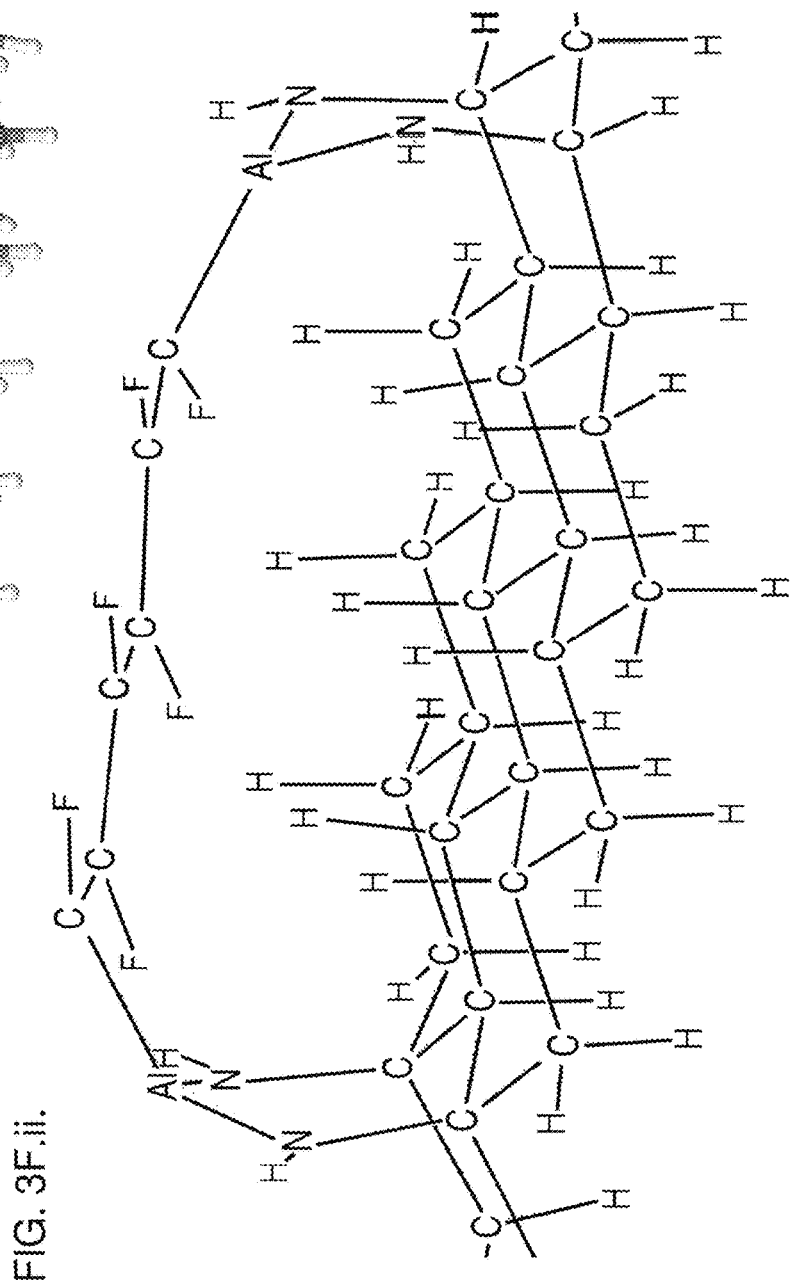
FIG. 3F.ii.

FIG. 3F.iii.
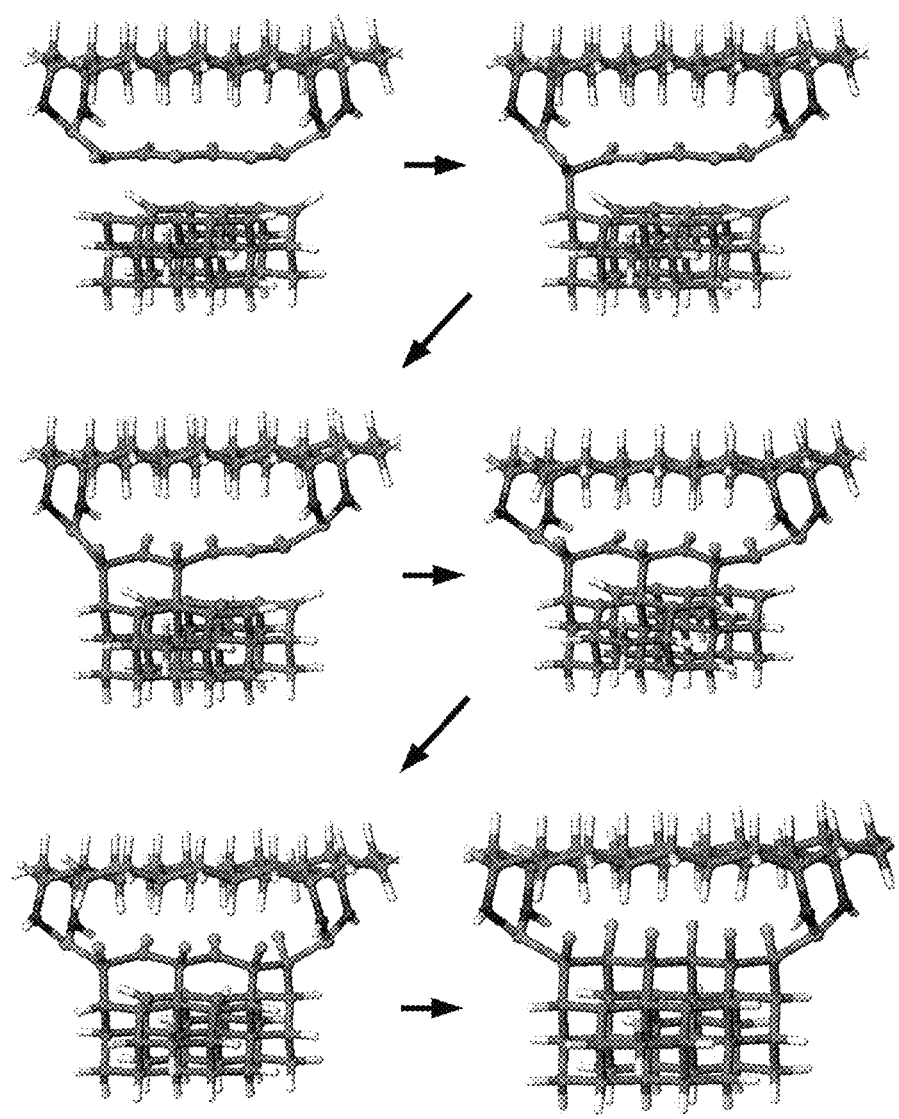

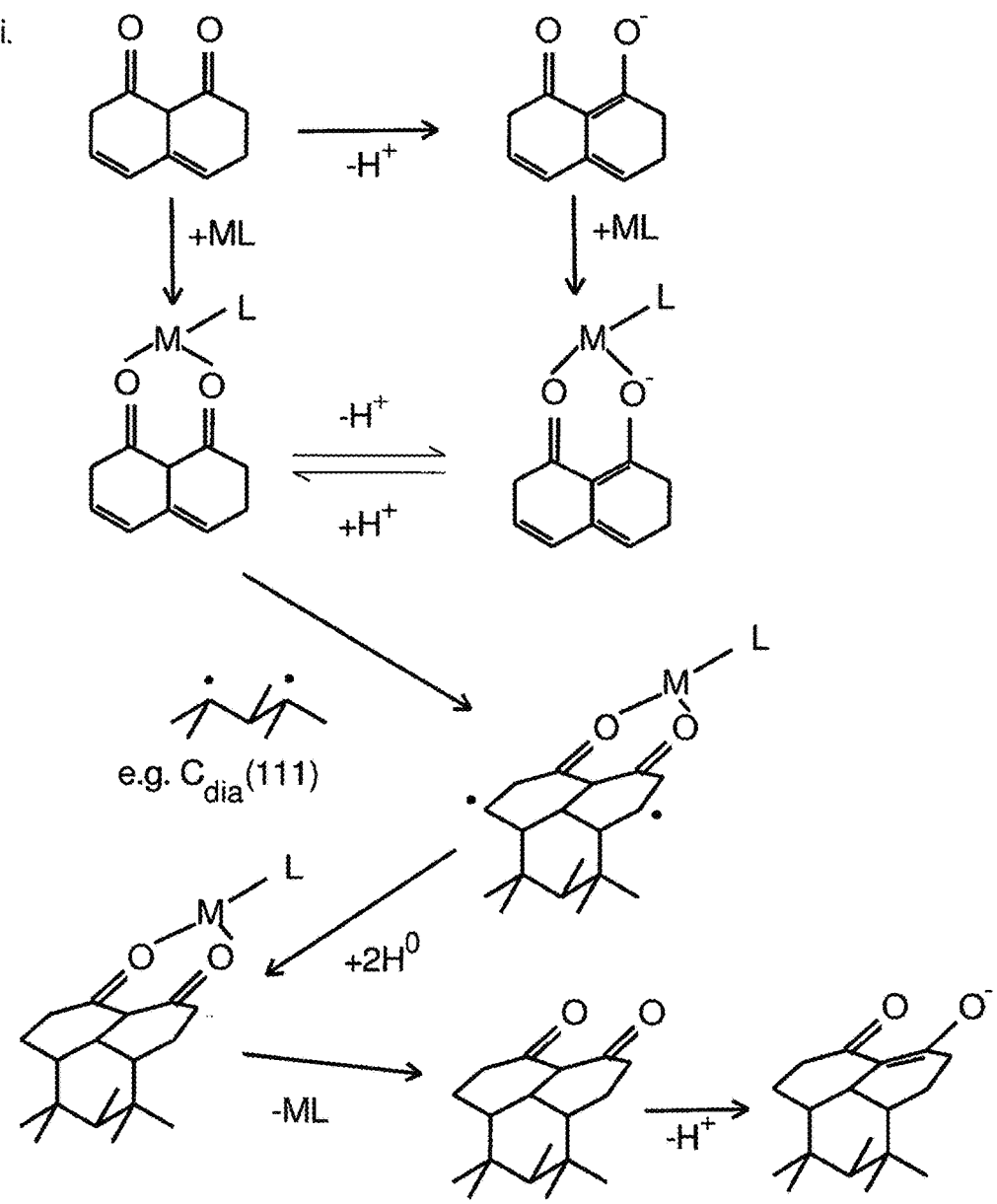
FIG. 3K.ii.

FIG. 3N.ii.
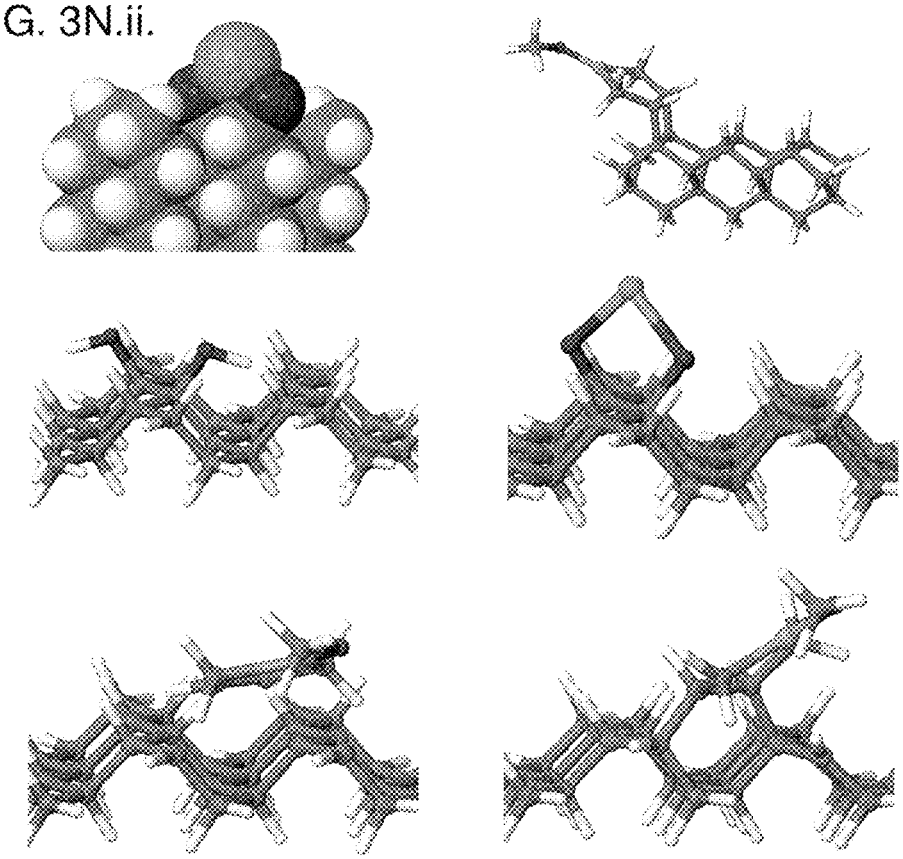
FIG. 10G
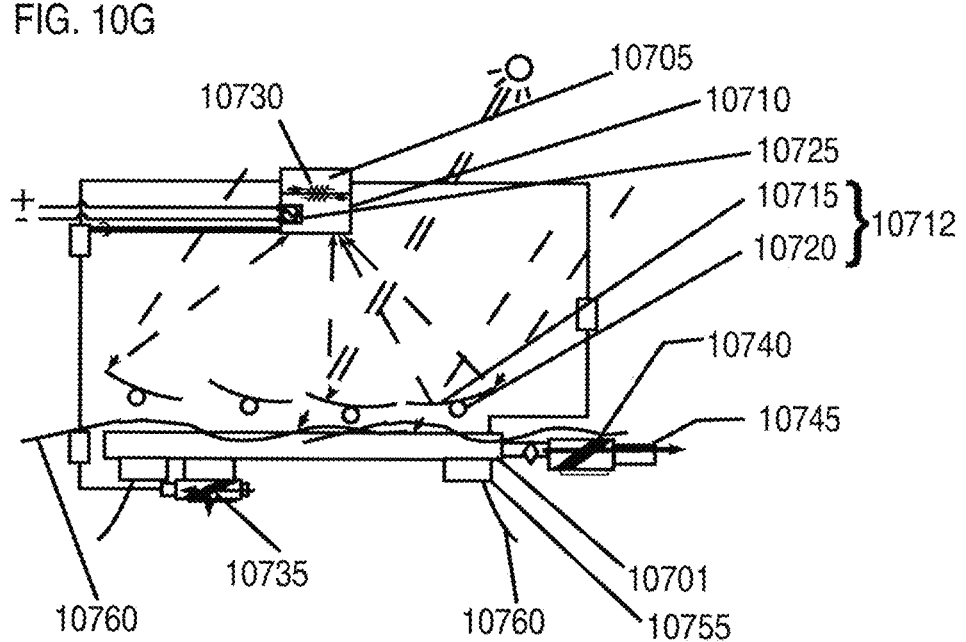

FIG. 4A.i
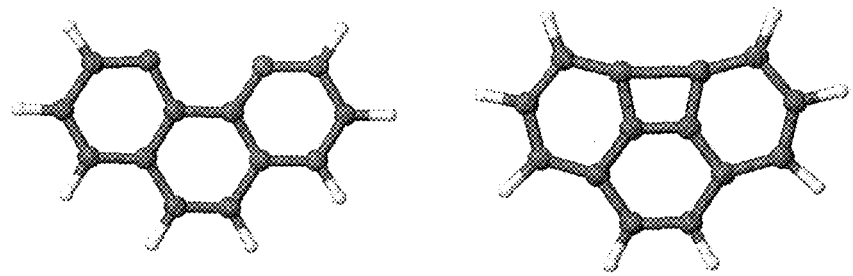
FIG. 4A.ii
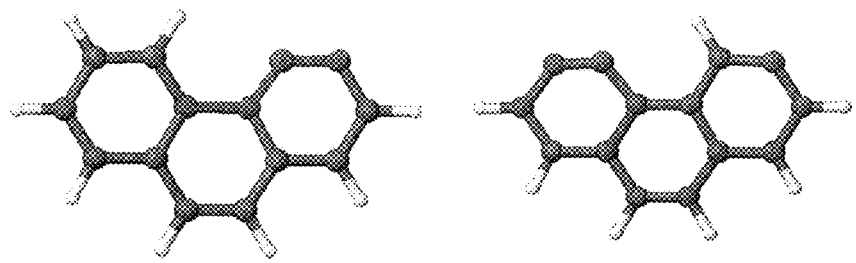
FIG. 4B
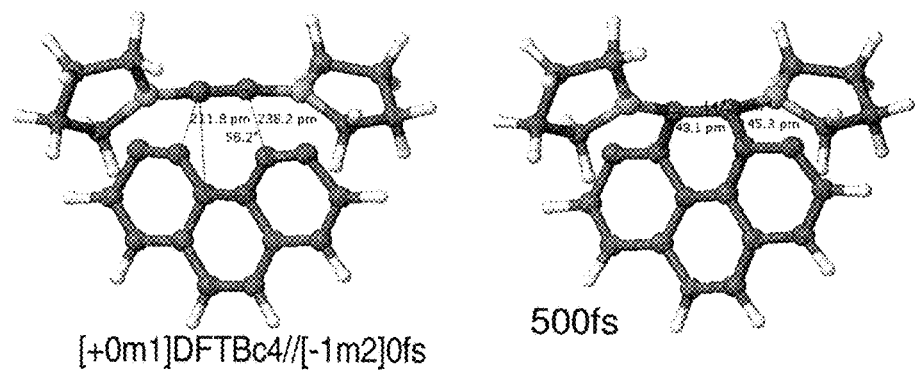
[+0m1]DFTBc4//[-1m2]0fs        500fs

REFERENCE
STATE

EXCITATION 8
187 TO 189, 629nm

EXCITATION 10
188 TO 192, 549nm

187 OPAQUE
189 MESH $$x\,CO_3^{-2} + y\,HCO_3^- + z\,NaHCO_3 + Ca(OH)_2$$
$$\longrightarrow (x+y+z)\,CaCO_3\downarrow + HOH + NaOH$$

LIGHTER THAN AIR LOFTING MEMBER, REFLECTIVE COATED, SERVING AS SOLAR CONCENTRATING MEANS

Hydroxide Enrichment
by
Electro-Hydro-Dynamic (EHD) Electrolyte Separation

◇ Valve
△ Pump
▱ Opposed Piston Self-Valving Pump

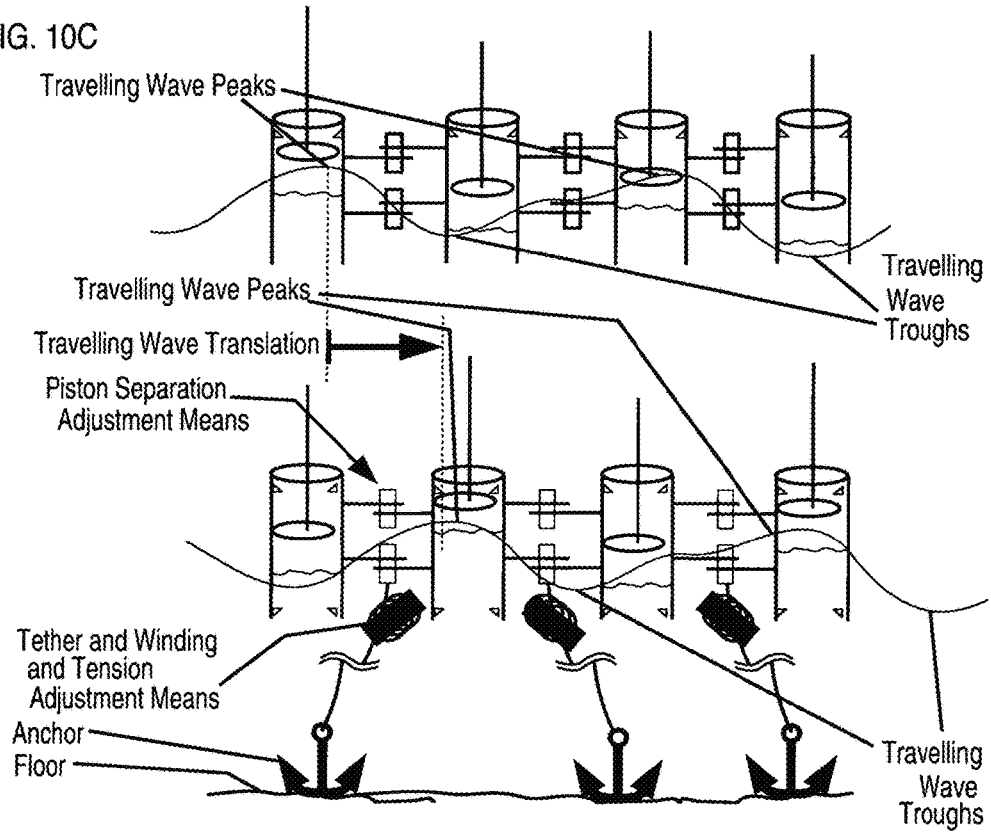
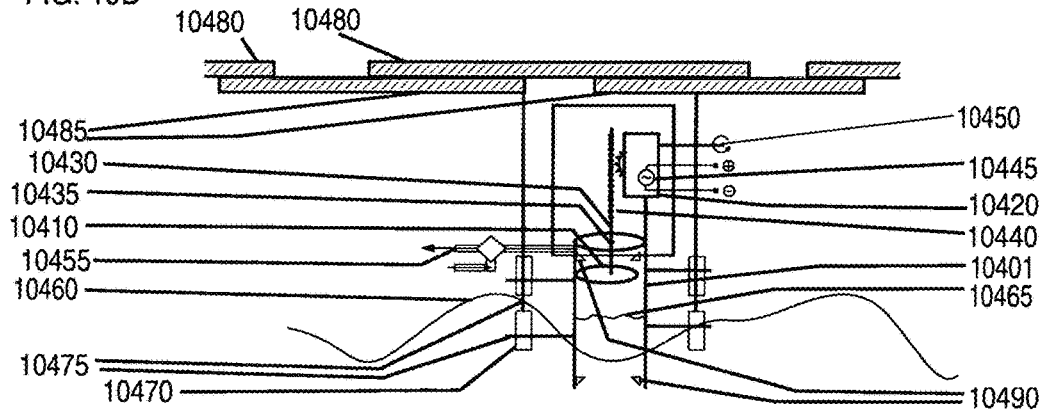

☐ PASSIVE SPACER OR SACRIFICIAL MATERIAL

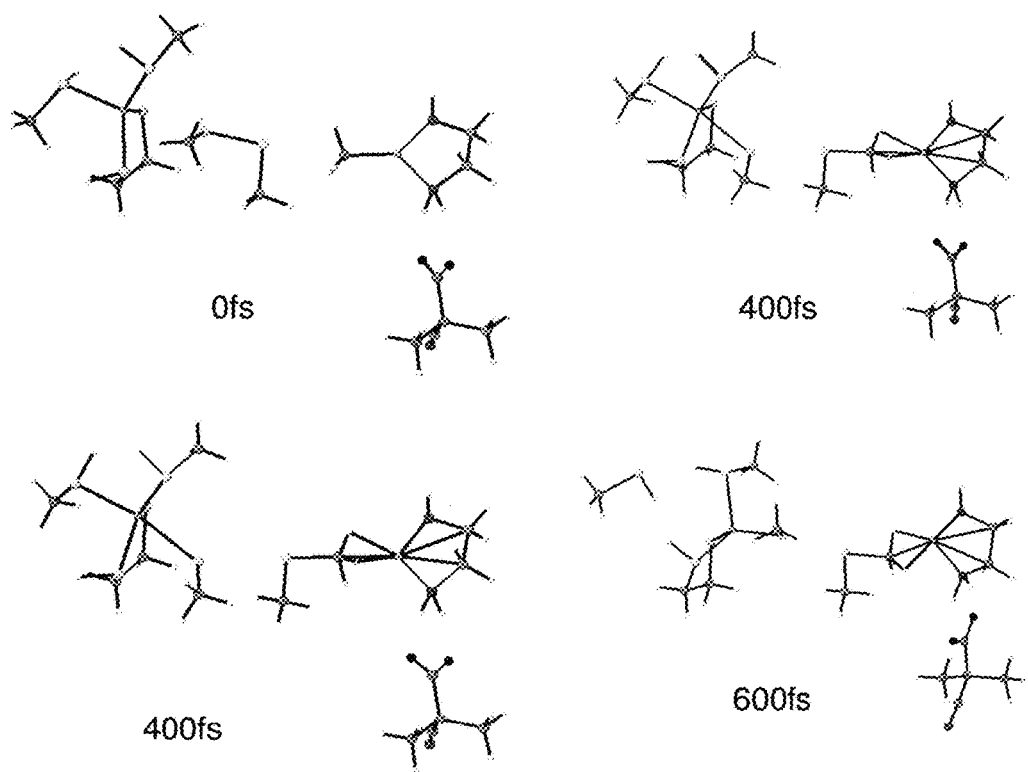

$M^{+n}L^{-m}$

| $M^{+1}L^{-0}$ | $M^{+2}L^{-1}$ | $M^{+3}L^{-2}$ | $M^{+4}L^{-3}$ |
|---|---|---|---|
|  |  |  |  |
|  |  |  |  |
|  |  |  |  |
| |  |  |  |
|  |  |  | |

FIG. 16G.i 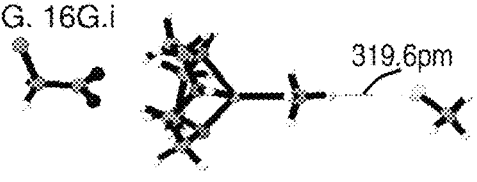 FIG. 16G.ii 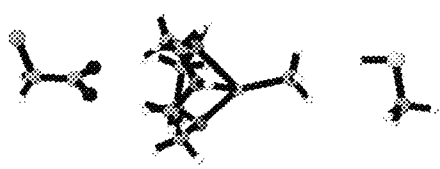
FIG. 16H.i 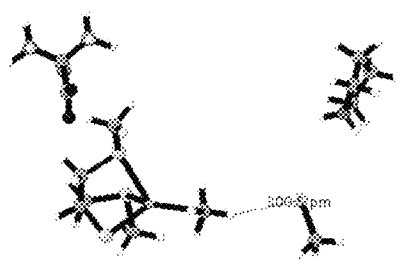 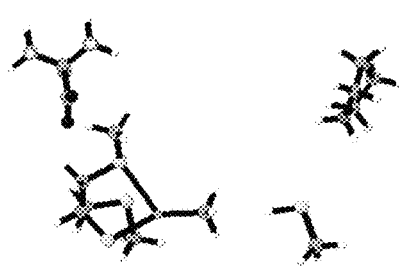
FIG. 16H.ii 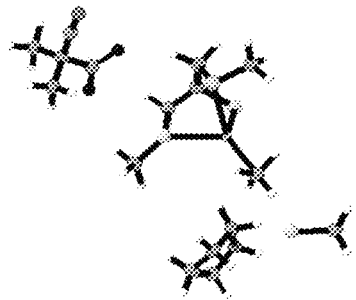 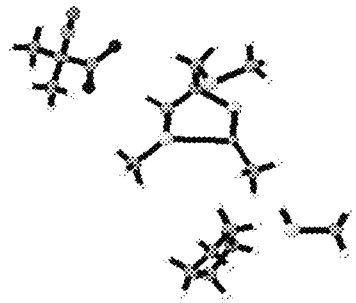
FIG. 16I 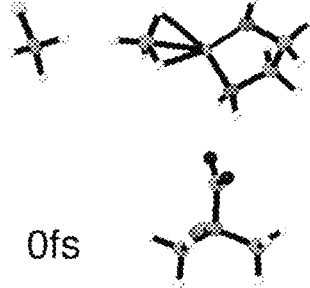 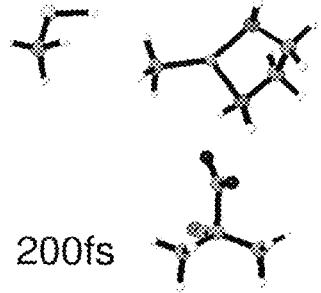
0fs     200fs c5push6x20+20pm[0m3]c5        c5push8x20+10+3pm[0m3]c5

FIG. 19A.i
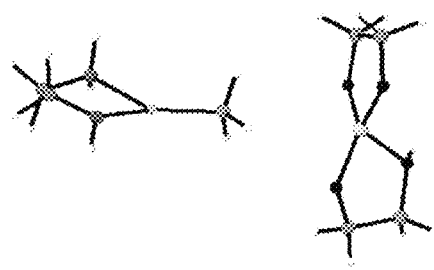
FIG. 19A.ii
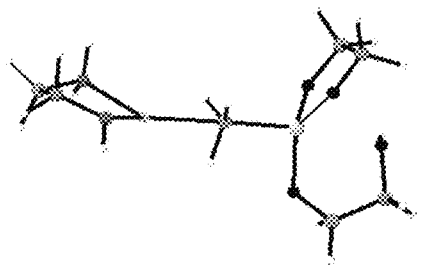
FIG. 19A.iii
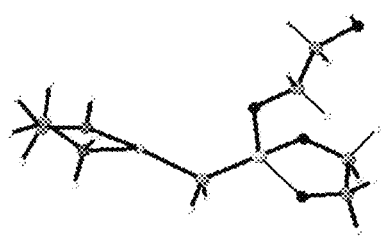
FIG. 19A.iv
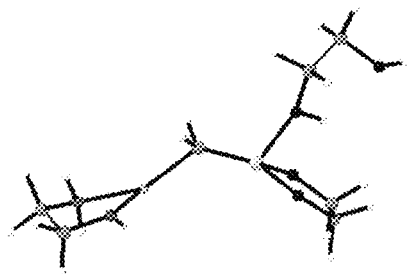
FIG. 19A.v
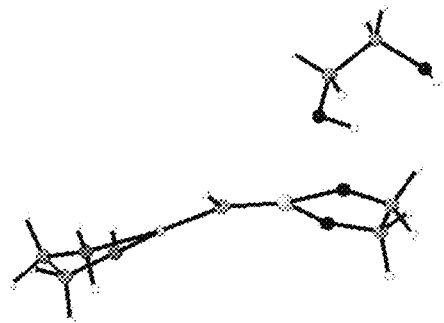

FIG. 19A.vi
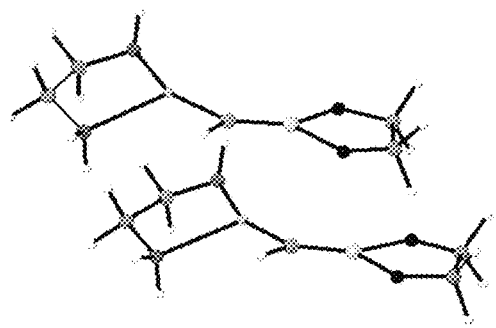
FIG. 19A.vii
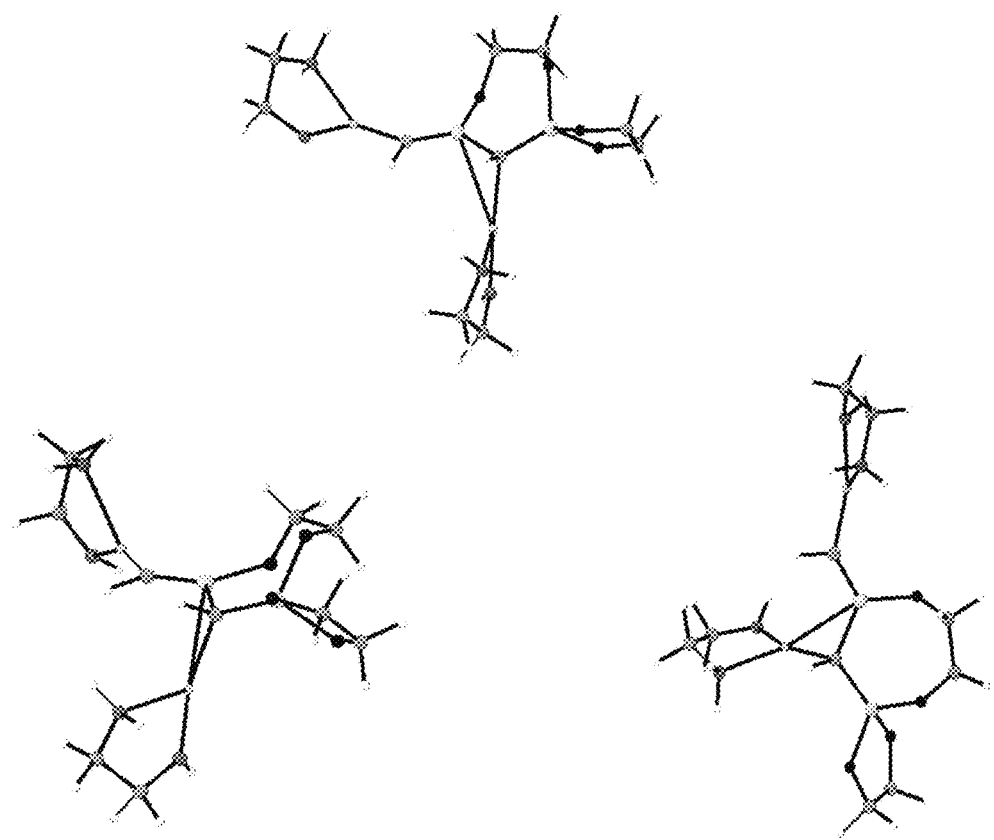

FIG. 19B.i
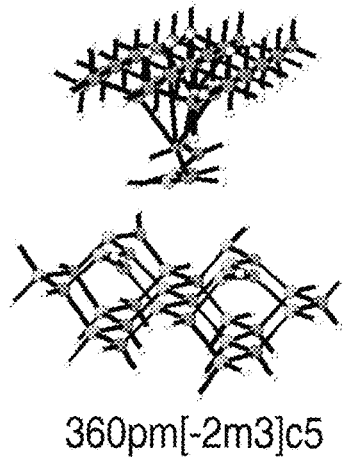
FIG. 19B.ii
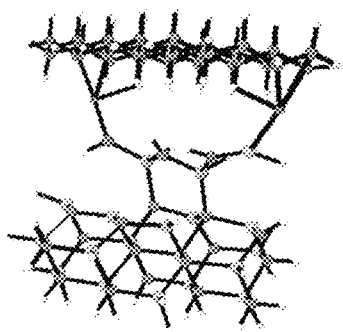
360pm[-2m3]c5
FIG. 19B.iii
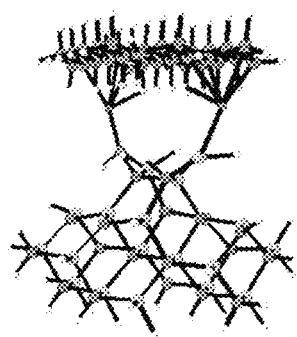
FIG. 19B.iv
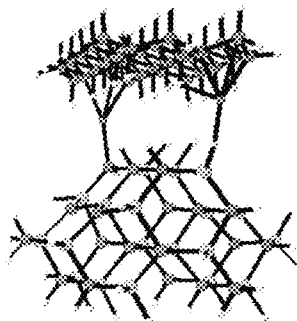
[-2m3]c5push2x20+20pm[-2m3]c5
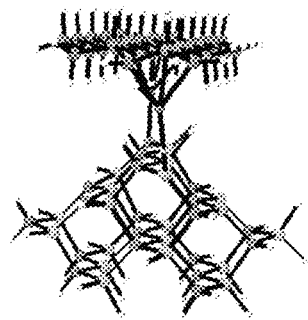

CONVERGENT NANOFABRICATION AND NANOASSEMBLY METHODS, MEANS AND APPLICATIONS THEREOF, PRODUCTS AND SYSTEMS THEREFROM INCLUDING METHODS AND MEANS FOR CONVERSION OF POLLUTANTS TO USEFUL PRODUCTS

CROSS-REFERENCE TO RELATED APPLICATIONS

This application claims the benefit of provisional Application No. 61/276,220, filed 2009 Sep. 9 by the present inventor.

RELATED APPLICATIONS

This application further develops and applies material disclosed in provisional Application No. 61/188,726, filed 2008 Aug. 11 by the present inventor, and application Ser. No. 12/462,950, mailed 2009 Aug. 11, by the present inventor, further adding new material.

FIELD OF THE INVENTION

This invention relates to the fields of nanotechnology, self-replicating systems, chemistry, biochemistry, medical devices, information processing and electronics, electromechanical devices, solar energy, wind energy, materials processing, fabrication, assembly and robotics.

BACKGROUND OF THE INVENTION

The background of the present invention is substantially as for [Rab08], incorporated herein by reference.

The state of related art and its limitations at present is illustrated by current system (not yet version 2.0) at http://www.reprap.org.

Recent theoretical work by R. A. Freitas and R. C. Merkle, "A Minimal Toolset for Positional Diamond Mechanosynthesis," *J. Comput. Theor. Nanosci.* (May 2008) 5:760-861, (http://www.molecularassembler.com/Papers/MinToolset.pdf) relies at important points on rotational motions and multiple manipulators operating in close proximity and so at least some proposed reactions and operations pose significant challenges for established technologies.

SUMMARY OF THE INVENTION

Methods and means for convergent assembly of solids including precise nanostructures starting from simple molecules or ions, and systems featuring same are disclosed, as are self-replicating systems produced by and performing same. Precursor or intermediate bodies comprising reactive or depassivated atoms or surfaces are positioned relative to each other using binding means in communication with positioning means and contacted by translating same, preferably with subnanometer precision and preferably with said positioning means under control of an electronic device, more preferably under control of programmable digital logic information processing means such as a state machine or programmable digital computer. These materials include diamond, silicon, beta-silicon carbide, graphene and related carbon allotropes, halite structure materials including MgO, TiC, VN, HfC, TaC, $Hf_xTa_yC$, ScN, TiN, NdN, ZrN, ZrC, MgS and numerous others, as well as combinations of the foregoing, particularly graphene coated and/or reinforced MgO, as well as precisely doped variants of the foregoing are enabled. Novel actuator devices comprising electrical conductors situated on insulating members useful in particular in positional mechanosynthesis devices and molecular assembler systems are disclosed, as are methods and means for the fabrication thereof, preferably with graphenoid conductors linked to diamond supports. Methods and means for precise positional electrodeposition of refractory metals such as W are also disclosed. These materials span a wide range of materials properties, and combinations thereof facilitate the fabrication and assembly of devices and systems addressing a wide range of applications, including energy conversion and materials processing, especially of raw materials, which may be obtained from abundant environmental sources. Novel systems comprising energy collection and storage means, material processing means and fabrication and assembly means including same capable of self- or allo-replication are disclosed, and optionally additionally feature means for collection of raw materials or capture of pollutants or both, and/or means for cultivation of living organisms or materials including for agriculture, mariculture, algaculture (e.g. for producing biomass, biofuel, and/or for carbon sequestration, or as a high yield nutritious foodstuff in the case of photosynthetic cyanobacteria *Arthrospira platensis* and *Arthrospira maxima* [*spirulina*] and similar organisms) pharmaceuticals or recombinant products, and may further comprise means for materials processing of products thereof or for inputs therefor. Among preferred embodiments are adaptations of the foregoing for operation in marine environments. Precise structures featuring improved material composition (e.g. improved purity, reduced structural defects or precisely located alterations of structure to impart desired properties) enable improved materials and operating characteristics which in turn enable or facilitate novel devices, improved performance and improved economies of product devices or systems. Although carbon nanotubes, due to predicted and measured tensile strength and high strength-to-mass ratios have been considered ideal materials for the construction of orbital elevators or space elvators, [Bha05] points out that minimum defect rates attainable in current art significantly reduce the strength of macroscopic articles compared with preselected sub-millimeter samples well below the required strength for this set of applications. Graphene, graphenoid and carbon nanotube materials produced according to the convergent graphenoid fabrication methods disclosed herein, predicted to feature rapid reaction times and accordingly extremely low side- or failure reaction rates, and accordingly yield products featuring vastly reduced defect rates; low-defect or defect-free graphenoid materials enable sufficiently improved tensile-strength to mass ratios for use as a tether to enable an operative space-elevator yielding in turn cost reduction for space-related applications; similar advantages are enabled for other applications involving tethers, including the tethering of high-altitude wind-driven electrical generators which may additionally feature means for carbon capture from the atmosphere concurrent to electricity generation; graphenoid sheeting featuring improved strength to mass ratio preferably serves as structural material for conduits in the foregoing high-altitude devices. Modified graphenoid articles fabricated according to the present invention may also be adapted for use in photovoltaic devices, also provided. Further, arbitrary precise nanostructures and/or microstructures fabricated according to the present invention, e.g. MgO, may further be coated with metals, e.g. via the positional metal deposition methods and means disclosed herein, e.g. with Ag, to yield metamaterials featuring negative index of refraction, which has been difficult in the prior art.

SUMMARY OF THE FIGURES

FIGS. 1P.ii-iv and 1P.vi show successive steps of convergent fabrication with motions of tools bearing precursors or intermediates denoted by arrows.

FIG. 1P.vii. shows the use of a relief feature for manipulating precursors and intermediates for fabricating structural copies of themselves for deposition onto surfaces for forming relief structures useful as means for the convergent fabrication and assembly methods taught herein.

FIGS. 3A-G and 3I illustrate mechanosynthesis of diamondoid structures or addition thereto from tool-bound trans-polyene deposition, and means and steps of the method therefor. FIG. 3E shows addition of an imene substituted trans-polyene. FIG. 3E shows a sequence of geometric optima along the trajectory of addition of an imine substituted trans-polyene reactant loaded on a trans-polyene addition tool to a bare diamond 110 surface: the first panel shows the polyene reactant pushed against target atoms before covalent bond formation commences, with reactant atom-target atom distances ranging from 231.0-259.7 pm. FIGS. 3F.i-iii. show addition of a perfluorine derivatized trans-polyene; FIG. 3F.i. shows an isometric view of a trans-polyene addition tool loaded with a perfluorine derivatized trans-polyene; FIG. 3F.ii. shows a molecular structure similar to that shown in FIG. 3F.i. with elements labeled (but formal double bonds not shown); FIG. 3F.iii. shows a sequence of geometric optima along the trajectory of trans-polyene addition to a bare diamond 110 surface as said perfluorine derivatized trans-polyene is pushed by said addition tool to a desired bare target site on said diamond 110 surface, in this instance yielding an addition product bearing a perfluorine derivatized row of added carbons with proper diamondoid bond connectivity. FIG. 3G shows a facial view of the perfluorine derivatized trans-polyene loaded tool used in FIG. 3F.

FIGS. 3J-N show various modifications of diamondoid structural members with or for forming ligands and supported ligands, and binding of metals therewith. FIG. 3M shows the positioning of nitrile ligands on methyls representing diamondoid supports for binding and depositing an aluminum atom onto an aluminum workpiece, with bond formation shown: the starting distance between tool-loaded aluminum atom and workpiece target aluminum atom is 361.9 pm.

FIG. 4A.i illustrates a side-reaction product which is predicted by some but not all calculation methods to form upon abstraction of the two adjacent hydrogen atoms on adjacent rings as depicted; this side product is less reactive to carbon dimer addition. FIG. 4A.ii illustrates a hydrogen abstraction sequence which avoids formation of the side product; however, DFTB (as implemented in cp2k) which appears to give reasonable agreement with density functional calculations, predicts a local minimum for carbon dimer addition with unusually extended bonds, probably related to the formation of localized radicals in the singlet state; as shown, addition of an electron yielding a doublet multiplicity promotes rapid formation of the desired product. Note the use of two ligands bridged by the reactant dimer, unlike prior art utilizing a single tool molecule for dimer addition.

FIG. 10G depicts a similar system adapted for deployment floating on a body of water such as an ocean or lake and for cultivating algae, e.g. for biofuel, bioplastic or, for *Arthrospira platensis* cultivation, also food use. Culture vessel shown here submerged near water body surface could alternatively be supported on a platform as that of FIGS. 10C-D, whereby wave power could additionally be exploited by the corresponding system.

FIGS. 10C-D depict wave energy converting flotation means, suitable for supporting a platform, flotation means comprising inverted open chambers with pistons trapping air or other gases above the water level, whereby traverse traveling waves compress and expand enclosed gases and drive pistons delivering work, which may be coupled via a transmission or gearbox to an electrical generator. Optional mooring means provided. Means for adjusting the pitch of multiple chambers to match wave pitch and provide stable flotation while maximizing or smoothing power conversion. Also shown are means for diverting pressurized gas for pneumatic power, facilitated by downshifting or locking gears to slow or lock piston motions.

FIG. 10D depicts detail of a single pressure engine cylinder (or chamber) 10401 of the system for wave energy conversion depicted in FIG. 10C. Piston 10410 is in communication with gearbox 10420 via rod 10430 passing through gas-tight seal 10435 and rack 10440. Gearbox 10420 may controllably engage work output by said pressure engine to electrical generator 10445 or rotary work output shaft 10450. Pressure develops in cylinder 10401 as a water surface wave 10460 with transverse displacement passes and causes enveloped water surface 10465 enclosed by said cylinder to rise, said pressure driving said piston, or alternatively serving as a source of pneumatic power controlled by a valve at pneumatic output 10455. Translation control means 10470 enable adjustment of positions of support rods 10475 whereby position of supported platform 10480 and spacing between adjacent cylinders may be adjusted. Sliding members 10485 permit motions compensating for shifts in positions of cylinders relative to said supported platform as the spacing of said cylinders is adjusted. Piston stops 10490 restricts motion of piston such that piston cannot be drawn out of cylinder or compress working fluid enclosed in cylinder 10401 by piston 10410 beyond a minimum volume.

FIG. 10G depicts a system for capturing and controllably directing solar energy to an algaculture growth vessel 10701, a water distillation still 10705 and a solar engine 10710, wherein incident solar radiation is captured by solar concentrating means 10712 wherein light is directed by light concentrating partial reflectors 10715 oriented by solar trackers 10720 to converge on a subsystem for solar energy utilization. Solar engine 10710 may drive an electrical generator 10725 or rotational work output shaft denoted by semicircular arrow. Heat exchanger 10730 may recover heat from distillate condensation in the case of a low temperature engine operation for transferring recovered heat energy to said engine, or for the case of high temperature engine operation may recover exhaust heat from said engine and transfer heat energy to said water distillation still 10705 for distilling water. A water filter 10735 is provided for filtering intake water for distillation and/or algae growth. An algae collection filter 10740 is provided for harvesting algae prior to medium discharge at outflow 10745. The system depicted in this figure is preferably partially submerged below waterbody surface 10750, and is preferably supported by flotation means 10755 and secured by mooring 10760.

FIG. 19 shows addition of metal-bound methyl to a monoprotonated ethylene glycol complex of Silicon (as studied by R. Laine and coworkers), with subsequent deprotonation and protonation steps yielding lingand release and SiC unsaturation. The resulting silacarbene complex may be reacted as shown to yield oligomers and polymers. With removal of ligands (esp. by concerted pulling of adjacent non-like ligands, poly-silacarbene fragments useful for mechanosynthesis may be obtained. The latter operations, by Zn ions bound to surface carba ions on a diamond (111) surface.

DETAILED DESCRIPTION OF THE INVENTION

Figure 1I:
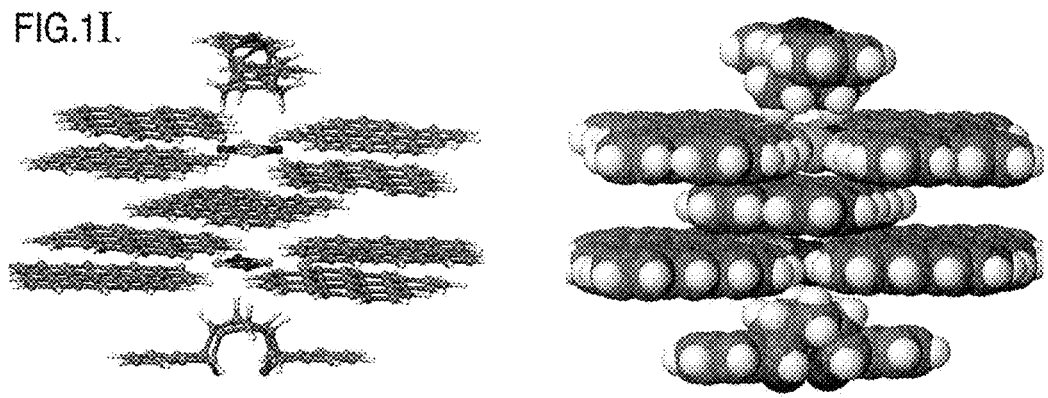
FIG. 1 illustrates convergent assembly of rocksalt (halite or B1) structure materials and structures relevant to the understanding thereof. Positioning and manipulation using both ligands, supported ligands and relief features is depicted, as are means for preventing or repairing failure products of convergent fabrication bonding reactions. Support-bound ligands include diamondoid and graphenoid supported fluorine atoms and dioxane and Acetylacetone analogs and derivatives, and variously occur in monodentate, bidentate and tridentate form. Various spatial arrangements and motions of supported ligands for performing desired operations are shown. Various spatial arrangements and motions of non-ligand structural members for preventing or repairing failure products of convergent fabrication bonding reactions are also shown. Geometries were calculated using AM1 as implemented either in cp2k or PC-GAMESS, and images thereof rendered using Jmol. Figures with times indicated are from dynamics calculations, done using cp2k.
FIG. 1N illustrates convergent fabrication of MgO using as means therefor MgO structural members passivated against reaction with MgO precursors or intermediates by decoration or coatin with one or more graphenoid or graphene layers.
FIG. 1P illustrates various aspects of convergent fabrication.
FIG. 1Q illustrates reaction dynamics at 300K of two Acetylacetone bound Mg(OH) ions. NVT ensemble dynamics were used with AM1 as implemented in cp2k.
FIG. 1R illustrates ligand contest for transferring intermediates between different types of ligands and different sets of ligands.
Figure 1J:
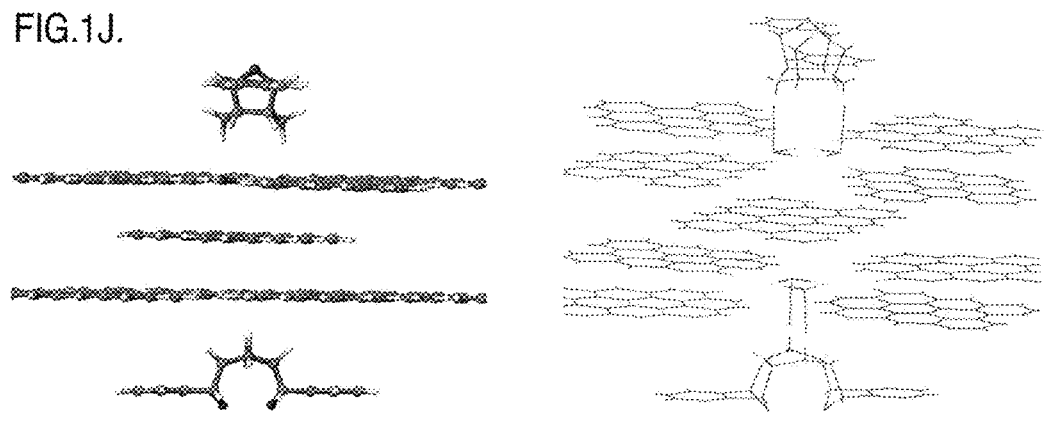
Figure 1K:
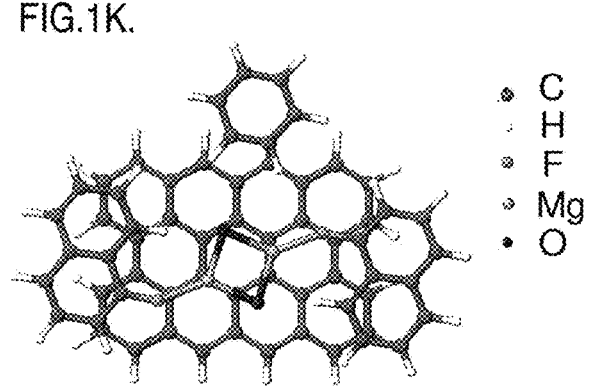
Figure 1M:
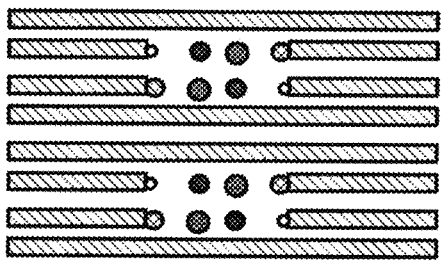
Figure 1M:
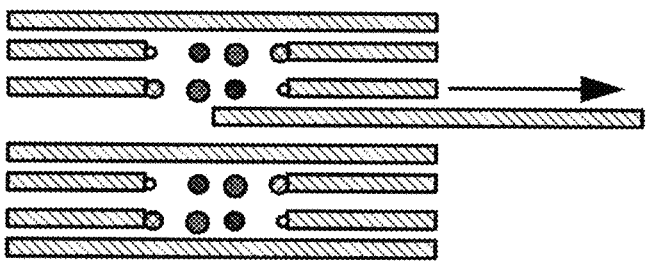
Figure 1M:
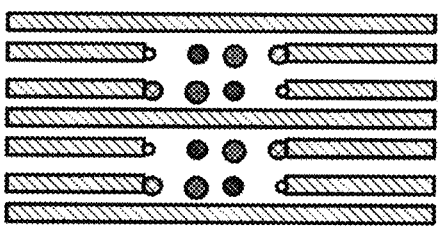
Figure 1M:
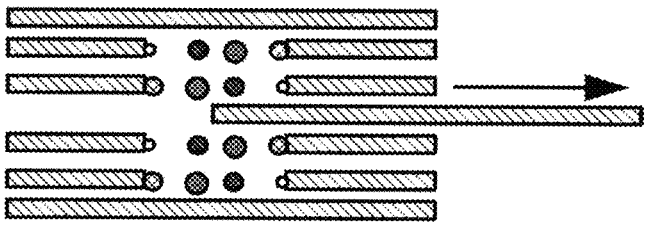
Figure 1M:
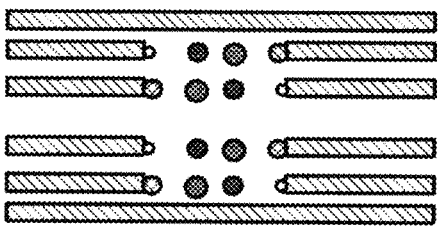
Figure 1M:
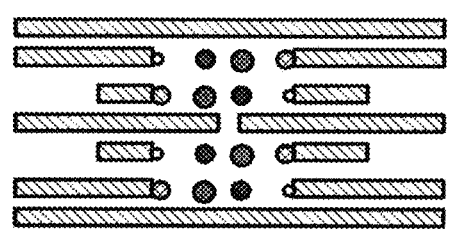
Figure 1M:
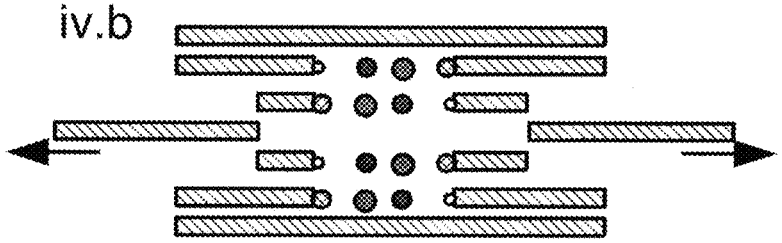
Figure 2A:
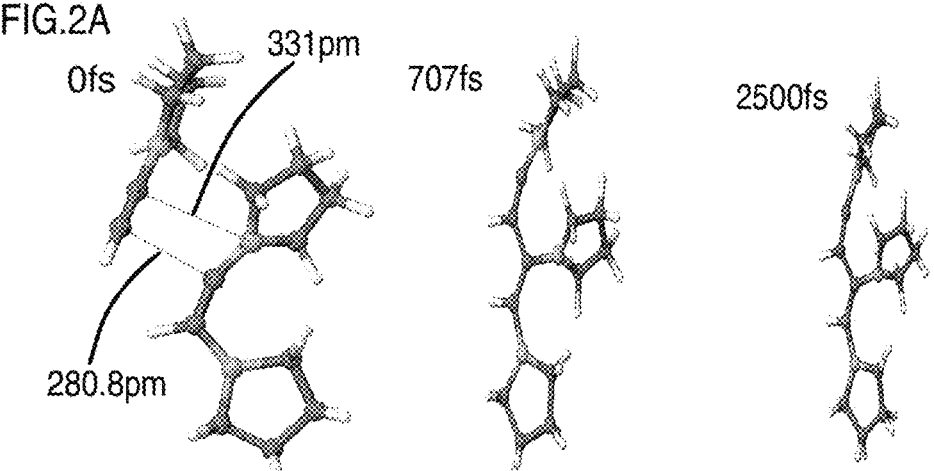
FIG. 2 illustrates binding and convergent reaction of acetylenes to form all-s-transoid-trans-polyenes and manipulation thereof and methods and means for reactions of same with fragments representing diamondoid targets; the cyclohexane molecule represents a nonreacting structural member for applying directed pressure directing reactant fragment atoms to target atoms. Activation in FIG. 2E may be radical, cationic or anionic; with Al, a partially cationic acetylene attacks neutral singlet acetylene.
Figure 2B:
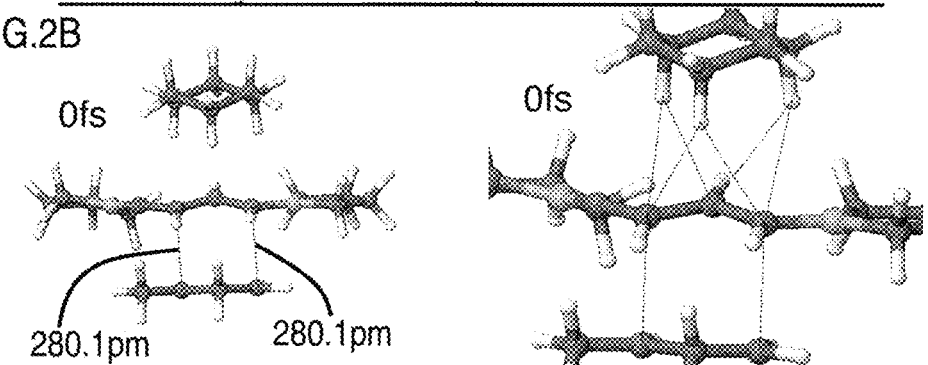
Figure 2C:
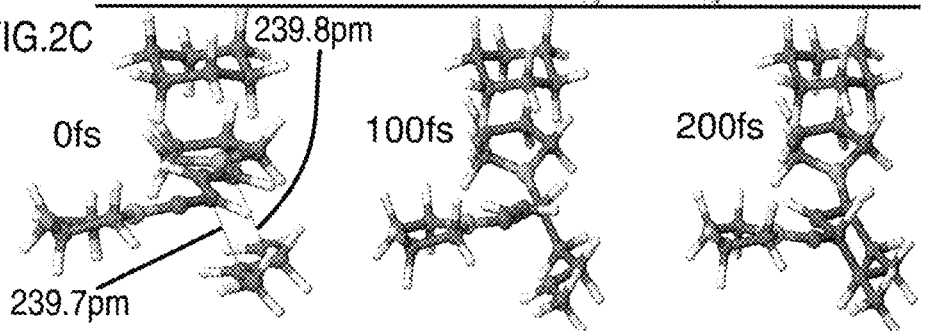
Figure 2D:
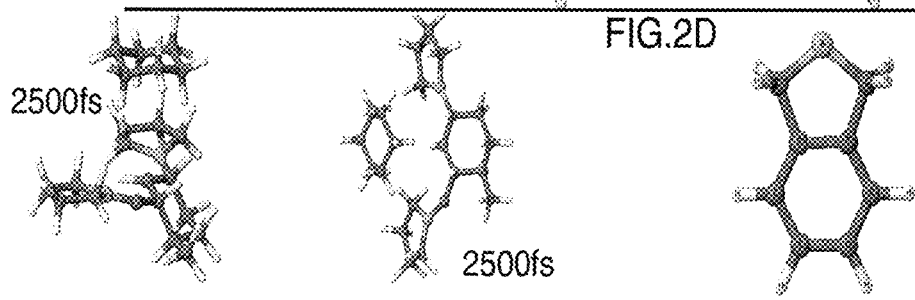
Figure 2E:
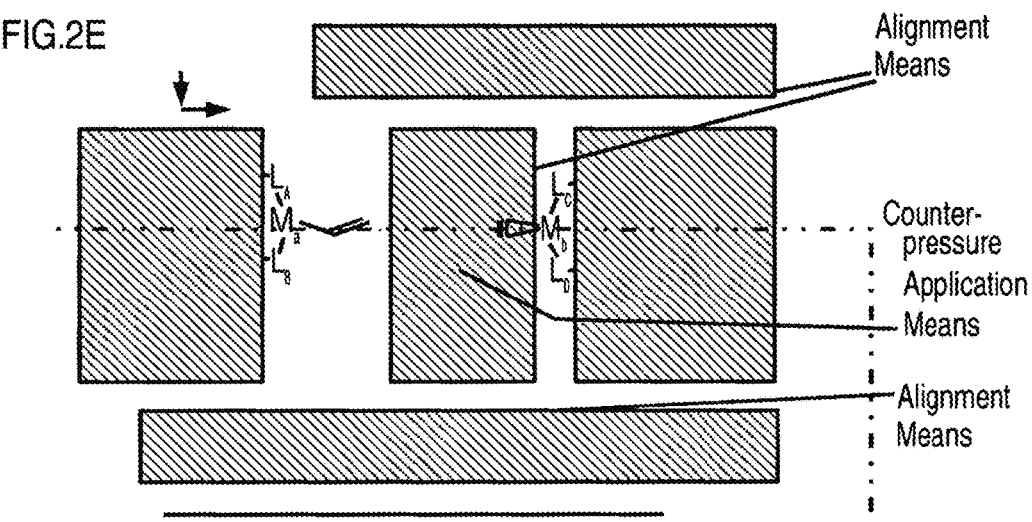
Figure 2F:
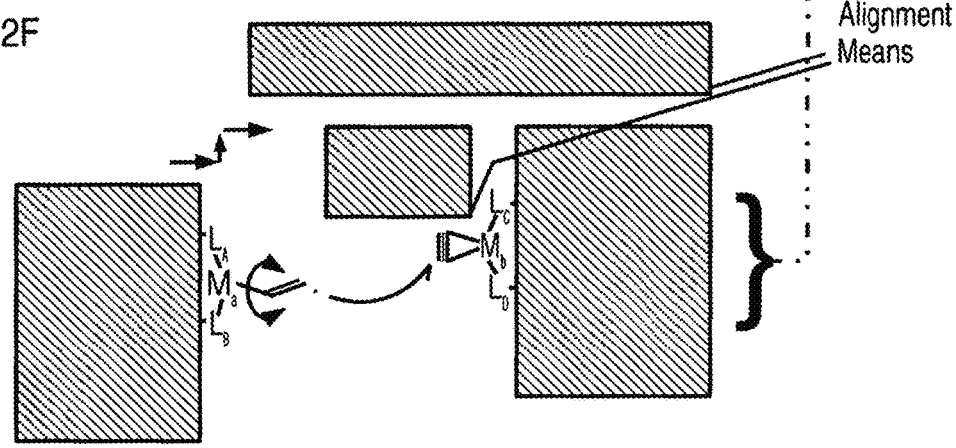
Figure 2G:
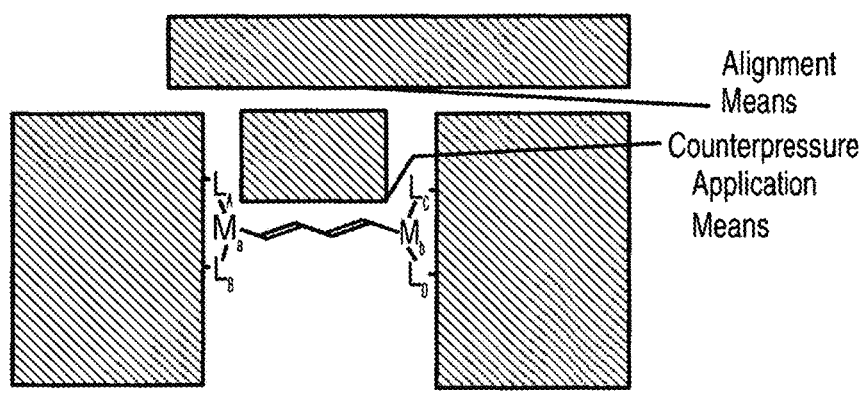

The present invention features methods and means for nanofabrication and convergent assembly applicable to a broad range of materials and which may be adapted to fabrication of nanoscale objects and molecules as well as microscale and macroscale objects and bulk materials; assembly of objects thus fabricated into multicomponent objects, devices and systems is likewise accomplished when bonding steps are selectively omitted. In particular, an important feature of aspects of the present invention is that systems for performing convergent fabrication and convergent assembly may themselves be fabricated and assembled largely or completely by the same methods which they are designed to perform. Automation, and either programmable control (e.g. by control of operations by a programmable computer system) or sense-response state-machine operation may reduce or eliminate requirement for labor inputs for system or desired end-product production. Further, methods and means for processing raw materials into working materials to produce basic components or working materials are provided, and may likewise may largely or completely be realized in devices, subsystems or systems fabricated and assembled similarly, so that self-replication of construction systems is enabled. The manufacture of a wide array of other products, similar in type or function to those already in use, or improvements thereof, all at greater economy than according to prior art due to the integration of processes, arbitrary scaling of productive means, automated control (usually programmable) and improved quality enabled herein by this combination. The methods and means of the present invention may be adapted and applied to a very large subset of all material products, from nanoscale devices including information processing devices and nanocybernetic systems, to medical robotics (and sensors and diagnostics including implantable or injectable versions thereof), to agricultural robotics (especially operatively coupled to or operating within the same system as means for providing irrigation and fertilizer, e.g. water desalination means and nitrogen fixation means, and also especially growth substrates or matrices), to energy conversion and storage systems, to architectural structures and infrastructure, to transportation systems including submarines, watercraft, aircraft and spacecraft, as well as systems for environmental restoration and modifying the climate of wide areas including also extraterrestrial bodies and planets.

Also, additive nanofabrication methods extending and improving those of my earlier work are disclosed herein, and may be utilized as fabrication methods and means for many of the applications herein. U.S. patent application Ser. No. 12/070,489 by the present inventor, filed on 18 Feb. 2008, and references cited therein, and Provisional U.S. Patent Application Ser. No. 60/901,966, filed 18 Feb. 2007 by the present inventor, and references cited therein, are incorporated herein by reference.

As in those disclosures, novel fabrication methods and means of the present invention are applied to the fabrication and assembly, generally under automated and especially programmable control, of both systems therefor (capability replication) and also desired products, generally operatively coupled to means for processing raw materials into feedstocks for fabrication and generally operatively coupled to means for conversion of energy especially ambient sources of energy such as solar irradiation, fluid motion such as wind or wave energy, and/or thermal gradients (e.g. of geothermal origin, due to nuclear decay, or from thermal energy stored in thermal energy storage means). Systems comprising fabrication means, materials processing means and energy conversion means, capable of producing systems comprising fabrication means, materials processing means and energy conversion means and also capable of producing a predetermined desired product.

Also in elaboration of [Rab08], systems for performing fabrication and/or materials processing and/or energy conversion may be fabricated by either or both atomically precise methods or conventional bulk fabrication techniques or combinations of both. A most preferred class comprises the precise nanofabrication of masters which are replicated by known replication techniques such as casting, molding, die pressing, imprinting or the like, using bulk materials including but not limited to ceramics, sintered materials, metals, metal alloys, elastomers, polymers and resins, where desired structures admit fabrication thereby. [Rab97] included a plurality of methods and means for the foregoing and along with references cited therein is incorporated herein by reference. A preferred class of embodiments of the present invention is fabrication and assembly systems comprising means for fabrication via positional chemistry (e.g. positional mechanosynthesis or precise nanofabrication) and means for bulk fabrication. A further preferred class of embodiments of the present invention is fabrication and assembly systems of the foregoing type further comprising means for processing raw materials; more preferred embodiments of this latter class include systems capable of taking in raw materials or pollutants found in the environment, especially either by capture from a fluid stream or by retrieval using grasping or digging means. Additionally, any of the foregoing systems may be used to produce functionally similar systems using only bulk fabrication techniques, which are likewise embodiments of the present invention. A further preferred class of embodiments of the present invention is any of the foregoing further comprising means for concentrating solar radiation for providing thermal energy to one or more materials processing operations, including but not limited to melting operations, boiling or vaporization or distillation operations. A further preferred class of embodiments of the present invention is any of the foregoing, with or without solar energy concentrating means further comprising means for converting the energy of a flowing fluid (e.g. wind energy or wave energy) into electrical energy and/or mechanical work; a preferred subclass of embodiments of the latter class further comprises means for capturing a component of or pollutant occurring in a fluid inflow stream or portion thereof; a preferred subclass of embodiments of the latter subclass further comprise means for causing a transformation of said component or pollutant into a more desired or at least sequestrated form. Additionally, systems according to the preceding subclass but without means for converting the mechanical energy from said fluid inflow stream are embodiments of the present invention.

In the limited prior art of self-replicating systems, different approaches have been taken to the handling of precursor components or materials, particularly pick-and-place from components on a surface presented to assembly means in both [Rab97] and [Mer03], or retrieval from storage locations by fabrication units which may also perform joining operations in [Col97] and [Mos00]. Although such approaches may be taken utilizing the bonding operations or chemistries disclosed herein and in [Rab08], the combination of materials processing means applicable to raw materials with fabrication and assembly means favors as preferred embodiments direct conveyance of precursor materials to fabrication or assembly means, without intermediate storage, and convergent bonding or assembly of intermediate products without storage, i.e. parts are most preferably transferred directly from one assembly means to a subsequent assembly means, preferably but not necessarily with concurrent bonding to or assembly with another part or intermediate assembly. Conveyance of precursor materials or feedstocks to fabrication or assembly means may be by conveyor chains or belts or conduits or alternatively or additionally via a plurality of manipulators situated along a path in bucket-brigade-type operations, and intermediate products or intermediate assemblies may similarly be conveyed according to the foregoing from one part of a fabrication and assembly system to another. Concerning use of ambient materials for production of self-replicating systems, first suggested in modern times by [Moo58] and aimed at in [Col97], no published accounts of successful implementation of operative artificial self-replicating systems collecting and using environmentally occurring raw materials for construction of self-replicating systems have been found as of this writing.

In contrast to the limited prior art of systems aimed at such capabilities, the most basic structural components fabricated according to the simplest embodiments of the present invention are simple polyhedra such as prisms, pyramids, parallelipeds and cubes, although a vast range of sets of three-dimensional solids (or their geometric idealizations) capable of tiling into desired target shapes may be used; accordingly a critical obstacle faced in the few concretely proposed self-replicating systems is avoided, as is the need for any specialized capital equipment for many embodiments. In addition to simplifying basic components, means for processing, fabricating, manipulating and assembling components are simplified, and methods comprising simple operation rules are provided to overcome limitations of prior art. Control over passivation and bonding is exerted in a variety of ways according to materials used, construction-system composition, desired product properties and convenience. Tools composed of simple components for performing methods of the present invention are disclosed, as are a variety of modifications and adaptations thereof. Modular design of systems comprising functional subsystems which themselves are means for useful purposes enables a class of replicating systems which are not programmable in the ordinary sense but nonetheless produce useful products; fabrication and assembly of subsystem modules may be conducted in ratios other than those strictly required for self-replication (whether under conditional control of a switch or external stimulus received by the system, or as an invariant consequence of mechanistic design) with surplus modules thus available as useful end products. Included are methods and means for fabricating such polyhedra from simple organic or inorganic compounds which are readily available.

Herein, materials are fabricated into desired structures or bodies, and operations for such fabrication may include convergent assembly operations novel to the present invention, and such structures or bodies may then be assembled together with other such structures or bodies into devices, subsystems, modules or systems. The foregoing uses a definition of fabrication akin to that in the field of microfabrication, where structures or bodies are produced from input materials where the goal of a fabrication step is to add or remove material from said structure or body, which is distinguished from assembly operations, which translate distinct components or bodies relative to each other without necessarily fusing these. Convergent assembly may be used either to fabricate a body comprising a material or to assemble distinct components into a device, depending on whether fusion or bonding occurs; distinct parts of a mechanical watch, for example, if they are not fabricated in situ as in MEMs fabrication from a monolithic wafer, must be assembled together such that the desired articulations occur in the final product, but must not be fused. Fabrication involves changes in chemical bonds whereas generalized assembly need not; in this respect, bonding or fusion of bodies by convergent assembly according to embodiments of the present invention is properly fabrication, whereas assembly together of distinct parts which remain distinct bodies after assembly is properly assembly even when the manipulations involved are superficially similar; for example, it would be possible to fabricate a silicon wafer or a magnesium oxide crystalline prism according to the present invention via convergent assembly, such that it would be difficult or impossible to distinguish which silicon atoms arose from different components, and (apart from relative perfection) it would likewise be difficult to know that these arose from convergent assembly rather than some other crystallization process, while parts of a mechanical assembly like a mechanical watch are readily distinguished. Fabrication via convergent assembly according to the methods presently disclosed permits the rapid and efficient and precise fabrication of structures, which may additionally be assembled together via similar types of operations without the formation of chemical bonds whereby mechanical assemblies may be produced; accordingly, similar or identical means and similar processes may be used to accomplish both fabrication and assembly processes in the course of producing final products from raw materials or feedstocks.

One example of a subsystem or module useful in a self-replicating system which processes raw materials present in input feeds or intake streams into materials for fabrication of components and assembly thereof into useful devices and systems, (whether limited to being like systems and/or subsystem modules thereof or instead producing products according to fabrication and assembly programs [which programs may further be modifiable] or according to other methods and means of specification and control) particularly suited for operation in aquatic or marine environments, is a module for separation of particles and dissolved materials from an input solution or inflow thereof, such as a distillation module. A distillation module may be fitted with one or more pumping and filtration means and comprise a chamber for collecting filtrate and eluate, preferably thermal regeneration means such as a counterflow heat exchanger, a distillation chamber, energy delivery means, condensing means (such as a condenser coil) a condensate collection chamber or distillate collection means and preferably also a valve between said distillation chamber and said condensing means. Preferably, said energy delivery means may be solar energy concentration means such as a curved reflector, a lens, a fresnel lens or a fresnel reflector, or combinations thereof, preferably aimed by tracking means, preferably arranged so as to deliver concentrated solar energy to an absorber such as a black-body situated near the surface of the liquid to be distilled (e.g. submerged in said liquid to be distilled or alternatively integrated into one or more walls of said distillation chamber.) Alternatively, said energy delivery means may be heat transfer means such as a thermal conductor, such as a heat pipe or more preferably a loop heat pipe for transferring heat from a different process of the system such as the crystallization of a melt or an exothermic chemical reaction or some other heat generating process. Preferably, a distillation module may further comprise pressure reduction means for reducing the pressure of liquid to be distilled such that the boiling point thereof is slightly depressed; vapor so obtained is then pumped to a condensate collection chamber, where preferably, during repressurization, negative differential pressure contributes to pressure reduction of the distillation chamber for further vaporization, whereby some of the energy for pressure reduction is recovered form condensing vapor and reused. Most simply, a dual-acting piston pump between said distillation chamber and said condensate collection chamber which reciprocates (with check valves or reed valves enforcing vapor flow direction from said distillation chamber to said condensing means) to reduce the pressure of the distillation chamber while compressing the contents of the condensate collection chamber (note that other expansion-compression means or pumping means may substitute as equivalents.) Preferably, mechanical energy for driving said piston is provided by a heat engine heated either by thermal energy from another process of the self replicating system or by solar energy, preferably concentrated either by the foregoing solar energy concentration means, similar solar energy concentration means or different solar energy concentration means as those used for providing thermal energy to evaporate water. A preferred embodiment comprises a heat engine comprising structural members composed of high temperature ceramic or refractory material (e.g. MgO) preferably comprising protective layers (e.g. graphite or graphene); if produced by the nanofabrication methods of the present invention or equivalents, these may be atomically flat and oriented for superlubricity of sliding of similarly coated bodies, e.g. solid superlubricated sliding, e.g. of a piston ring and an engine chamber or cylinder, and utilizing a noble gas working fluid (e.g. argon), preferably situated in an enclosure which is evacuated or filled with an inert gas, preferably a noble gas, (more preferably argon) the foregoing enabling high temperature operation (when protected from gases reactive at high temperatures such as $O_2$, $H_2O$ by said enclosure, limited only by working strength at temperature and formation of carbon monoxide from reaction of MgO and carbon, which should not be appreciable below about 1500K, with higher operating temperatures being likely achievable) and hence improving efficiency; preferred absorbers for conversion of incident light to thermal energy include carbon black, soot, graphene polymers, carbon nanotubes, aligned carbon nanotube thick films. Preferably, MgO materials may be reinforced by the inclusion of carbon nanotubes or graphene fibers to form a composite, especially by co-assembly thereof according to an aspect of the present invention. Heat engines comprising MgO:C composite and graphene coated MgO structural members enable operation at higher temperatures than most conventional engines comprising conventional alloys and especially using reactive working fluids or internally combusted fuel, and so enable improved thermodynamic efficiency, a further advantage being that this result is realized using abundant materials. Alternatively still to composites comprising MgO, heat engine structural members fabricated according to one or more methods of the present invention and/or included in a system embodying devices of the present invention may comprise structural members composed of pure or modified graphene, or or composites of graphene and other refractories, including but not limited to graphene and TiC, graphene and VN, graphene and HfC, graphene and TaC, graphene and $Hf_xTa_yC$, graphene and ScN, graphene and TiN, graphene and ZrN, graphene and ZrC, graphene and one or more halite-structured material, where the term composites may also denote graphenoid coatings on a body of the corresponding material (e.g. graphenoid coated TiC, etc.) or combinations of the foregoing, or of refractory metals such as tungsten which may optionally additionally be coated with one or more graphenoid layers, or of refractory materials such as sintered or nanofabricated beta-SiC which may optionally additionally be coated with one or more graphenoid layers; these materials lacking oxygen atoms in contact with unoxidized carbon avoid the foregoing limitation of the MgO:C composites due to CO evolution at elevated temperature and so permit higher operating temperatures; all of the foregoing facilitating improved efficiency through high temperature operation. Alternatively, extruded carbon may be used as a structural material for such heat engines in inert surroundings with inert working fluids, or alternatively graphene materials fabricated and assembled according to the present invention may be used. Preferably, such a heat engine pumps heated working fluid to a heat exchanger, preferably a countercurrent heat exchanger with compression for heat ejection, with low grade ejected heat recovered and used for some other purpose, e.g. water distillation, or stored in heat storage means for later use, e.g. to continue distillation when solar irradiance is insufficient. More preferably, a heat engine according to the foregoing comprises pairs of chambers or cylinders each featuring pairs of pistons (e.g. in an opposed piston arrangement, although other arrangements are possible) which also may occlude ports whereby piston controlled valves are realized; each of the pair of chambers or cylinders are connected together via a conduit from a valve to a counterflow heat exchanger to a conduit to a port of the other chamber or cylinder, whereby, following a work stroke, a piston is translated to open a valve, working fluid is pumped by engine compression through said heat exchanger where heat is removed and exchanged to working fluid flowing into the other chamber or cylinder of the pair, where further thermal energy is received and the complementary cycle completed. (Alternatively, heat arising from some other process of the self-replicating system is used to power said heat engine, especially when solar irradiance is insufficient, or other sources of mechanical energy may used instead of a heat engine, such as a wind-driven turbine, a wave-driven turbine, a flow-driven turbine, an electrical motor, etc.) Work, e.g. from the foregoing heat engine, powered by solar energy or waste heat from some other process, drives vapor expansion and vapor compression means for facilitating efficient distillation. Differential pressure caused in the foregoing arrangement enables the recovery of the heat of vaporization from condensation at a higher temperature and exchange or flow of this heat to said distillation chamber, still at a temperature equal or above that of vaporization (at the reduced pressure) whereby overall entropy may be minimized. In combination with efficient heat exchange between inflow liquid and outflow distillate, energy required for distillation may be significantly reduced; further, since the entire process may be powered with thermal or solar energy, which need not experience transmission or conversion losses, the foregoing class of distillation module, produced by the operation of a self-replicating system and accordingly itself inexpensive, enables the provision of potable water at significant economic advantage. Distillation may be partial or complete, depending on whether it is desired to recover salts or other solutes and in what form. The greater the extent of completion to which distillation is conducted will entail a corresponding boiling-point elevation for remaining liquid, so to permit minimal entropy operation with maximal reuse of heat of vaporization, distillation pressure is progressively reduced during subsequent depressurization-repressurization cycles without additional intake of liquid, whereby the boiling temperature is maintained below the condensation temperature in spite of increasing solute concentration. Filtration, especially using filters prepared by nanofabrication according to the present invention or equivalent methods (e.g. carbon nanotube-array-based filters where flow it through the interiors of close-packed aligned nanotubes have been found to exhibit low mechanical resistance to flow, and so further favor energy efficiency) prior to distillation, as well as exposure to ultraviolet radiation in the course of solar distillation yields a process for purifying water to the most stringent purity requirements.

Further, where intake liquid is seawater or salt-water, and where distillation is completed rather than partial, salts and residues may be recovered for potential use. Where recovered material comprises elements or compounds useful as material or raw materials for fabrication, these may advantageously be recovered, processed and used or stored by a self-replicating system or a module therefor or delivered for transfer to other systems. For example, salt residues from seawater comprise magnesium, which may be separated or purified as in methods of established art implemented by a module or subsystem of a self-replicating system, and processed to magnesium oxide by bulk processes (e.g. by precipitation of magnesium ions with hydroxide or carbonate anions, calcination of magnesium carbonate intermediate and then either sintering or melting thereof, e.g. by an electrical arc, arc furnace, or submerged arc furnace, for bulk fabrication of MgO materials, which may then be cleaved or cut and polished into polyhedra such as parallelipeds or cubes, or in the case of sintering pressed at elevated temperature into masses such as bricks or other geometrical solids defined by press geometry) which may then be assembled and bonded together (e.g. via bonding agents, adhesives, polyelectrolytes [e.g. polycations, or polyanions, as in nacre] surface modifications comprising mutually reactive chemical functionalities, energy absorbing surface modifications whereby incident energy such as actinic radiation, infrared radiation or microwave radiation may be converted to surface localized heat whereby adjacent surfaces may be annealed together, electrified electrically resistive networks for causing local heating whereby adjacent surfaces may be annealed together, surface deposition of other materials [e.g. calcium, iron, nickel or manganese, for MgO] capable of forming a eutectic [preferably also capable of diffusing into the bulk material after annealing and bonding whereby local concentrations of elements admixed thereby are reduced] etc.) to yield desired structures, or alternatively by nanofabrication methods (e.g. magnesium cations may be bound by ligands [e.g. exchanged for counterions] said ligands bound or linked to structural members for manipulating said ligands, said structural members preferably in communication with positioning means, for positional nanofabrication of MgO materials. MgO in particular features a high melting point (as a refractory) as well as transparency to a relatively broad portion of the visible and infrared spectrum for the crystalline material, making this material suitable for both optical and structural components of solar-thermal systems, and further for structural members or means for devices useful for performing other high-temperature processes; additionally, as regards positional nanofabrication of structures of this material, the halite lattice (rocksalt or B1 lattice) features three orthogonal (100) surfaces which in general do not reconstruct and are capable of direct surface bonding, is conceptually simple and easily visualized by untrained designers, lends itself to the fabrication of orthogonal structures, and shared by a wide range of other materials, such that fabrication methods and operation sequences therefore may be adapted as well to these. Optical surfaces exposed to moisture are preferably coated with a sealant or protective layer to prevent damage; suitable coatings include films or thin films of polymethylmethacrylate, polyhexylmethacrylate, polyallyl, polystyrene, polyacrylonitrile, vinyl polymers, polyvinylidene chloride, polyvinyl chloride, polytetrafloroethylene (especially further comprising chloride containing monomers or modifications for enhancing bonding to magnesium) corundum or aluminum oxide, silicon dioxide, or other protective coatings known in the arts. Further functional coatings such as antireflective coatings are fully within the scope of the invention. Additionally, self-assembled monolayers may serve to provide similar protection; various calculations (not shown) predict stable adsorption of ether oxygens (e.g of 7-oxo-[2.2.1]-bicycloheptane and the corresponding polyfuran Diels-Alder oligomers) although any compound stably forming self-assembled monolayers on MgO surfaces (or in general other metal oxide, metal nitride, transition-metal oxide, transition metal-nitride or other related material surfaces) may be used to provide varying degrees of protection or impart other desired surface properties such as lubricity, passivation, hydrophilicity, hydrophobicity, etc. Surfaces exposed to corrosive environments not requiring transparency may be coated with other protective materials, including carbon films (one example being that film produce by heating MgO under a carbon dioxide atmosphere) which may provide high durability and low friction surfaces, especially suitable for use with solid lubricants such as polyaromatic lubricants or graphite-based lubricants.

Materials of this class include TiC, ScN, MgS, MgSe, MgTe, CaO, SrO, BaO, CaS, SrS, SrSe, SrTe, BaS, BaTe, beta-AlN, NiO, FeO, TiO, MnN, MnO, MnS, MnSe, YN, ZrN, ZrC, HfC, TaC, NdN, NdP, VN, V—N, VC, epsilon-VC, VO, CrN, CoO, EuS, AgF, AgBr, PbS, PbSe, PbTe, SnAs, NdAs, PrAs, LaAs, As, CdO, LaBi, CaNH, SrNH, BaNH, KH, KF, KCl, KBr, KI, KCN, RbH, RbCl, RbBr, Rbl, LiH, LiF, LiCl, LiBr, LiI, NaH, NaCl, NaBr, NaI, $NH_4I$, Thus a variety of materials featuring a wide array of electronic, semiconductive, mechanical, thermal, optical, photoluminesent, magnetic and spin, catalytic, chemical, surface and other properties may be fabricated and assembled with nanoscale accuracy and also precision doping according to the present invention; applications include hydrogen storage in the form of the above listed hydrides or amides, storage of hazardous materials including As, Pb, Cr, Cd and CN (especially where these are doped into or encapsulated by other materials for preventing dissolution or diffusion of hazardous constituents from such a storage body, preferably where two or more protective coatings or layers are applied, preferably where protective materials and hazardous materials are fabricated into a cellular structure whereby any damage to a protective material will only permit the escape of only a small fraction of hazardous materials, so, for example PbS or SnAs may be fabricated into nanosized cubes of a size to limit lattice mismatch with NaCl [used as a primary coating] which is further encased in MgO of a thickness to resist high temperatures] which is further encased in a solvent resistant material or multilayers of materials imparting resistance to multiple solvents or liquids, e.g. diamond and/or polymethylmethacrylate or other polymeric resins in a hierarchical structure designed to provide protective encapsulation against any range of anticipated environmental assaults or internal chemical or physical processes; similar protective structures of this class of embodiments may be straightforwardly applied to protective storage of other materials including hazardous materials including non-halite materials and also materials collected from the environment such as pollutants, including but not limited to chemical wastes, nuclear wastes, environmental toxins and toxic trace elements, occurring as they may as particles or colloids, the foreogoing groups of materials preferably being handled by the binding of one or more ligand in communication with a structural support or tether, which in various embodiments may in turn be in communication with positioning means or alternatively said structural support may be the body or surface of one of the foregoing or a similar protective material, e.g. intermediate to the construction of a cellular structure.) Fabrication and assembly of such a wide range of materials enables improvements in a vast range of technological applications as well as new applications, and also efficient utilization of a broad range or raw or reclaimed materials, the construction of systems useful for a far broader range of material processing than possible heretofore, particularly in self-replicating or allo-replicating systems or modules therefore, and also atomically precise fabrication of complicated devices capable of operating in quantum regimes (e.g. spintronic devices featuring heterostructures of ScN with Mn doped ScN, including quantum dot or quantum wire type structures, useful for information processing, information storage, spintronic devices, display devices, photovoltaic devices, etc.)

Although MgO is a preferred material for general structural purposes, high temperature applications and optical applications, various processing, fabrication, manipulation, bonding and assembly methods disclosed and/or combined herein, as well as devices, subsystems or systems for performing same, may also be applied to other materials including other halite structure materials, other binary oxides, other binary materials, adamantine materials and still other materials. Additionally, direct bonding methods (as applied in the art of wafer bonding, or alternatively or additionally as in the vacuum welding of metal surfaces free of passivating materials) may be applied, especially as taught herein for convergent assembly of halite-structure materials.

Materials of the halite or B1 class include MgO, TiC, ScN, TiN, MgS, MgSe, MgTe, CaO, SrO, BaO, CaS, SrS, SrSe, SrTe, BaS, BaTe, beta-AlN, NiO, FeO, TiO, MnN, MnO, MnS, MnSe, YN, ZrN, NbN, ZrC, HfC, TaC, NdN, NdP, VN, V—N, VC, epsilon-VC, VO, CrN, CoO, EuS, AgF, AgBr, PbS, PbSe, PbTe, SnAs, NdAs, PrAs, LaAs, CdO, LaBi, CaNH, SrNH, BaNH, KH, KF, KCl, KBr, KI, KCN, RbH, RbCl, RbBr, Rbl, LiH, LiF, LiCl, LiBr, LiI, NaH, NaCl, NaBr, NaI, $NH_4I$, AgCl, CeSe, DyAs, GdN, LaP, NaF, PrBi, PuC, RbF, TbTe, UC, YbO, ZrO. although other halite or distorted-halite structural materials (e.g. body centered tetragonal [bct] structures might be viewed as a severe distortion of a halite structure but in some instances would only require small differences in design and in the actual operations performed during fabrication to allow for the structural difference) are entirely within the scope of these aspects of the present invention. Thus, materials include oxides, nitrides, sulfides, carbides, selenides, tellurides, phosphides, arsenides, halides, and hydrides, comprise halite materials comprising three or more elements, comprise elements from transition metals (including early-, middle- and late-transition metals) main-group metals, lanthanides, actinides; these also show the feasibility of including molecular cations (e.g. in $NH_4I$) and molecular anions (e.g. CaNH, SrNH, BaNH, KCN.) Notable desirable properties of materials of the foregoing list include: hardness and/or strength (TiC, ScN, beta-AlN, YN, ZrN, NbN, ZrC, HfC, TaC) thermal resistance and/or high melting point (e.g. MgO, CaO) phospholuminesence (e.g. for nanostructures or quantum dots or quantum rods useful for photonic energy absorption yielding triplet excitons with extended lifetimes for reducing recombination and improving the quantum yield of photovoltaic energy conversion in photovoltaic devices, MgS) catalysis or catalyst precursors (NiO, FeO, TiO, MnO, CaO, VO, as such or with further chemical modification, e.g. in situ, e.g. further oxidation to higher oxides, e.g. as colloids or nanostructures or also preferably on a support, e.g. alumina or more preferably MgO) optical material properties (MgO, beta-AlN, KBr) nuclear properties, (e.g. radiation attenuation, e.g. PbS; or e.g. neutron reflectivity, e.g. ScN) biocompatibility, e.g. for biomedical applications, e.g. implantable devices (TiN, also TiC, and perhaps MgO, or e.g. TiN encapsulated or coated MgO) magnetic material properties (e.g. CrN, Mn doped ScN) semicoductor material properties (e.g. CrN, ScN) metallic conduction (e.g. CrN below 260K) supercoductivity (e.g. NbN, used also in superconducting single photon detection devices) electron emission (SrO, BaO) the foregoing list of useful properties and of the exemplary materials therewith is only illustrative and by no means exhaustive. Many elements comprised in materials of the foregoing list of halite structured materials are variously abundant or relatively abundant in seawater, manganese nodules, volcanogenic massive sulfide ore deposits, black smokers, sediments (ocean, abyssal plane, shore, silt or on land) basalt or rocks, or extraterrestrial bodies, and nitrogen, of course, is abundant in air. Thus a variety of materials featuring a wide array of electronic, semiconductive, mechanical, thermal, optical, photoluminesent, magnetic and spin, catalytic, chemical, surface and other properties may be fabricated and assembled with nanoscale accuracy and also precision doping according to the present invention; applications include hydrogen storage in the form of the above listed hydrides or amides, storage of hazardous materials including As, Pb, Cr, Cd, U and CN among others (especially where these are doped into or encapsulated by other materials for preventing dissolution or diffusion of hazardous constituents from such a storage body, preferably where two or more prodective coatings or layers are applied, preferably where protective materials and hazardous materials are fabricated into a cellular structure whereby any damage to a protective material will only permit the escape of only a small fraction of hazardous materials, so, for example PbS or SnAs may be fabricated into nanosized cubes of a size to limit lattice mismatch with NaCl [used as a primary coating] which is further encased in MgO of a thickness to resist high temperatures] which is further encased in a solvent resistant material or multilayers of materials imparting resistance to multiple solvents or liquids, e.g. diamond and/or polymethylmethacrylate or other polymeric resins in a hierarchical structure designed to provide protective encapsulation against any range of anticipated environmental assaults or internal chemical or physical processes; similar protective structures of this class of embodiments may be straightforwardly applied to protective storage of other materials including hazardous materials including non-halite materials and also materials collected from the environment such as pollutants, including but not limited to chemical wastes, nuclear wastes, environmental toxins and toxic trace elements, occurring as they may as particles or colloids, the foregoing groups of materials preferably being handled by the binding of one or more ligand in communication with a structural support or tether, which in various embodiments may in turn be in communication with positioning means or alternatively said structural support may be the body or surface of one of the foregoing or a similar protective material, e.g. intermediate to the construction of a cellular structure.)

In addition to nanomanipulation of supported ligands as means for performing positional convergent fabrication and assembly, convergent fabrication and assembly may be performed by situating precursors or intermediates adjacent to corners or ridges in relief structures (e.g. as shown at the bottom of FIG. 1P.vii) and facingly juxtaposing two such precursors or intermediates by facingly juxtaposing two such relief structures. Especially for halite structured materials, said relief structures may themselves be fabricated and assembled according to the convergent fabrication and assembly methods taught herein, and so these methods provide for fabricating and constructing means suitable therefor. In a preferred case, exactly one precursor or intermediate (molecule or assembly) is situated on one relief surface. Preferably, relief structures are designed to comprise structures for aligning the relative translation of juxtaposed reliefs for proper registry of contact of precursors or intermediates. Preferably, relative motions of facingly juxtaposed reliefs for contacting precursors or intermediates are chosen to avail alignment for proper registry of contact of precursors or intermediates. Preferably, relief structures or surfaces are passive or passivated to prevent reaction with precursors or intermediates. Optionally, relief structures or surfaces comprise atomic substitutions or decoration with ligands adducted thereto for binding to precursors or intermediates. More preferably number and type of said atomic substitutions or decoration with ligands adducted to relief structure or surfaces for binding to precursors or intermediates are chosen for each relief such that a product of a contacting step for linking or bonding precursors or intermediates or assemblies thereof will be bonded more strongly by one of the two reliefs (see discussion of ligand contest) and therefore retained by that relief to which bonding is more strong and released from that relief to which bonding is weaker as said reliefs are withdrawn from each other.

Alternatively, relief structures may be designed such that contact areas of bound reactants differ, or contact areas of a product to each of the two reliefs differ, such that van der Waals forces attracting a product to each of the two reliefs differ and the relief featuring the stronger interaction with said product thus retains said product as said reliefs are withdrawn from each other. Similarly, precursors or intermediates which are bonded by chemical reactions which may operate in the presence of solvents or instead are bonded by adhesives may similarly be held on a relief by capillary forces, with contact area determining bonding strength, a fact which may be exploited as for van der Waals binding. Finally, additional manipulator(s) may contact products of contacting steps while a first relief is slid relative to the second relief and manipulators and said product of contacting steps where said manipulator(s) obstruct translation of said product with said first relief, whereby product may controllably be retained by a desired relief for subsequent manipulations and/or contacting steps. Most preferably, small articles are fabricated and assembled according to the present invention using supported ligands positioned by nanopositioning means as means for performing positional convergent fabrication and assembly, and products thereof are further used as inputs for convergent fabrication and assembly according to the present invention utilizing relief structures as positioning means, most preferably said relief structures further comprising features for aligning desired registry of contact of precursors at each step, or alternatively so utilized through choice of motions or relative trajectories and points of contact to effect aligning desired registry of contact of precursors at each step. See, for example FIG. 1P.vi for examples of trajectories facilitating desired alignment of registry between precursors of a bonding step by means of alignment by sliding of passivated or nonreacting surface features; additionally, surfaces of relief features of a first relief surface may be slid along relief features of a second, juxtaposed surface for causing aligned, spatially precise trajectories of relative motions of relief surface in the course of translations or motions for performing convergent fabrication and assembly operations of the present invention.

Also of interest for technological applications, halite materials may be fabricated assembled according to the present invention into arbitrary structures useful as left-handed materials or metamaterials, materials featuring negative index of refraction or having unusual electromagnetic permitivities or permeabilities, useful in optical devices and potentially also optical stealth or invisibility. In particular, halite materials and more preferably ScN and Cu coated ScN materials may be fabricated and assembled according to the present invention into three dimensional microstructured or nanostructured bodies with cellular structures such as grid-like structures and gapped-gridlike structures and more preferably still with significant void volume or vias incorporated therein (either open to surroundings or enclosed therein.) Objects to be shielded or obscured from electromagnetic radiation may be shielded by bodies of the foregoing composition or construction, and more preferably may be substantially surrounded by metamaterial structural members of the foregoing composition or construction fabricated and assembled according to the present invention.

FIG. 1 illustrates convergent assembly of rocksalt (halite or B1) structure materials and structures relevant to the understanding thereof. Note that for the special case where products are simple blocks or homogeneous bodies, the process is a fabrication process, while where heterogeneous, aperiodic or precise but irregular structures are assembled, then such a process is an assembly process per se even when assembly results in bonding with the formation of covalent bonds as shown; this relates to the distinction between material masses which might be fabricated by bulk processes and those requiring precise structural control over three dimensional distributions of mater, the later being realized by bonding via convergent assembly including omission of blocks from predetermined positions in a lattice being assembled. The first two panels show the initial and resulting structures if one attempts to bond two $Mg_4O_4$ species simply by positioning these at a separation close to the threshold for attraction to overwhelm repulsion; other calculations with other methods show similar products including products with scission of two additional bonds from the unbroken reactant shown yielding two overlapping perpendicular hexagonal prism structures, and reducing temperature to 8K yielded no significant improvement; AM1 appears to yield a higher estimate of the stabilization of such bond scission products compared to the all-halite structure product compared to higher level calculations (not shown) so selection of AM1 should yield conservative predictions an overestimate the likelihood of these products which would be less suitable as precursors to further convergent assembly if halite structures are desired. All of the dynamics calculations shown here are performed for 80K unless otherwise indicated, but it should be noted that during these and other trajectories, kinetic temperatures may increase by hundreds or even thousands of degrees, and also that final structures shown are believed to correspond to relatively stable structures unless otherwise noted; unless otherwise noted, calculations in this figure are AM1 NVT ensemble MD with Nose-Hoover thermostatting, singlet state, neutral charge, done with cp2k. The next two panels show the effect of adding a physical restraint to the same starting geometry, con-straining lateral motions of atoms undergoing bonding (the cycloeicosa-1,3,6,8,11,13,16,18-octayne macrocycle serving as constraining means held stationary by methylene hydrogens) showing that lateral constraint is effective at preventing or impeding reactant or inter-mediate bond scission. This lateral constraint is a specific example of the more general principle of steric constraint, where firmly held non-reactive barriers (termed barrier members) are positioned or prepositioned to impede unwanted motions of reacting fragments or species. So an aspect of the present invention concerns positioning or prepositioning a steric barrier for preventing motions of reactant or reactant fragment atoms during the course of a bond forming reaction for stabilizing a desired reaction path to form a desired product, especially for reactions for convergent assembly of nanostructures.

The following three panels show two $Mg_2O_2$ square reactants held by 1,3-difluoropropane ligands, each held by the circled hydrogens shown for one ligand in the center panel, representing at least the carbon and fluorine skeleton thereof held stationary by support means used in practice to position and move said skeleton. This starting configuration was chosen in attempt to form an $Mg_4O_4$ cube, but illustrates the reluctance to form fully closed product structures; nonetheless, the process shown is useful for forming planar structures of monoatomic thickness, useful with convergent assembly methods of the present invention for forming films including unsupported films, which in turn may themselves be combined by the same methods to form thicker films with exponential increase in thickness per step (i.e. thickness doubling with each step) the reaction shown shows that planar reactants are less susceptible to bond-scission, and are consistent with a general observation of a preference for 3-coordination over 5-coordination observed in many calculations pertaining to both MgO and other halite materials. The following two panels show ligands which are readily incorporated in the structure of graphene or diamondoid supports, the left being a 1-fluoronaphthalene skeleton and the right being the Diels-Alder adduct of glyoxal with a dehydrogenated carbon surface-dimer of a 2×1 reconstructed diamond (100) surface (which may arise from a preformed diamond surface subjected to hydrogenation and then positional abstractions of hydrogens from a dimer near an edge of a (110) face or step edge, with the adduct structure then subjected to reduction with hydrogen of the resulting double bond, the net result being a dioxane skeleton fused to a diamondoid support, other dioxane and dioxene fusions to diamondoid structures or equivalent structures entirely contemplated within the present invention.) The next panels show, respectively, the AM1 optimum structure ($10^{-4}$ hartree/Bohr) of an $Mg_2O_2$ square bound by two 1-fluoronaphthalene ligands and that structure after 2000 fs at 80K; note the proximity of an oxygen to a ligand hydrogen, which appears to be weakly but consistently favorable and often orients bound reactant fragments in dynamics trajectories; without any restraint, the overall structure tends to retain initial planarity, although this structure later bent; in practice supports would restrain this if the ligand is bound rigidly (i.e. by two or more bonds) to supports, but this still shows the slight to moderate conformational preference of this structure. The following two panels show the optimal structure with 75% van der Waals radii. The following two panels show how two such ligand-reactant complexes are positioned for convergent assembly into an $Mg_4O_4$ cube (the starting structure is two AM1 optimized geometries [105 hartree/Bohr, with PC-GAMESS] and the following structure is of an intermediate in the optimization of that structure) the most important conclusions from this calculation are that the ligands used permit the desired starting configuration, and that there exists a favorable path towards the desired product. The following two panels show two additional types of ligands, fluorine modified (111) diamond similar to the foregoing 1,3-difluoropropane ligands but additionally with a surface carbon substituted by nitrogen to permit the binding conformation shown (this may be produced from a preformed diamond (111) surface from a nitrogen doped sample, by finding a nitrogen substitution site [e.g. via chemical force microscopy or analogous physical interactions or processes] and abstracting hydrogens and fluorinating at appropriate surface sites relative to nitrogen substitutions, or directly by nanofabrication methods according to the present invention) shown also are aromatic moieties (benzene here, representing, e.g. graphene) for serving as lateral constraints, although additional constraints (in front and behind the plane of the page) are omitted for clarity. The resulting structure completely surrounds and constrains the ligand-bound reactants, and for the case of diamond and graphene provides high thermal conductivity paths for conducting evolved heat away from the reaction site, both reducing thermal destabilization of desired products or reaction paths and additionally conducting thermal energy to energy recovery means or exhaust means. The right panel shows a further ligand comprising fluorine, oxygen and hydrogen atoms all of which cooperate to bind a reactant fragment in a desired orientation, energetically distinguishing in particular the configuration shown from binding of MgO only to a fluorine and a hydrogen.

The following panels pertain to the use of dioxane-based ligands to assemble $Mg_2O_2$ squares into an $Mg_4O_4$ cube. Hydrogens circled for one dioxane molecule in the first panel of this series represent atoms which are preferable substituted by support atoms, and all of the ligands in this series would be similarly bound to supports for positioning ligand skeletons, except for the panel immediately to the right of the first panel which shows a configuration at 340 fs with dioxane molecules unconstrained. In addition to dioxane-type ligands, two molecules (in this case 7-aza-norbornane, denoted 7AN) are included to serve as force-applying means to push reactant fragments past an energetic barrier to the desired reaction; in this case the most notable and desirable feature of this compound is the gauche configuration bridging ethyl fragment, suitable for evenly applying pressure to a large fraction of the adjacent reactant fragment; whether this is critical has not been tested but this performed quite satisfactorily so is preferred, but other alkyl fragments or groups or other compounds or materials which may serve to apply required force without causing unwanted reactions or themselves bonding to reactive fragments or their products are entirely contemplated as within the scope of this aspect of the present invention. The third panel shows the configuration after 500 fs at 80K, which is little changed; thereafter, each force-applying means is advanced towards reactive fragments (in one instantaneous 20 pm translation each) which cleanly leads to the desired product, shown at 500 fs and then 3000 fs. The next four panels concern removing a dioxane ligand by pulling, most preferably in the directions indicated by arrows, in the increments listed and times indicated in the legends; a total of 80 pm in the Z direction followed by 100 pm in the X direction were necessary for release. The following two panels show a complexity of such processes, where pulling a ligand only radially away from a centrally bound species (100 pm in the Z direction for the structures shown) results instead in release by the opposite ligand and tilting of the bound product; any planned trajectories involving this type of recoil-induced release should be evaluated carefully both in terms of resulting product orientation and to evaluate the probability of this result for each specific operation, conditions and configuration to be used; it is suspected that there may be sensitivity to variation in velocities and forces. Alternatively, ligands could be translated in the Y direction (for the configuration shown) individually, to shear bonds to bound product, which in that case would be restrained by (7AN) pressure-applying means, until all ligands which are desired to be removed are removed. Thus, there exists a range of methods for removing binding tools or ligands, even ligands with equally strong binding as those retaining bound species, from desired intermediate or product complexes to expose atoms for further bonding steps, especially for bonding steps in convergent assembly according to the methods of the present invention.

The following two panels show convergent assembly bonding of two 8-atom halite structures, here $Mg_4O_4$ cubes, each held by two ligands, here 1,3-dichloropropane, each held by hydrogens indicated for one ligand, as if embedded in a diamond (110) surface. The starting coordinates for the dynamics calculation shown correspond to the separation between reactant atoms only slightly closer than that required for attraction between atoms of the different reactant fragments to outweigh repulsion, i.e. the position where reactant fragments have been pushed just past a reaction barrier; this roughly corresponds to the most preferred case where tool-loaded reactant fragments are caused to react by translating tools whereby reactant fragments are pushed over a reaction barrier towards each other, most preferably with any surplus kinetic energy of reactant fragments at the point of barrier-crossing minimized. Minimization of kinetic energy in the mutual approach of reactant fragments minimizes the energy available to cause reactant atoms to stray onto unwanted reaction paths, such as in the present case, scission or breakage of reactant fragment bonds which are desired to be retained in a product species. The unnecessary thermalization of energy from mechanical work inputs, which wastes operating energy, also might require further energy expenditure to remove from the system or more extensive thermal management means, is also preferable to avoid, increasing the advantage of minimizing the kinetic energy of reactant or reactant fragment mutual approach.

Other calculations (not shown) find this ligand and also chloroethane to both be useful with ScN in related manipulations. The left panel, marked Ofs, shows two optimized structures positioned slightly closer than the repulsive barrier distance; note that reactant fragments are deliberately set partially askew in this calculation to show that some positional error is tolerated by the desired reaction. The right panel shows the product formed, seen 2500 fs after the start of this dynamics calculation. The positioning of ligands in these calculations was chosen to see if tensile restraint, particularly along the axis of approach, could be sufficient to prevent the lateral motions arising from what is in effect a high-speed collision of reaction fragments under their inherent mutual attraction; these calculations thus show that tensile restraint by binding tools (termed binding restraint) in general and by ligand-based or ligand-skeleton-based binding tools in particular is effective at impeding unwanted bond scission and promoting formation of the desired product in a convergent bonding operation, and hence improves convergent assembly methods. Note that greater reliability or reduced error rates is further favored by combining binding restraint and barrier members to favor the formation of desired products by two different, cooperating sets of methods and means. This is conveniently realized by situating binding atoms (e.g. chlorine or fluorines) on tools comprising structural members for serving as barrier means, for example, a diamond nanostructure comprising chlorine or fluorine surface substitutions and a structure which bounds a desired spatial reaction path.

The following two panels show similar dynamics calculation for the 1,3-difluoropropane ligands. For comparison with the previous calculation, the starting structure was obtained by replacement of chlorine atoms in the preceding structure with fluorine atoms, and partial optimization holding the same ligand hydrogens and also medial magnesium and oxygen atoms fixed. (The reasonableness of this was checked by reoptimizing one precursor complex separately, showing a change of less than 1 kcal/mol [which was actually unfavorable, so although the structures at the start of the dynamics calculation are not optima, they may be regarded as favorable intermediates near presumably shallow optima.]) Bonding to MgO fragments by ligand fluorine atoms is tighter than for chlorine-based ligands, and ligand halogen-ligand skeleton bonds appear less flexible (show less stretching and/or bending) for these ligands in these calculations, constrained hydrogens are held with at potential of 20 kcal/A$^2$ (c. 14 N/m initial stiffness, within the range for ordinary covalent solids and also realizable by combining stiffer materials such as diamonds with compliant members or alternatively binding ligands to stiff supports via secondary carbon linkages, etc.) much higher constraining potentials with tightly binding ligands like these fluorine comprising ligands was seen to lead to bonds scission of the desired halite structure for MgO.

Fabrication and assembly of such a wide range of materials enables improvements in a vast range of technological applications as well as new applications, and also efficient utilization of a broad range or raw or reclaimed materials, the construction of systems useful for a far broader range of material processing than possible heretofore, particularly in self-replicating or allo-replicating systems or modules therefore, and also atomically precise fabrication of complicated devices capable of operating in quantum regimes (e.g. spintronic devices featuring heterostructures of ScN with Mn doped ScN, including quantum dot or quantum wire type structures, useful for information processing, information storage, spintronic devices, display devices, photovoltaic devices, etc.)

Convergent assembly according to the present invention may be of a variety of materials which are provided as or fabricated into a variety of precursor shapes or geometrical solids, chosen to permit tiling (e.g. three dimensional tiling) into a desired structure. Among suitable types are: prismatoids: cubes, cuboids, parallelepipeds, frusta, prisms, antiprisms, wedges; prisms: hexagonal prisms, pentagonal prisms, trigonal prisms, square prisms, octagonal prisms, heptagonal prisms; pyramids: square pyramids, tetrahedrons; parallelepipeds: hexagonal parallelepipeds, pentagonal parallelepipeds, trigonal parallelepipeds, square parallelepipeds, octagonal parallelepipeds, heptagonal parallelepipeds; among others, and any combination of the foregoing useful or convenient for the fabrication of a desired product or intermediate. Sets of the foregoing may be fabricated or provided in two or more different sizes, scales or aspect ratios with the composition of such sets preferably chosen to facilitate assembly of the desired product (e.g. enable assembly in a reduced or minimal number of steps.) Of particular note, tools for manipulating or operating on precursors and intermediates assembled from precursors and/or sub-assemblies or assemblies thereof comprise or more preferably consist of assemblies of precursors like those which they are used to assemble. Although certain polygons (trivially a triangle or a rectangle) are recognized in mathematics (tessellation) as being able to be tiled into larger similar shapes, this has not heretofore been extended to physical solids for use in self-replicating systems or assembly systems where assemblies of tiles are used for manipulation of tiles and for causing the bonding together of tiles. In particular, tools for these aspects of the present invention are designed such that reliable operations need not depend on friction, but may avail cohesive or capillary surface interactions, and are or may be caused to be passive to bonding with precursors. Such tools likewise enable fabrication of products or intermediates with voids at predetermined locations (useful, e.g. for forming conduits, channels, capillaries or pipes or vias) and for forming arbitrary tilings of different materials.

A wide range of useful materials have cubic crystal structures, which are easily visualized and so are taken as a non-limiting prototype example for illustration of the convergent assembly methods and means disclosed herein; halite structured materials (B1 crystal structure) represent the simplest case of this class, and such materials include NaCl, MgO, CaO, BaO, SrO, MgS, CaS, TiC, HfC, TaC, Hf$_x$Ta$_y$C, ScN, TiN, and VN, among others.

For illustration of the foregoing, positional nanofabrication of MgO materials is considered; MgO is of special interest due to the abundance of both Mg and O both in seawater and the Earth's crust and mantle as well as in rocky planets and asteroids, the high melting temperature of this material, high heat capacity and desirable optical properties (transparency of the crystalline forms of this material and reflectivity of powdered, precipitated or nanostructured forms of this material.) Briefly, magnesium atoms or cations are permitted to associate with ligands, at least some of which are bound or linked to one or more structural members; preferably, at least one ligand is removed, withdrawn (by withdrawing a first structural member to which a first ligand binding a bound species is linked or bound from a second ligand [which may be of similar or different composition of structure as said first ligand] also binding said bound species, said second ligand linked or bound to a second structural member, whereby said first and said second ligand are pulled apart, a process here named a ligand contest, reducing the degree of coordination of at least one atom of said bound species, with retention determined by the composition and hence relative binding strength of ligands being pulled apart, or alternatively or additionally in the case of three or more support-bound ligands binding a bound species, the number of support-bound ligands remaining together and the aggregate relative binding strength thereof versus the number and aggregate relative binding strength of one or more ligands bound to one or more structural supports being withdrawn) or exchanged or displaced; one equivalent of hydroxide (in free form or bound to a tool) is permitted to associate with a ligand bound magnesium cation, and then deprotonation is effected by a base tool (e.g. a molecular tool comprising a negatively charged acetylide function [deprotonated ethynyl group]) which is contacted with the hydrogen of said hydroxide, to yield ligand-bound MgO; ligand-bound MgO may then be contacted either with a second ligand-bound MgO molecule or with a larger MgO structure, whereby either convergent-type fabrication or assembly may be conducted (with selective removal of predetermined ligand molecules from workpieces via translation of structural members to which said ligand molecules are attached during a fabrication or assembly process) or depositon-type fabrication onto workpieces (analogous to diamond mechanosynthesis via carbon dimer deposition.)

Suitable ligands include derivatives of: o-quinone, catechol, ethylene glycol, ketones, organohalides, alkyl halides, chloromethane, 1,2-dichloroethane, 1,3-dichloropropane, 1,3-difluoropropane, 1,3-dihalocyclopentane, 1,3-dichlorocyclopentane, 1,3-difluorocyclopentane, 1,3-dichlorocyclohexane, 1,3-difluorocyclohexane, 1,3-dihalocyclohexane, 1,3,5-trihalocyclohexane, 1,3,5-trifluorocyclohexane, 1,3,5-trichlorocyclohexane, pentane-2,4-dione, benzene (as an eta-1 through eta-6 facial complex) polyphenyls, phenol, pyridine, 1-fluoronaphthalene, 1,10-difluoronaphthalene, fluorobenzene, 1,2-difluorobenzene, 1,10-dichloronaphthalene, 1-chloronaphthalene, chlorobenzene, 1,2-dichlorobenzene, polyaromatic hydrocarbons, nitrogen substituted polyaromatic hydrocarbons or reduction products thereof, alcohols, dihydroxy compounds, thrietol, erythretol, 1,2-dihalobenzenes, hydroxamic acids, ligands comprising one or more carboxylates, amines, phosphines, nitriles or cyanates, organothiols, organoselenates, as well as other ligands used (at present or future times) in the arts of organometallic chemistry susceptible to bonding or linkage to any useful structural member and useful for binding one or more reactant atoms. The foregoing is to be understood broadly; for example, a structure with two hydroxyl functions situated in sufficient proximity on a diamond, diamondoid or polymantane surface, e.g. on adjacent dimers on a hydrogenated (2×1) reconstructed C(100) diamond surface may comprise the 1,3-propane-diol skeleton, suitably arranged for use as a ligand (preferably in this case nitrogens may be substituted to at least the proximal position of the neighboring colinear dimers to both cooperate with binding and also permit deprotonation of hydroxyls without subsequent intramolecular deprotonation of adjacent tertiary carbons, an unfavorable basic reaction which might, however, occur due to proximity.) Similarly, a hydrogenated (111) diamond surface may have two adjacent hydrogens substituted by fluoromethyl groups whereby the resulting structure comprises a 1,5-fluoropentyl skeleton, useful as a ligand bound to a structural member; likewise for the hydrogenated unreconstructed (111) diamond surface, two adjacent surface hydrogens may be abstracted (e.g. with an ethynyl radical tool for hydrogen abstraction) and then exposed to fluorine gas ($F_{2(g)}$) or another fluorine atom donor species (e.g. diethylaminosulfurtrifluoride [$Et_2NSF_3$] $SiF_4$, $CoF_3$, $AgF$, $AgF_2$, $SF_4$, any alkyl-amineosulfurtrifluoride or alkyl-amineosulfurtetrafluoride or related selenium or tellurium compounds, azahexane-N-sulfurtrifluoride etc.) to yield a surface bearing a 1,3-difluoropropane skeleton (or equivalently a 1,3-difluorocyclohexane skeleton) embedded in said unreconstructed (111) diamond surface; the 1,3,5-trifluorocyclohexane skeleton embedded in the unreconstructed (111) diamond surface is likewise realized by abstracting three surface hydrogens from the same six membered carbon ring comprised by the (111) surface, to yield another particularly useful surface embedded ligand. Similar modifications may be done to polymantane molecules or nanostructures, or adamantanes, or other hydrocarbons or organic compounds to yield the desired ligand in communication with a structural member, preferably although not necessarily with fixed relative orientation. Note, however, that halide substitutions to tertiary carbons are preferably avoided (other than in the case of fluorine, which dissociates very slowly) due to the possibility of SN1 reactions, although in less preferred embodiments these may still be used with periodic regeneration of the tertiary halide by contact with, e.g. a salt comprising the corresponding halide or a solution comprising the corresponding halide anion. Such ligands disclosed herein are also useful for binding organic precursors, feedstocks or reagents, into complexes with supported ligand-bound metals, including for the positional mechanosynthesis of diamondoid and graphenoid materials, by methods taught in [Rab08] and also disclosed herein.

As another simple example, an aqueous solution of $MgCl_2$ is contacted with the Diels-Alder syn bis-adduct of dioxin ($C_4H_4O_2$) with benzofuran (or o-xylylene, e.g. via photolysis of benzocyclobutane) terminated polyacene, graphenoid, polyaromatic or polyheterocyclic structural members, whereby a dioxane fragment bound to a structural support is permitted to bind a magnesium cation, and withdrawn from said aqueous solution. Preferably, anionic functional groups on structural members are colocalized with said dioxane fragment during withdrawal from said aqueous solution to maintain electrical neutrality, although this may not be strictly required. For the case of concentrated solutions, it is likely that dioxane fragment-$MgCl_2$ complexes will be obtained, while dilute solutions are expected to mainly yield aqua complexes. In the former case, the complex is contacted with NaOH to yield dioxane fragment-$Mg(OH)_2$ and NaCl (which is washed away) dioxane fragment-$Mg(OH)_2$ is protonated, contacted with a dehydration reagent (e.g. $P_2O_5$ or substituted $P_2O_5$ bound to a support, e.g. $RP_4O_9$ where R is a support linked to phosphate via, e.g. a carbon atom thereof) to remove water, one equivalent of hydroxide, and a strong base tool (e.g. an acetylide anion) to remove a proton, yielding a support-borne dioxane fragment-MgO complex. In the later case, coordinating waters may be removed by contact with another cation, or the formation of aqua complexes may more preferably be avoided by fully coordinating the magnesium cation with multiple support bound or tethered ligands as outlined in the foregoing description of ligand contests, then reacted with one equivalent of hydroxide and deprotonated to yield the same support-borne dioxane fragment-MgO complex. As a simple convergent positionally controlled reaction, two support-borne dioxane fragment-MgO complexes are contacted to yield an $Mg_2O_2$ square bound by two support-borne dioxane ligands, useful as a precursor for further fabrication of larger MgO bodies such as sheets or cuboids, or as a precursor for assembly of heterogeneous structures.

A further example of a ligand in communication with a structural member is an oligo-p-phenylene or poly-p-phenylene molecule (1,4-oligo-/poly-phenylenes) having one or more phenyl units substituted at phenyl ring positions 2 and 3 by hydroxyl to give a catechol unit, or the same oxidized to quinoid form to yield an o-quinone unit; these examples represent substitution of a ligand monomer into an oligomer or polymer serving as a structural member. Preferably structural members of these embodiments are in communication with positioning means for controllably positioning or translating ligands for controllably positioning or translating ligand-bound species relative to a workpiece or other ligand-bound species. Note that greater positional control versus phenyl rotation may be realized by further derivatizing catechol or quinone units, e.g. at positions 5 or 6 with further structural members, such as a further oligo-p-phenylene chain itself either in communication with separate positioning means for controlling the rotation of said catechol or quinone unit, or fixed relative to the main polymer backbone for fixing the rotational orientation of said catechol or quinone unit. Alternatively, structures such as 4,5-bis(oligo/poly-p-phenylene)-benzene-1,2-diol (optionally bearing solubilizing groups) may both position and constrain the rotation of catechol or quinone units (i.e. the catechol or quinone unit in this case is at the apex of angularly disposed poly-p-phenylene chains, projecting oxygens at a vertical angle to the angle formed by the poly-p-phenylene chains.

Note that the foregoing may be applied to metals or cations other than magnesium, such as transition metals or other main-group metals, often affording binding selectivity, for example, iron with catechol or tiron derivatives, phosphines with palladium or nickel, amines with copper, etc., as known in the associated arts. Where structural members comprising ligand skeletons or to which ligands are linked or bound are electrically conductive or semiconductive, or alternatively or additionally, ligands (with or without bound species according to the specific case) are contacted with reducing agents, or alternatively or additionally, a workpiece is electrically conductive or semiconductive, electron transfer may be effected to cause changes in the strength of ligand binding, and also reaction of bound species with other such species or workpieces. Alternatively, ligands may be derivatized with a molecular wire, e.g. catechol may be substituted at positions 3, 4, 5 or 6 with a conjugated polyene for conducting electrons.

In a simple example of electronically controlled metal deposition, a ligand bound to a structural member which is under positional control may be used to position a metal atom or a metal cation in close proximity to a target site on a metal workpiece to which it is desired to bond said metal cation, an electrical potential is applied to said metal workpiece whereby deposition of said metal atom (for a positive electrical potential applied to workpiece) or said metal cation (for a negative electrical potential applied to workpiece) at said target site is facilitated. For some combinations of metal and ligand, direct contact of the atom to be added and one or more atoms at a target site may be possible or necessary. Note that similar deposition methods may be applied to semiconductive materials such as semiconductive metal oxides or semiconductive metal nitrides. Preferably, such depositions are conducted at reduced temperatures to minimize surface diffusion of deposited atoms.

Figure 3A:
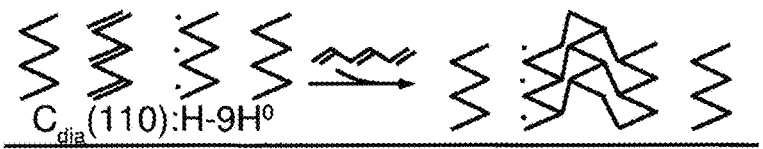
Figure 3B:
Figure 3C:
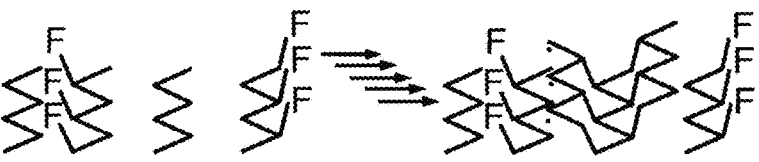
Figure 3D:
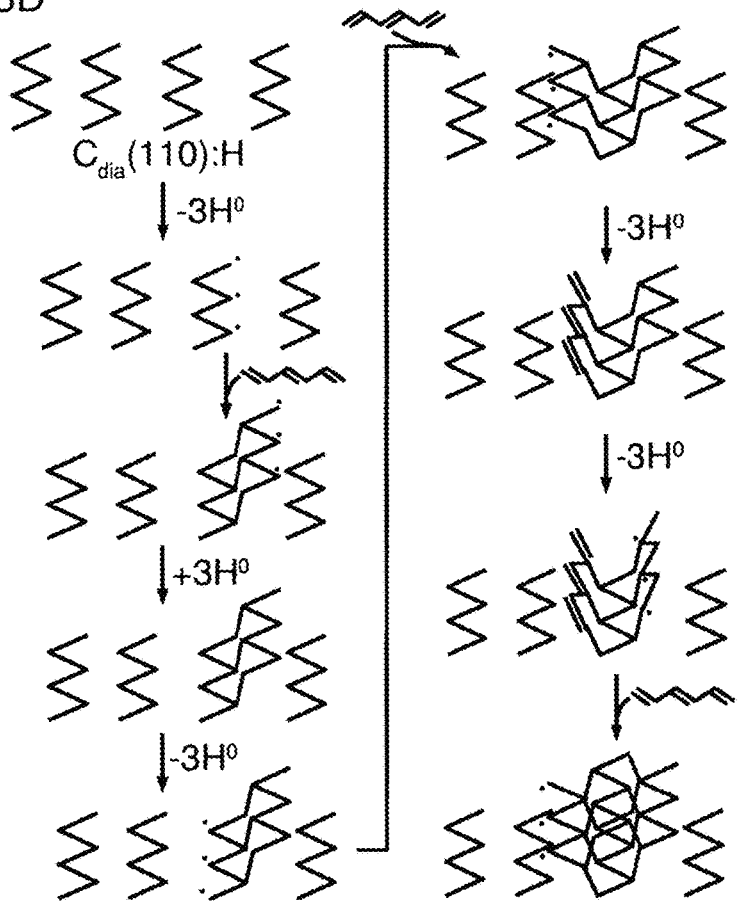
Figure 3E:
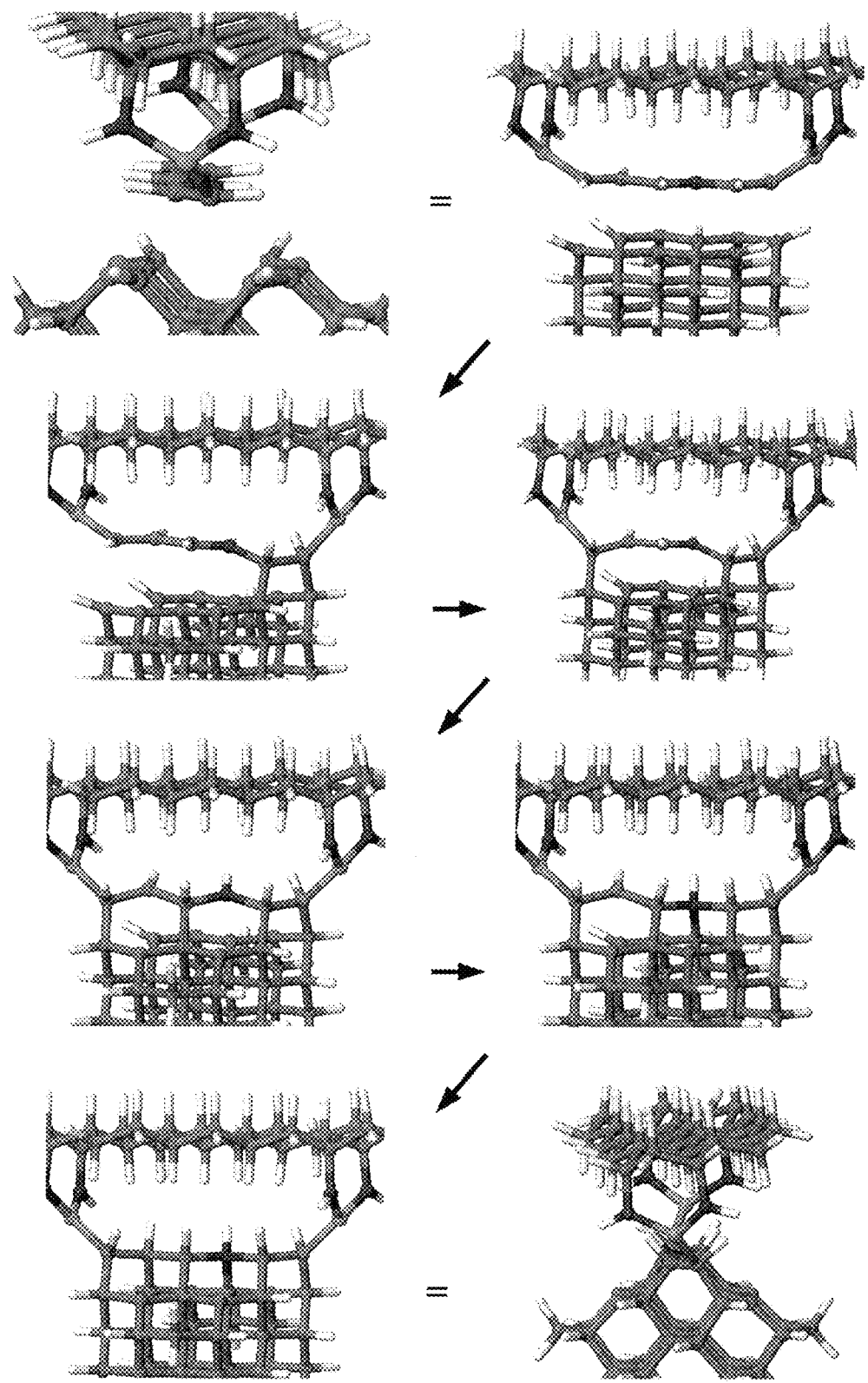
Figure 3G:
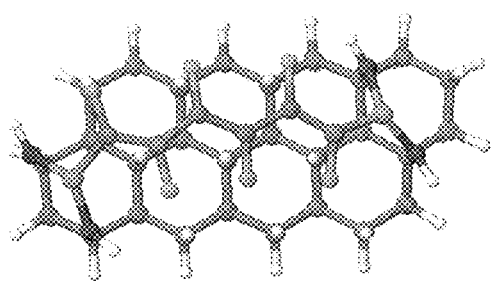
Figure 3G:
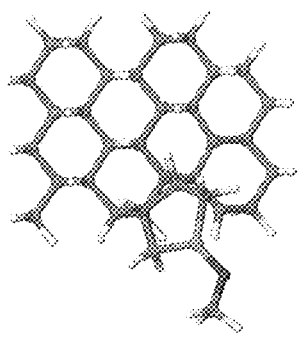
Figure 3H:
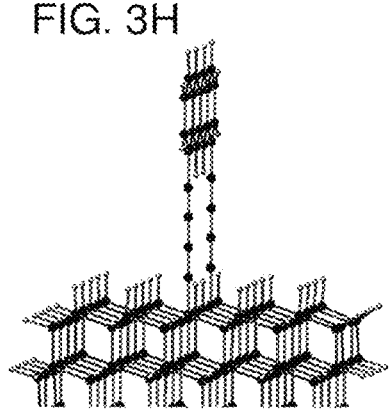
FIG. 3H shows UFF calculated structures of various graphenoid members linked via is diacetylene linkages to $C_{dia}(111)$ surfaces, and various cases thereof useful for aspects of the present invention. These structures were optimized using UFF as implemented in ArgusLab version 4.01.
Figure 3H:
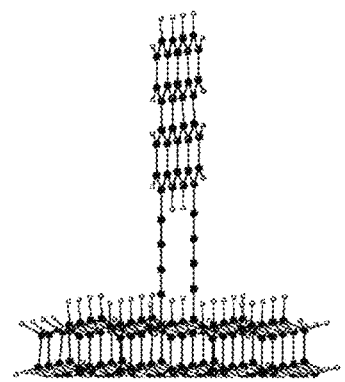
Figure 3H:
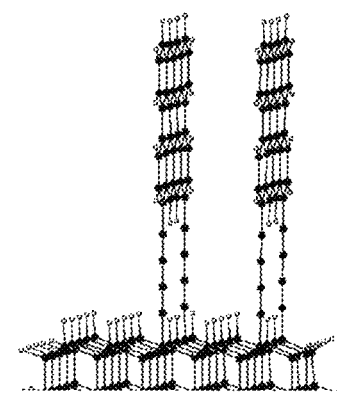
Figure 3H:
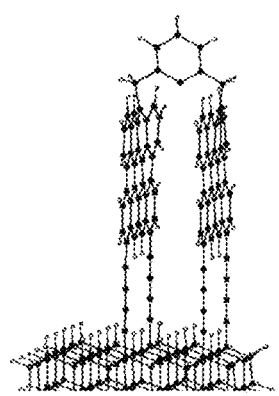
Figure 3I:
Figure 3J:
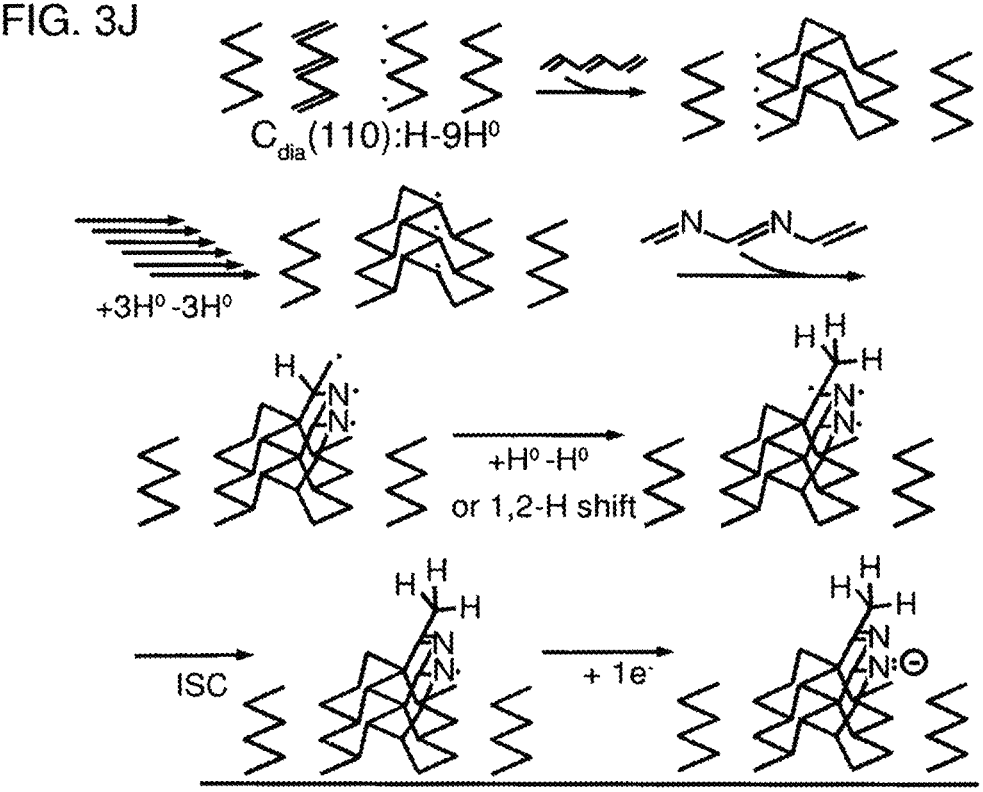
Figure 3J:
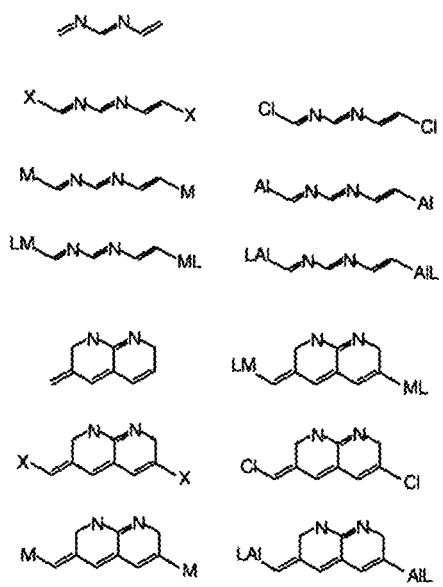
Figure 3L:
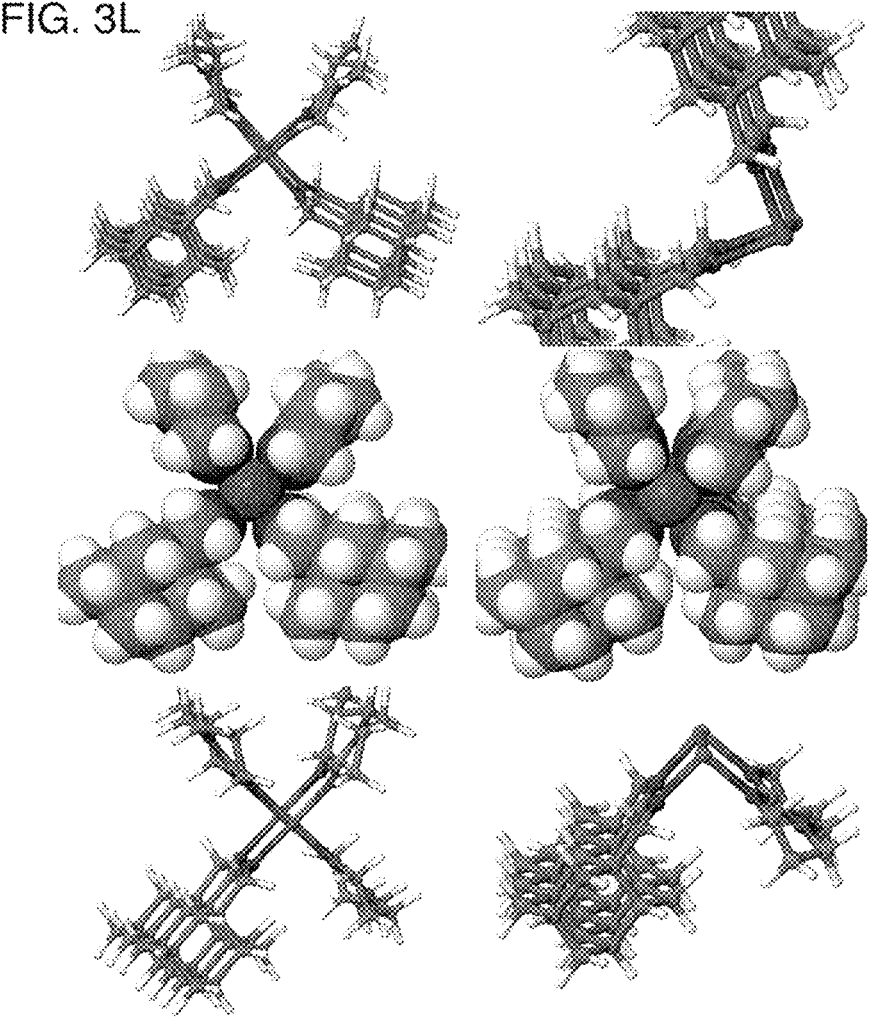
Figure 3M:
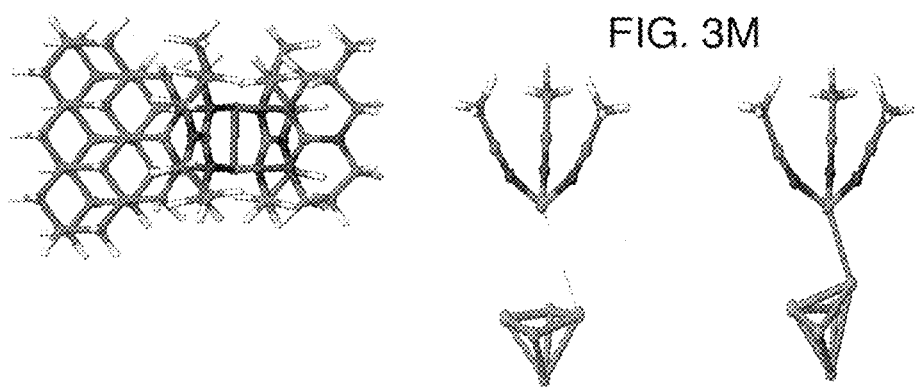

Additionally, the foregoing may be applied or extended to the deposition of metals from binuclear or polynuclear complexes, such as ditungsten-tetrakis(hexahydropyrimidopyrimidine) ($W_2hpp_4$) or derivatives or analogs thereof, especially to workpieces comprising metallic members; in this case, at least one hpp ligand (or alternative ligands, e.g. comprising a deprotonated guanidino skeleton or a deprotonated 1,3-diaza substitution) is preferably bound to a structural member for positioning said skeleton or said ligand in fixed relative orientation by two or more covalent bonds, and the remaining hpp ligands or alternative ligands are linked to at least a second structural support (and more preferably, to a second, a third and a fourth structural member for positioning the linked ligand or skeleton), whereby, a ditungsten species may be added to a tungsten workpiece by: first, two ligands or skeletons may be pulled away from the complex to expose the ditungsten, second, the remaining complex may be positioned near a target site in a predetermined orientation and preferably also advanced to contact one or more atoms at said target site, and optionally, third, an electrical potential is applied to said workpiece or alternatively to said complex (or a potential difference applied across both, facilitated by selecting semiconductive or conductive structural support members for said ligands or skeletons) fourth, one structural member linked to one of the remaining said ligands or skeletons is withdrawn, fifth, the last remaining structural member to which a said ligand or skeleton is bound is withdrawn, leaving a ditungsten deposited at said target site on said tungsten workpiece. (More generally, ligands or coordinating atoms thereof are retracted in a sufficiently low rat in terms of ligands or coordinating atoms per step that retracting tool avidity to deposited metal atoms is less than the avidity of the target site.) A similar ligand supported on a diamondoid structure is shown in FIG. 3L and may be fabricated by the reaction scheme shown in FIG. 3J by operations similar to those of Example XII. Deposition of metal atom dimers via binuclear complexes involving ligand-based molecular tools or molecular tools comprising ligand skeletons to body-centered-cubic (bcc) structure metals (e.g. Tungsten) may conveniently deposit to the positions forming the bounding box of a unit cell edge at the metal surface, said surface preferably including a face of said unit cell; for face-centered-cubic (fcc) structured metals (e.g. nickel, titanium, palladium, platinum, aluminum) deposition of metal atom dimers via binuclear complexes involving ligand-based molecular tools or molecular tools comprising ligand skeletons is preferably to target sites on a metal surface which will constitute a corner atom and a center atom of the bounding box of a unit cell in the finished structure, said metal surface preferably including a face of said unit cell; for hexagonal structure metals (e.g. titanium, scandium, zirconium) the preferred target sites are any adjacent pair of atoms in the unit cell on the metal surface, preferably colinear with a previously deposited metal dimer, most preferably adjacent a step edge. The foregoing is preferably conducted in high vacuum, hard vacuum, or more preferably ultrahigh vacuum, although inert gas atmospheres (e.g. $He_{(g)}$, $Ne_{(g)}$ or $Ar_{(g)}$), liquefied noble gases (e.g. $He_{(l)}$, $Ne_{(l)}$ or $Ar_{(l)}$), and inert solvents which do not chemisorb to workpiece material or react with exposed ditungsten are contemplated; in these cases, structural members to which ligands or skeletons are linked or bound are preferably vibrated normal to the direction of advance towards the target site to knock away or displace any atoms or molecules which may block or may be physisorbed at the target site, subject to the limitation that vibrational amplitude should be sufficiently small (and preferably also frequency very high) to not impair positional accuracy. Preferred target sites are step edges and especially step edges adjacent to atoms previously deposited. Tungsten adopts a body-centered cubic structure and flat surfaces along a plane of the unit cell are not expected to reconstruct, is although they may relax; each tungsten atom to be added would bond to four surface atoms at an isolated flat site, five surface atoms isolated at an edge and six surface atoms at an edge adjacent a previously added atom or dimer; in all cases an added dimer forms eight or more bonds, and so should be quite stable at low to moderate temperatures, especially adjacent to step edges (for high melting point materials such as W, it is possible that ligand-reactant atom bonds become increasingly destabilized with increasing temperature more quickly than do desired reactant atom-workpiece bonds, so particularly in these cases it is possible that reactant-fragment release from tool atoms occurs more readily or with lower mechanical work or yielding lower target or product errors, so experimentation varying temperature for any given type or identity of tool or tool-atom and any given target atom type and configuration and any given reactant fragment type is advisable and may yield improved results, identifying these with less effort than would be required via exhaustive molecular dynamics calculations surveying these parameter spaces.) Note that the foregoing methods may likewise be applied, by selecting appropriate ligands which may be suggested by the arts of inorganic chemistry or organometallic chemistry, in particular to other refractory metals. The foregoing thus discloses a novel method and means for the positionally controlled electrodeposition of a refractory metal, which should also be applicable to other metals, transition metals and alloys, and may be performed with other ligands. Note also that alloys comprising multiple metallic elements including those comprising transition metals or lanthanides or actinides may similarly be fabricated, including structures with predetermined elements at predetermined lattice sites such as would be impossible heretofore. Notable metals which are expected to be acceptably deposited according to the foregoing include bcc structure metals, fcc structure metals, hexagonal structure metals, nickel, titanium, scandium, zirconium, palladium, platinum, aluminum.

Workpieces thus fabricated may be fabricated to have one or more flat metal surfaces or metal surfaces with predefined contours which may be designed to be complementary to other metal surfaces so fabricated, such that in the case of fabrication in hard vacuum, workpieces bearing complementary or flat surfaces may be manipulated according to the various respective methods of the present invention to be contacted in a predetermined desired relative orientation whereby bonding or vacuum welding of surfaces so juxtaposed is caused to occur; note that workpieces comprising metallic members may be manipulated by the bonding thereto of ligands or analogous skeletons in communication or embedded in, respectively, structural members in communication with positioning means, in close analogy to the foregoing process for electrodeposition; also, manipulation for contacting metal bodies for vacuum welding preferably further comprises providing one or more alignment means for aligning the approach of bodies to be vacuum welded, and preferably further comprises contacting a first body to be welded or a tool holding same against said alignment means towards a second body to be welded directly or indirectly contacting said alignment means. Here it is noted that after manipulation, ligands or skeletons are pulled away from a workpiece or assemblage or workpieces preferably one by one or at least in successive minorities, such that the workpiece or assemblage or workpieces is retained by a predetermined subset of ligands or skeletons according to the collective binding strength and rigidity of positional constraint of each subset of ligands or skeletons being pulled apart (e.g. a tungsten nanostructure may be bonded by a structural-member bound hpp-like ligand and four structural members each presenting a nitrile functionality; successively, first a subset consisting of two nitrile bearing structural members may be withdrawn whereby the workpiece is retained by a subset consisting of two nitrile-bearing structural members and an hpp-bearing structural member; second, a nitrile-bearing structural member may be withdrawn whereby the workpiece is retained by a subset consisting of a nitrile-bearing structural member and an hpp-bearing structural member; and third, a nitrile-bearing structural member may be withdrawn whereby the workpiece is retained by the remaining hpp-bearing structural member. Thus, the foregoing represents novel methods and means for fabrication of metal bodies and convergent bonding thereof into larger bodies, as well as methods and means for manipulation thereof for assembly operations.

Composite materials and structures and devices comprising same may likewise be fabricated and assembled according to the present invention. A preferred example is a composite of carbonaceous material (graphene or carbon nanotubes or carbon fibers) and a refractory material, such as magnesium oxide. Carbon materials provide tensile strength and thermal as well as electrical conductivity, while refractory materials provide thermal mass and high temperature resistance, such that bodies of such materials are advantageous for thermal energy storage at elevated temperatures with good rates of thermal energy discharge. The latter property makes such a material advantageous for storing thermal energy for use to power a heat engine. Additionally, such materials may comprise a sufficient proportion of carbon to impart thermal absorptivity (e.g. dark or black color, infra-red absorptivity) such that a composite solar thermal energy absorber and storage means is realized. Most preferably, a combined solar thermal energy absorber and storage means of the present embodiment is used with a noble gas (e.g. argon) as a heat transfer fluid, preferably at substantially constant volume, which may be caused to flow through channels or interstices in said composite material to take on heat, and flowed either to a heat exchanger for delivering thermal energy to a heat engine or directly into a heat engine where it serves as a working fluid and is permitted to expand, delivering work. The nanofabrication capabilities of the present invention (or equivalents) further permit conduit surfaces to be precisely structured to cause optimal turbulence at a given desired flow rate to ensure efficient heat transfer from such storage means to a heat transfer fluid. Note, however, that bulk fabrication methods of prior art may instead be availed to produce analogous combined solar thermal energy absorber and storage means from MgO particles or nanoparticles coated with carbon, preferably packed into a column or bed or alternatively pressed into a mass in each case similarly providing interstices (or instead or additionally e.g. conduits formed by pressing such materials around rods or by drilling vias) for flow of heat transfer fluid, consistent with the approach of the present invention of availing both nanofabrication and bulk fabrication methods as convenient.

A particularly convenient case is MgO decorated or coated by graphene with structures both of these materials nanofabricated according to the present invention. Graphenoid structural members for coating and passivating MgO surfaces are preferably substituted by nitrogens at zig-zag edges (which are in any case the edges preferred for the principal graphene fabrication methods taught herein and shown in FIG. 5 and Scheme III) to yield pyridine rings, wherein nitrogen bonds to magnesium upon placement by nanomanipulation thereof at step edges, or by inclusion of adducted structures comprising the skeleton of benzofuran Diels-Alder adducts or bis-adducts, e.g. of 1,3-cyclohexadiene, such as shown in the bottom layer of the structure in FIG. 1*l*, with oxygen atoms suitably directed and spaced for binding to Mg, into larger graphenoid structures for passivating MgO (or other materials including other halite materials, e.g. fabricated according to the present invention.)

In addition to the methods and means taught in [Rab08] for positional mechanosynthesis of diamondoid materials from carbon dimers, substituted carbon dimers and cumulenes, which may be improved by means provided herein, the present invention features an aspect for fabricating diamondoid nanostructures and materials and also related materials from conjugated trans-polyenes. This aspect was actually conceived before most of the work leading to [Rab07] and [Rab08], which in part emphasized approaches more similar to that done by other workers such as Freitas and Merkle and Drexler. Diamondoid positional mechanosynthesis from conjugated trans-polyenes was first considered as the zeroth-order case for convergent bonding of a molecule with a bare diamond surface to yield an enlarged diamondoid article, where a conjugated trans-polyene is taken as analogous to a Pandey chain of diamond (110). Linked by weaker bonds, as provided by metal-carbon bonds involving terminal carbons of a polyene to metals bound to a diamond surface (either directly, replacing surface hydrogens, or via functional groups substituted thereupon forming ligands) and drawn tight therebetween, said polyene is linked to a flat diamond surface in a single, well defined conformation suitable for accurate positioning and clean reaction, and suitable for driving the reaction by applying pressure on the reactant fragment loaded thereupon directed towards a target site, with diamond being excellent for applying even extremely high pressures, e.g. pressures between 100 MPa to 100 GPa over the limited area of contact with the reactant. As first conceived, this approach was inspired by the phase diagram of carbon, where high pressures form diamond even at ambient temperatures. Also as conceived, similar ligand-metal-carbon bonds, e.g. at carbons from which hydrogen has been abstracted by nano-positioned hydrogen abstraction tools, are used to hold and manipulate diamondoid workpieces, such that similar tools are used for operations on both workpieces and reactants. This class of reaction, at least when driven by pressure and in some cases and for some calculation methods without extremes of pressure, was found to be widely successful for different metals (B, Al, Ga, In, Tl, Cr, Ti, Ni, among others) and also Group 14 elements (Si, Ge, Sn, Pb) and different designs of binding tools including metals directly bound to diamondoid structure (both (110) and (111) surfaces, with two or three bonds between tool and metal center depending on metal valence) and reactants, via methylene functional groups, via amine or amide (RHN⁻) or hydroxyl or oxide or sufile or telluride or phosphine or arsine or antimonide functionalizations.

Also successful were convergent bonding between facingly juxtaposed bare diamond surfaces, especially facingly juxtaposed (110) surfaces with pressure applied thereto to advance contact of surfaces to be bonded; calculations using the AM1 method implemented in PC-GAMESS or GAMESS-US did find a surmountable barrier to this bonding operation. Similar results were obtained with facingly juxtaposed surfaces of clean β-SiC(110), enabling convergent bonding of these surfaces according to the present invention. (111)2×1 reconstructed surfaces, which have surface chains similar to the Pandey chains of the (110) relaxed surface, were similarly found to bond under pressure when correctly juxtaposed, although not to yield a uniform bulk diamond lattice, though there will likely be instances where such bonding is useful. (100)2×1 reconstructed surfaces, were found to bond in optimization calculations, but the formed bonds were in cyclobutanoid rings between contacted surface dimers, which were quite difficult to break. The same is expected for clean β-SiC(110):C-2×1. It is expected, however, that dynamics calculations at least at higher temperatures will find that these cyclobutanoid linkages reorganize to bulk diamond structure; nonetheless, even if cyclobutanoid bonding is the only feasible product for bonding along this surface, such bonding is still useful for forming useful structures. Preferably, relief structures for performing convergent fabrication and assembly as taught herein may be fabricated on diamondoid surfaces by forming surface features from conjugated all-trans-polyene precursors as described above, and preferably also surface sites near relief features may be modified with directly bound or ligand-bound metals for binding diamondoid precursors or intermediates for convergent fabrication or assembly at surface sites from which hydrogen is absent (reliefs of diamondoid composition being particularly preferred since these will be suitable for applying even extremely high pressures for causing bonding to occur even in products where strained structures are desired to be produced, and also since these may serve for the fabrication and assembly of like tools.)

An aspect of the present invention concerns adaptations of conventional methods and means used in surface science and technology to the preparation of molecular tools useful for the present invention. An opposed STM is a device featuring two opposed surfaces onto each of which one or more samples may be situated, each of which supports an STM tip for imaging, manipulating and/or modifying samples, and each of which is under translational control of a two-dimensional nanopositioner, said two opposed surfaces relatively advanced or withdrawn from each other by a depth positioner featuring subangstrom accuracy. The foregoing are arranged such that each sample is within operating positional range of the STM tip on the opposing surface and also samples may be positioned in proximity and contacted with each other with angstrom or subangstrom resolution. After mounting of samples, establishment of UHV and thermal equilibration, a surface scan is done to establish the exact spatial location of samples relative to tips on the imaged surface, and this information is used to establish a spatial offset; said spatial offset is used to relate the location of surface modifications of samples on one surface to those of surface modifications of samples on the opposing surface such that accurate predictions of desired positioner positioning to cause modified sites to interact may be calculated. Chemisorbed modifications may act as inverse STM tips in imaging each other especially when sensitive electrometric detection is utilized permitting ready detection of through-bond tunneling and contacted species are not mutually reactive or are presented in protected or passivated form. More preferably, opposed STMs used are situated in individual chambers capable of containing fluids and being evacuated to ultra-high vacuum (UHV.) Preferably, a plurality of ports featuring valves for pumping in or out gases or liquids are provided, preferably a heating element is provided, preferably a cooling element is provided or conduits for coolant are included in the structure of said chambers. Most preferably, opposed STM devices additionally feature means for automatically mounting samples, for unmounting samples and for transferring samples to and from a transfer port of said chamber; this last feature is particular useful where samples used as molecular tools have been used and are thus spent or otherwise must be changed or exchanged. Preferably, additional SPM probes are included, such as a single electron transistor or a single electron transistor field effect transistor probe whereby surface charge may be mapped; useful for determining the presence of surface anions, especially ethide modifications and amide (e.g. RHN⁻) modifications, and the successful formation and location thereof. Preferably said opposed STM is controlled and communicates data to digital computation and information storage means for controlling operations and also retaining data in association with the identity of specific samples, tools and modifying same records as tools are used for maintaining up-to-date information regarding which modifications are spent and which are active. Preferably, the foregoing devices additionally feature storage chambers for storing tools and protecting same from the ambient atmosphere, i.e. storage is preferably under inert gas such as argon or under UHV, and also transfer means for transferring samples or tools from said opposed STM chamber and the surfaces thereof to storage chambers. Alternative to storage chambers, samples may be covered with a protective lid or shell and remain mounted in said STM chamber until spent or regenerated/recycled/reloaded. One preferred embodiment features an opposed STM in a chamber, additional probes such as a probe comprising a single electron transistor, a chamber for performing plasma and gas reactions, a chamber for performing solvent-based surface modifications, means for pumping and controlling the flow of gases and liquids, temperature regulation means, and means for transfer of samples between chambers Convergent Graphenoid Fabrication and applications thereof:

In addition to the foregoing and previously disclosed methods and means for the nanofabrication of graphene nanostructures, methods for nanomanipulation and nanofabrication of graphene nanostructures via convergent mechanosynthesis reactions and suitable means therefor are presently disclosed. Various metal atoms (e.g. bound by ligands, or alternatively comprised by inorganic nanostructures [such as a corner atom in a cubic metal nitride or metal carbide]) form eta-2 to eta-6 complexes with aromatic and heteroaromatic rings; with ligands or other supporting structures in communication with structural members or nanopositioning means, such binding is exploited for manipulation of molecules or nanostructures comprising aromatic and heteroaromatic rings. Additionally, in the course of earlier investigations I found that a variety of calculation methods (ranging from semi-empirical theory to density functional theory to perturbation theory) predict that radical carbons in such aromatic rings (e.g. an aromatic carbon from which a hydrogen has been abstracted) thus bound manifest negative net spin density (i.e. net antiparallel spin, or spin-down) making these vigorously reactive, especially with normal (spin-up) radical centers. A simple example of a reaction of this class is performed by first forming an eta-6 facial complex of benzene with the vanadium atom of a support-bound vanadium catecholate complex, abstracting a predetermined hydrogen atom from said benzene using a hydrogen abstraction tool (e.g. a nanopositioner-bound alkyne-radical tool) as necessary, permitting time for dissipation of resulting phonons or evolved heat and/or intersystem crossing to ground state, advancing a radical site of a phenyl radical towards the carbon of said benzene from which said hydrogen was abstracted such that the radical atom of said phenyl radical is most closely juxtaposed to said carbon of said benzene from which said hydrogen was abstracted, whereby the desired bond-forming reaction is permitted to occur. It is emphasized that the desired reaction of the foregoing reactants yields the desired product without intersystem crossing, and so may proceed extremely quickly (some dynamics calculations predict a reaction time of under 100 fs) both enabling high operation rates and also favoring the desired reaction over competing reactions. The foregoing steps are repeated on obtained product species, preferably in a convergent manner, whereby increasingly larger products are obtained, having a predetermined structure according to the positions from which hydrogens are abstracted and radical centers of reactants are contacted together, determined by spatial translations of tools and reactants or intermediates, which most preferably may be under automated control, e.g. by information processing means or readout from stored information representation means.

In the earliest work along these lines, vanadium bound by catecholate dianion having one electron removed therefrom (i.e. the doublet monocation ground state) is predicted across a range of methods to react with the phenyl radical to yield biphenyl, still bound by vanadium catecholate. In this connexion, some results suggested that binding of benzene to vanadium enhanced the energetics of hydrogen abstraction therefrom. Further calculations showed this chemistry to be suitable for extension to higher phenylenes; accordingly, poly-p-phenylenes and branched phenylenes may be precisely fabricated by this and related methods and means, with resulting structures determined by nanopositioning sequences or trajectories. Note that compared with prior art oligomer and polymer syntheses, solubilizing functionalities, protective groups and activating groups are obviated.

Similar chemistries were later applied to compounds comprising fused rings and also to exocyclic carbons, whereby one or more new aromatic rings may be formed in a single operation. According to these variations, poly[n]acenes including precisely branched poly[n]acenes may be fabricated.

Although cationic vanadium catecholate has yielded the best results thus far, successful reactions are predicted for other transition metals (chromium, cobalt, iron, manganese, titanium, niobium, tungsten) and so it appears that effective metals are found among early, middle and late transition metals and transition metals of all periods. Different metals were effective at different oxidation states (or charges) and effective reactant complexes have predicted ground states of various multiplicities. It was found that multiple spin states of ligand-metal-reactant complexes are predicted to have energy differences with respect to each other within predictive error or within thermal energy; it was also found that desired reactions would occur for different multiplicities. In some instances, advancing reactants towards each other led to the stabilization of spin states favoring the desired reaction. Some, notably cobalt, manganese, niobium and tungsten, significantly bend rings to which they bind, while others do so only slightly or not at all. Especially cobalt and tungsten are useful for forming products comprising bent or curved structures such as nanotubes or nanorings. Binding of 2,6-dimethene-poly[n]acenes by multiple cobalt catecholate (CoCat) complexes (which appear to favor eta-3 and eta-4 binding to aromatic rings) on the same face facilitates curvature for cyclization; abstraction of hydrogens from the two methenes and positions 3 and 7 with CoCat complexes bound to the terminal rings provides the necessary reactivity and effects the desired positioning using nanopositioning means. Contrariwise, multiple ligand-metal complexes which bend aromatic rings to which they bind may be bound, preferably in alternation, to opposite faces of a graphenoid structure adjacent to the edge to be bonded to another graphenoid structure so as to cancel or reduce displacements due to bending of rings whereby two edges to be fused may be juxtaposed along their full length. Alternatively still, two edges to be fused may be bound by multiple ligand-metal complexes in complementary or mirror image arrangements such that edges to be fused may be juxtaposed along their full length in spite of bending by metal binding.

It is emphasized here that catechol is an aromatic compound, and so precursors comprising one or more catechols are susceptible to nanofabrication according to the foregoing, whereby catechol ligands may be precisely incorporated into or added to structural members (either with a metal atom prebound thereto or added thereto at a later time) especially also structural members in communication with (or later placed into communication with) nanopositioning means, whereby means for performing the foregoing method may be produced by the foregoing method. Likewise, other types or classes of ligands comprising one or more aromatic rings within their structure may similarly be included in structures fabricated according to the foregoing, and structures produced thereby may similarly further be employed as means for the foregoing nanofabrication methods.

Precursors bearing functional groups or substituents or atomic substitutions at specific positions may be used as reactants to yield products comprising the respective modification at a predetermined location of the desired product. Preferred functional group substituents include ethyne groups, dialkylphosphines, diarylphosphines, keto groups, carboxyl group, hydroxyl groups, amino groups. Preferred atomic substitutions include nitrogen, boron, phosphorus. The foregoing may serve as molecular tools or portions thereof, integrated at predetermined locations into the structure of graphene structural members; for example, hydroxyls, phosphines or amines may yield ligand structures for binding metal atoms, while ethyne may serve as a hydrogen abstraction tool or a deprotonation (base) tool, depending on oxidation state, and carboxyl groups may serve as a protonation tool (acid.) Up to four colocalized basic carboxymethyl groups (or fewer in combination with acetate or other carboxylate molecules) may serve to bind two copper(II)

ions in a Chinese lantern structure for oxidizing deprotonated ethyne groups (anion to radical.)

In contrast to nanofabrication via addition of carbon dimers or polyene or carbene oligomers disclosed earlier, the present method for bond formation via metal-facilitated radical-radical. coupling permits both the addition of monomeric precursors (e.g. benzene, benzoate, aniline, phenol, pyridine, catechol, phenanthrene, phenanthroline, naphthalene, anthracene, tetracene, p-xylylidene, 2,6-dimethyl-anthracene, 9,10-substituted 2,6-dimethyl-anthracenes, 9,10-modified 2,6-dimethyl-anthracenes, pyrene, -dimethyl-pyrene, indene, -methyl-indene, 5-methyl-cyclopentadiene, among many others) to larger structures, as well as fabrication according to convergent synthetic schemes, e.g. whereby large graphene or polyaromatic or polyheteroaromatic molecules are combined to form a larger graphene or polyaromatic or polyheteroaromatic molecule, and whereby two or more products of preceding reactions of this kind may be combined in subsequent reaction cycles permitting geometric growth in product size, these may have as few as 4 edges and edges may be all zig-zag, suitable along the entire length thereof for further convergent reactions according to these chemistries to obtaining graphene product structures. Note that the formation of multiple aromatic rings in a single step is enabled. Because of the possibility of contiguous tiling into regular graphene products of the foregoing form, p-xylene may be viewed as a "simplest monomer" in many variations of these syntheses, although there is no limitation to the use of other precursors. Similarly, carbon nanotubes, especially zig-zag carbon nanotubes and/or branched nanotubes may be combined to form longer carbon nanotubes, with the advantages that atomically precise structures including network structures may be obtained, and that great lengths of single molecule (monomolecular) carbon nanotubes or substituted carbon nanotubes may be produced in a small number of steps, e.g. each step doubling the lengths yielding a geometric rate of growth in length.

A preferred mode of convergent synthesis of graphenoid or polyheteroaromatic structures according to the present invention comprises combining aromatic molecules each comprising two exocyclic carbon atoms or heteroatoms wherein at least one exocyclic atom on each reactant molecule is provided or prepared for reaction in radical form. For example, p-xylylene biradical having two hydrogens abstracted from a methyl group of xylene, one hydrogen abstracted from the other methyl group and one hydrogen abstracted from an adjacent carbon of the ring, bound to a vanadium catecholate cation (alpha,alpha,beta,2-tetradehydro-1,4-xylene-eta-6-vanadyl-catecholate cation) is advanced towards a second identical complex, with the exocyclic radical carbon of each approaching the radical atom of the ring, whereby 2,6-dimethene-anthracene (bound at the lateral rings by two cationic vanadyl catecholate complexes. Relative to the bonds thus formed, in this case one atom of each pair of atoms bonded are bound to a respective metal atom in each precursor, such that a spin-down radical is combined with a spin-up radical. Note that the symmetrical product may similarly be combined in a subsequent step with an identical molecule to yield a larger molecule comprising two exocyclic carbons. Accordingly, aromatic molecules comprising two distal exocyclic carbons or heteroatoms represents a composition of matter useful as precursors or intermediates in the convergent synthesis of poly[n]acene and graphene (or graphenoid) structures or nanostructures. For example, graphene quantum dots, or poly[n]acene or graphene nanowires may be fabricated according to the foregoing, including in situ for device or system fabrication; accordingly, a wide range of electronic and optoelectronic devices may be fabricated with the present invention; of course, integrated or complex systems comprising a large plurality of devices are most preferably fabricated by a plurality of fabrication means operated in parallel or simultaneously.

Here it is noted that this method enables the convergent fabrication of single-wall nanotube of precise diameter and length and atomic substitution of lengths greater than a micron, greater than a millimeter, greater than a centimeter, greater than a meter, greater than 100 m, greater than 1 kilometer, greater than 1,000 km, greater than 36,000 km, greater than 134,217 km. Products obtained via the present invention are not limited by catalyst properties as in prior art. Multiwall nanotubes may be combined by sliding successive tubules from inner to outer of each multiwall nanotube to be joined into contact with the matching tubule, whereby access to reacting atoms by metal atoms is possible for reacting atoms which ultimately become internal to the product multiwall nanotube. Accordingly, carbon nanotubes or nanonets, including multiwall nanotubes of length sufficient to serve as a cable for a geosynchronous orbital elevator may be fabricated according to the present invention and such products are a distinct embodiment of the present invention. Further, since the foregoing enables the fabrication of tapered structures, the present invention permits the construction of a geosynchronous orbital elevator comprising a cable which is a single molecule; and which more preferably may have a network topology comprising carbon nanotube segments; most preferably, said cable is free from edge structures, which are more reactive to potentially damaging species. Network structures, e.g. formed by joining branched nanotubes with linear nanotubes, are more preferred as these are more tolerant to damage before losing strength under load. A particular advantage of single molecule network carbon nanotube cables is that a single cable may weigh significantly less than one gram or even less than one milligram, but be strong enough to support a multiple of its own weight and the tension from a small geosynchronous orbital ballast, as well as the weight of a crawler micromachine or nanomachine for ascending a first cable molecule, drawing up a second cable (e.g. via one terminus or alternatively via a central portion thereof.) As a further embodiment of the present invention, According to the methods of the present invention, convergent fabrication of graphene quantum structures including graphene quantum dots and graphene quantum wires is enabled. These structures have a wide range of applications including in the areas of photovoltaic and electrooptical devices, electronic devices, spintronic devices, antenna devices.

Applications which have been targeted with carbon nanotubes in the prior art may benefit further from both atomic precision and graphene topology. Atomically precise antenna devices offer the prospect of improved quality factors, enabling narrower tuned bandwidth and thus greater efficiency both in terms of communications spectrum utilization and energy efficiency and sensitivity; cross-sectional anisotropy of graphenoid structures (contrasted to the cross-sectional isotropy of nanotubes) enables polarization selectivity, since resonant modes normal to a graphene sheet differ markedly from lateral modes; different modes are therefore excited with markedly different efficiencies according to the orientation of the graphenoid structure.

Various resonant beam nanostructures have been employed in the prior art for a variety of sensing applications. Atomically precise graphene structures including structures comprising multiple graphenoid layers may serve as resonant beams in such sensor devices, yielding improved mechanical properties and higher quality factors and sensitivity to smaller forces or masses, whereby improved sensor devices are enabled. For sensing applications involving binding of analytes to resonant beams, binding sites (e.g. ligands or functional groups for coupling to biological molecules such as immunoglobulins, haptens, oligonucleotides or other biomolecules) may be positioned at precise locations, with precise number and density, whereby reproducibility is greatly enhanced. Similarly, graphenoid beams may serve as improved cantilevers for scanning probe microscopies such as scanning force microscopy (SFM/AFM), resonant scanning force microscopy (RSFM/tapping SFM), magnetic force microscopy, etc. Here it is noted that since graphene is electrically conductive, such probes are suitable for concurrent SFM and scanning tunneling microscopy/spectroscopy (SFM+STM or SFM+STS) and also concurrent RSFM and scanning tunneling microscopy/spectroscopy (RSFM+STM or RSFM+STS.) Atomic precision of such structures enabled with the present invention greatly improves the reproducibility possible with different probes. Also, since graphene structures comprising multiple graphene layers are significantly reflective, optical detection (of deflection of a reflected beam) for SFM/RSFM or other SPM arrangements is possible with this class of beams or cantilevers without addition of a distinct reflective layer, simplifying and enhancing mechanical properties thereof.

Due to the excellent conductivity properties of graphene, graphenoid nanostructures are highly preferable for use in electronic and electromechanical devices (e.g. nanoelectromechanical devices, NEMS.) Actuators useful as nanopositioning means (including as nanopositioning means for the present invention) may comprise comb-type actuators or related topologies fabricated and assembled according to the present invention and comprising graphene as conductive members thereof. The lattice spacing of diamond is about 3% larger than graphite and graphene, but this small degree of mismatch still permits suitably designed nanostructures of these two materials to be bonded together at multiple locations without significant distortion, stress or bending. Convenient linkages accommodating hydrogens terminating diamond and graphene include acetylene and diacetylene linkages. Diacetylene linkages may be formed with good yield via Eglinton coupling or Glaser coupling, or related reactions catalyzed by ligand-metal complexes bound to nanopositioning means. In a preferred example, ethyne substitutions are formed at desired sites on a diamond nanostructure, and these are coupled to juxtaposed ethyne substituents on a graphenoid nanostructure, most preferably using a nanopositioned catalyst such as copper acetate and a base. For forming ethyne substitutions at desired sites on diamond nanostructures, hydrogen is abstracted from two or more sites on a diamond surface using nanopositioned hydrogen abstraction tools, surface tertiary radicals are brominated or iodinated either using a nanopositioned bromination tool (e.g. a nanopositioned metal bromide such as aluminum bromide catecholate or aluminum iodine catecholate) or alternatively by exposure to chlorine gas or more preferably bromine gas or iodine gas (or dissolved gas) cationic surface sites resulting from spontaneous heterolytic cleavage of the halogen (as in $S_N1$ reactions at tertiary carbons, favored by polar liquids or thermolysis) are contacted with a metal acetylide (e.g. NaCCH) either as a vapor or in solution, or alternatively an acetylide bound to a nanopositioned metal-ligand complex (e.g. in vacuum phase) or contacted directly with negatively charged ethide groups (arising from deprotonation and oxidation or electrooxidation of ethyne groups)

Alternatively, bonding of graphenoid nanostructures to diamondoid nanostructures via linking moieties such as diacetylene may avail diacetylene derivatives of the graphenoid member, which are deprotonated (e.g. by amine base, assisted by Cu(I) pi bonding to the terminal triple bond) to yield anionic acetylide functionalities and advanced via nanopositioning to juxtapose cationic sites of the diamondoid member formed as above.

Preferably, for comb actuators and also other devices, graphenoid members are paired and more preferably bound adjacent to each other, and more preferably still members of each pair are of similar or identical structure or at least have at least partially matching edges, which most preferably are further modified by the addition of cross-linking moieties bridging members of each pair opposite the side by which graphenoid members are bonded to diamondoid members. Bridging or crosslinking enhances mechanical rigidity and also may enforce canceling between members of each pair of buckling or warping due to mismatch between the graphenoid and diamondoid lattices. Further, for comb-type actuators, cross-linking or bridging counteracts bending of conductive paths into local increased proximity which might give rise to local deviations from desired or expected forces or even contact and attendant short-circuit. Additionally, it is noted that researchers have found that graphene bilayer structures conduct current with reduced noise compared with monolayer structures, although those observations were for structures with imprecise edges, which may influence electron scattering, and also bilayers studied were of natural separation and pitch, which need not be the case for the paired graphenoid structures disclosed here and most likely is not for narrower structured bonded as described; edge-bonding to supports may also eliminate effects from facial disposition of graphene samples onto substrates, further distinguishing these cases, as may other specifics arising for any specific structure, so although relevant and possibly useful, the effect of pairing on conductivity and noise must be tested on a case-by-case basis.

Bridging or crosslinking moieties may be chosen to have various electronic properties; for example, unsaturated or conjugated bridging or crosslinking moieties may provide conductive paths or electrical communication between different graphenoid members, either those of a pair when pair members are spaced apart, or between non-paired graphenoid members or graphenoid members of different pairs or groups. As an example of the latter, one design for diamondoid supported comb-drive actuator, each of a pair of half-actuator members may comprise parallel pairs of graphenoid strips each bound at two or more atoms of one edge to a diamondoid support via diacetylene linkages, with each graphenoid strip bridged (e.g. via diacetylene linkages from edges not bound to the diamondoid support to one or more graphenoid strips disposed at an angle [more preferably perpendicularly and most preferably at or near one end of a plurality of graphenoid strips forming the teeth of the comb] crossing graphene strips forming the teeth of the comb structure, providing electrical communication to the entire comb of the half-actuator. Two such comb-structures each from a half-actuator are facingly juxtaposed to constitute a comb-drive actuator, preferably further comprising tracks or sliding means for constraining actuation to one dimension, suitable for incorporation into larger systems, e.g. NEMS.

Electromechanical actuators comprising a translating structural member actuated thereby in communication with an electrical member (e.g. electrical conductor or at least an electrical resistor or other electrical component) other than those conductors most directly controlling said electromechanical actuators may serve to make and break electrical contact of said electrical member with some other electrical component (e.g. a conductor) such that switching functions may be realized. A simple and useful example of the foregoing is the class of electromechanical relays, which include two-pole-one-throw and two-pole-two-throw relays, which are sufficient for forming computationally universal electronic circuits.

Structures such as IX may be further derivatized with (or alternatively formed via reactions similar to the foregoing but including derivatized precursors to yield functional substituents at desired positions in the obtained product having) pairs of oppositely charged functional groups to yield dipoles or multipoles. Similar to the situation with organic dyes, imposition of a dipole or multipole on an extended aromatic system yields enhanced photophysical responsivity; thus the foregoing methodology enables the precise nanofabrication of absorber moieties for photovoltaic devices. The resultant intrinsic electric field facilitates oriented dissociation of the quasiparticles (arising from photon absorption) to yield charge separation which is efficiently coupled into electrical contacts oriented accordingly (one or more of which may optionally be graphene and continuous with the graphenoid structure of absorber moieties; preferably at least one is continuous graphene structure; more preferably still a second electrical is made via a tunnel junction, more preferably with a dissimilar material, most preferably said dissimilar material featuring a conduction band only slightly higher in energy than the HOMO of the absorber moiety, said tunnel junction located near a region where charge concentrates, e.g. near a charged functional group.) Alternatively, one or both electrical contacts may be via graphenoid nanostructures which are pi-stacked with a portion (preferably less than one half the area of one side) of said absorber moieties and one or both of said graphenoid nanostructures serving as electrical contacts and wiring comprised charged functionalities or side groups to further promote charge separation of photogenerated excitons. The exquisite and arbitrary control over structure enables a vast variety of different structures featuring different geometries and different patterns of functionalization to tune efficient absorption of specific frequencies with reduced recombination of separated charge and accordingly high quantum yield. Such optical absorbers coupled with electrical contacts and tuned to specific frequencies are suitable as Scheme I:

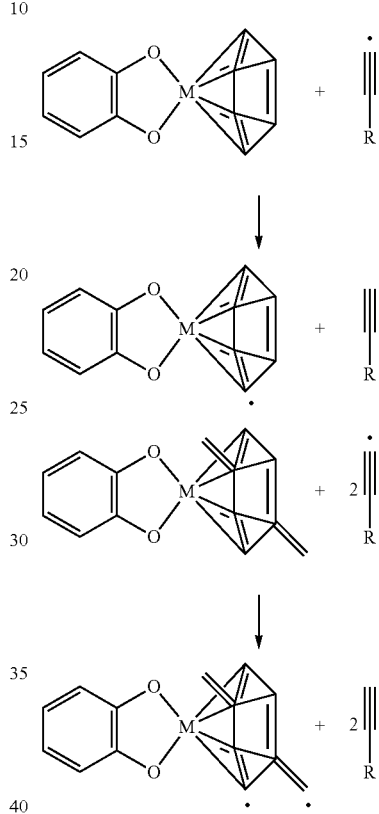

Scheme III:

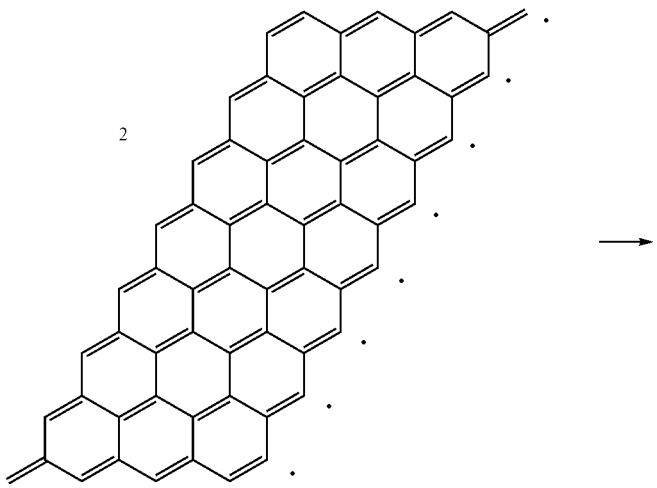

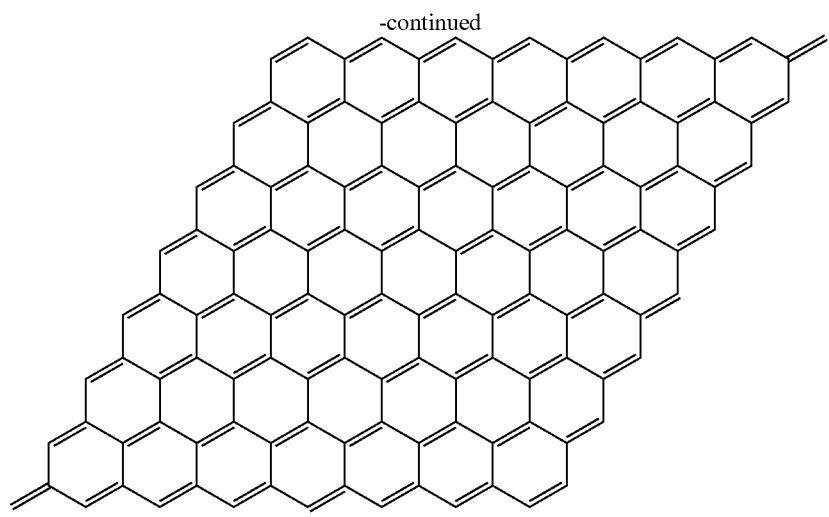
Scheme II:
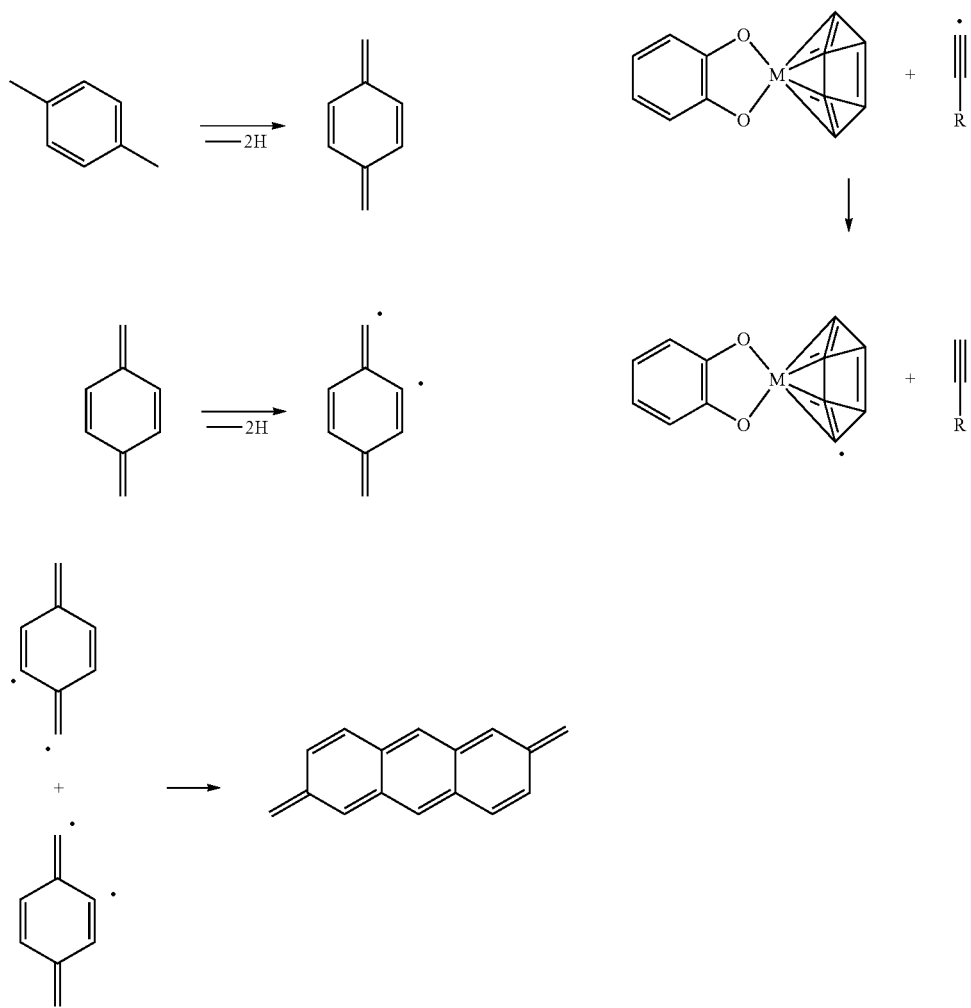

selective optical receiver devices for optoelectronic applications and especially multiplexed variations thereof. For energy conversion in photovoltaics, a plurality of arrays of such optical absorbers coupled with electrical contacts and tuned to specific frequencies, especially with the position of said arrays ordered in space such that higher frequencies are received first along the path of incident radiation and electrical contacts to each such tuned array are regulated at electrical potential such that obtained current (of photoelectrons) is available at the highest electrical potential possible from the incident frequency of photon from which it arose and energy obtained is maximized; before conversion, energy output from such a device features a range of voltage outputs delivered at multiple contacts. The particular combination of this property with the high conductivity (high electron and hole mobilities) of graphene further enhances photovoltaic applications. Additionally, it has been reported that each single graphene layer (one atom thick) attenuates visible light by about 2%, so in combination with the strength of graphene, these properties enable the use of one or a few layers of graphene as a transparent electrode for photovoltaic devices according to the present invention; since the graphene fabrication methods disclosed herein also enable the predetermined incorporation of arbitrary voids, and since such an electrode need not be continuous, more preferably a large fraction of the area of such an electrode instead is omitted as void area, whereby such transparent electrodes absorb less incident light.

Systems for converting wind energy and capturing $CO_2$ and pollutants, and adaptations and improvements thereof:

Methods and means for extracting energy from charged aerosols caused to travel against an electric field by fluid flow such as wind or gravitational potential (especially from evaporations caused by solar energy with condensation at a greater elevation in a gravitational field such as that of the Earth or a massive body) as well as other applications of means therefor, have been taught by A. M. Marks in U.S. Pat. Nos. 4,206,396, 4,433,248, 2,638,555, and references therein and are incorporated herein by reference. In essence, charged particles are caused to flow against an electrical potential and charge is captured by an electrode at higher potential, from which current may flow through a load and return to low potential, work being done to cause flow of charged particles by wind or flow of liquid from an elevated point before aerosolization after gaining kinetic energy. Fabrication and assembly methods of the present invention may be applied to the fabrication of devices according to Marks. Additionally, improvements thereto may be realized through the structural precision attainable through nanofabrication and also the use of specific materials facilitated with the present inventions such as graphene and nanotubes. In particular, it has been shown that water flow through carbon nanotubes is particularly efficient, more so than predicted from experience at larger scales; accordingly, high velocity flow of water or other liquids through nanotube conduits prior to aerosolization straightforwardly facilitates improved efficiencies. For forming larger droplets, nanotube conduits may be oriented or directed such that flow from orifices thereof converges, the number and relative angular orientation of a plurality of nanotube conduits being adjusted, most preferably dynamically by actuators of the present invention, according to desired droplet size and flow rate as well as liquid properties.

Further improvements over Marks may be realized by utilizing different methods and means to cause charge separation for obtaining charged aerosols. In a first alternative, an aqueous electrolyte such as seawater, a sodium chloride solution, a sodium hydroxide solution or a calcium hydroxide solution or an ammonium hydroxide solution or another electrolyte is subjected to electrohydrodynamic or magnetohydrodynamic separation to an extent sufficient to yield sufficiently net-charged output solutions (a first net-charged solution and a second net-charged solution) to yield desired net charge per desired particle volume of aerosol droplets. In a second alternative, A Kelvin water-dropper arrangement is utilized to obtain net charged solutions from one of the electrolytes of the preceding alternative. With either alternative, one of the two obtained net charged solutions is aerosolized and caused to ascend an electrical potential (e.g. by entrainment in wind or another fluid flow, or from initial velocity, e.g. caused by descent of the liquid in a gravitational potential) whereafter particles are collected on a collector. Said collector may itself be an electrode or alternatively only means for mechanically capturing particles and causing same to flow to a collection reservoir. The second net-charged solution generally is retained at the original electrical potential, although some embodiments may also aerosolize this solution and cause it to traverse an electrical potential opposite in sign to that traversed by the first net charged solution; for example a net charges are separated, a first net charged solution having excess negative charge is caused to traverse a potential difference to a more negative electrical potential and a second net-charged solution having excess positive charge is caused to traverse a potential difference to a more positive electrical potential; a switch may be closed to permit current to flow across a load between said negative electrical potential and said positive electrical potential, whereby electrical energy may be utilized.

Further improvements possible over Marks include the exploitation of wind energy at high altitudes, where winds are typically more available and characteristically have higher velocities. Fabrication and assembly methods of the present invention and materials obtained thereby further facilitate this improvement. In particular, graphenoid materials, carbon nanotubes and diamondoid materials feature high strength-to-mass ratios and so facilitate lightweight but durable construction. Further, these materials feature excellent corrosion resistance, favoring long service life with respect to both environmental degradation and exposure to corrosive solutions. Alternatively, conventional fabrication and assembly methods may be used to construct similar structures and devices embodying this aspect of the present invention, e.g. with graphite, carbon fibres and diamond-like coatings or vinylic polymer coatings or parylene coatings or other suitable coatings. A Marks-type wind/electrical generator may be housed in a lofted structure which is preferably tethered or secured (e.g. maybe secured to the ground or to a floating vessel on a body of water or may be moored to the bottom of a lake or ocean or other body of water) by high-strength cables, e.g. comprising graphene or nanotube construction. Preferably said cables further comprise insulated wires (which may themselves be graphene, carbon nanotubes or other conductive nanotubes, generally bundles thereof) for transmitting electrical energy to a point of use or a transmission network. Such tether cables preferably further comprise conduits for conveying liquids to and from said lofted structure. Preferably said lofted structure comprises structural members for providing lift in a fluid flow and for controlling aerodynamics. Preferably, said lofted structure comprises enclosed volumes which may either be rigid or mechanically persistent bodies enclosing an evacuated space or alternatively filled or inflated with a lighter than air gas such as helium or hydrogen. Note that nanofabricated diamond sheeting of one micron thickness is reputedly sufficient to resist atmospheric pressure, such that relatively small total masses may enclose significant volume of evacuated space, providing buoyant lift in the atmosphere (although greater thicknesses may certainly be used.) Alternatively, high strength sheeting such as graphene sheeting may be stretched across a rigid frame (more preferably of steel or of tungsten or of titanium or an alloy or most preferably of diamond or beta-silicon-carbide construction) to yield and enclosed space which is evacuated; alternatively still, balloon filled with lighter than air gas may be used.

The foregoing type structure featuring droplets entrained in a gas flow resembles industrial contactor devices for capturing components of a gas stream via interfacial transport from gas to liquid phase across the large aggregate surface area summed over the number of droplets, and this fact is a particular reason for interest in this class of device, i.e. if appropriate aerosol composition is chosen, carbon dioxide or other pollutants may be captured in tandem with electricity generation with only modest additional cost or effort. In particular, hydroxide electrolytes (e.g. sodium hydroxide, potassium hydroxide, magnesium hydroxide, calcium hydroxide) or solutes comprising amines especially at high pH are among those liquids or solutions capable of capturing $CO_2$. Alternatively, aerosols of sorbent materials such as amine-based liquid sorbents may be generated in tandem with charged aerosols, or may themselves be charged as in Marks' original methods. The application of functionally similar to this type to the capture of $CO_2$ from the atmosphere, in particular using NaOH and CaOH droplets, but falling under gravitation were studied and developed by J. K. Stolaroff, and teachings thereof may be availed for specific guidance concerning relations between flow rates and droplets sizes, etc., and so [Sto06] is incorporated herein by reference.

In a preferred case of the foregoing, said lofted structure is of a design similar to flying-wing aircraft but more preferably featuring larger than conventional proportional areas of air intake and outflow ports, and preferably featuring larger vertical (or partially vertically projected, e.g. diagonally projected) stabilizers than would be possible with an aircraft which lands conventionally, to impart greater stability.

Choice of altitude is determined by factors most desired to be optimized: for instance, reduced loss of water to evaporation will occur at lower temperatures and higher altitudes, while capture of $CO_2$ from the atmosphere will probably be greater at greater temperatures where water is liquid, and altitudinal wind velocity distributions vary both geographically and temporally; preferably, altitudes of lofted generators and/or capture devices may be adjusted dynamically by providing spooling means for adjusting tether or cable length and means for controlling said spooling means. More preferably still, two or more lofted bodies may be secured by one or more common tethers, cables or umbilicals, and held a different altitudes and operated to optimize a different result (e.g. by modifying one or more operating parameter, preferably under automated [e.g. computer] control.)

A further improvement possible with the foregoing system presenting substantial surface area at high altitude relates to the fact that one major limitation of photovoltaic electricity generation is scattering and attenuation of solar radiation by clouds. The foregoing lofted systems are expected to frequently be deployed at altitudes greater than those of typical cloud-cover, and so constitute convenient platforms for the deployment of photovoltaic devices above typical cloud-cover levels for increasing duration of photovoltaic electricity generation. Preferably, photovoltaic devices and associated components are situated atop a lofted wind-generator or lofted $CO_2$ capture device or lofted pollutant capture device. More preferably still, said photovoltaic devices are mounted on solar tracking means atop said lofted system and more preferably in this case, ailerons are provided on the bottom surface of said lofted system and operated to compensate for aerodynamic forces arising from the positioning of said solar tracking means. More preferably still, the foregoing systems may be housed in an outer shell at least the top surface of which is transparent to solar radiation, and photovoltaic devices are mounted on solar tracking means housed inside the outer shell such that solar tracking does not lead to forces due to aerodynamic forces from wind on surfaces not aligned with the direction of wind flow. More preferably, said photovoltaic devices are lightweight; most preferably, said photovoltaic devices comprise at least one of: graphenoid absorber moieties, a graphene electrode, an aluminum electrode, nanotubes, oligoacenes, nanostructured silicon.

Note that reduced temperature at high altitude additionally favors the absorption of atmospheric methane by water droplets, and may cause the formation of clathrates. Inclusion of tertiary amines may likewise favor methane absorption [Fei72] as well as reduce the freezing point of droplets, so collection of liquid from electrodes followed by degassing with collection of gas, warming to boil off methane with collection thereof or alternatively filtration of clathrates therefrom represent preferred embodiments of this aspect of the present invention, and addition of tertiary amines, e.g. Tetrabutylammonium, to solutions for atomization to droplets used in conversion of wind energy to electrical energy are further preferred.

Accordingly, systems according to this class of embodiments of the present invention may comprise functions including the 16 combinations of: wind powered electricity generation, $CO_2$ capture, atmospheric methane capture, pollutant capture, solar energy conversion lofted above cloudcover.

EXAMPLES

In the following examples, descriptions given are of single samples for simplicity; in practice, a plurality of samples or particles or surfaces will be treated in parallel or batches and, where random, modifications are likely to occur at a plurality of sites on each surface. When used as tools, preferably locations of modifications on surfaces are mapped and information stored, permitting multiple modifications on each particle to be used between tool changes and also to prevent undesired contact of tools with target sites. In preferred cases, each tool or reactant or intermediate or workpiece is situated on a separate body, structural member, or carrier.

Example I: Si(100):2×1 Supported Ethyne Tool Nanofabrication

A clean, flat hydrogenated Si(100):2×1 surface under UHV is specifically dehydrogenated using an opposed STM at specific sites for anthracene chemisorption, preferably by the feedback controlled loop method of Lyding et al., [Lyd98]. 9-chloro-9,10-dihydro-Anthracene vapor at a pressure of 1-1000 picoTorr is contacted with the specifically dehydrogenated Si(100):2×1 surface for a time sufficient for isolated molecules to specifically chemisorb thereto. This vapor is removed or flushed out with argon, and a vapor of sodium acetylide is introduced for a time sufficient for reaction with chemisorbed 9-chloro-9,10-dihydro-Anthracene to yield ethyne functionalization thereof.

Example II: Si(100):2×1 Supported Base Tool Nanofabrication

A clean, flat hydrogenated Si(100):2×1 surface under UHV is specifically dehydrogenated using an opposed STM at specific sites for anthracene chemisorption, preferably by the feedback controlled loop method of Lyding et al., [Lyd98]. 2,3-benzo-5,6-benzo-7-aza-norborna-2,5-diene vapor at a pressure of 1-1000 picoTorr is contacted with the specifically dehydrogenated Si(100):2×1 surface for a time sufficient for isolated molecules to specifically chemisorb thereto.

Example III: Supported Base Regeneration Tool Nanofabrication

A clean, flat hydrogenated Si(100):2×1 surface under UHV is specifically dehydrogenated using an opposed STM at specific sites for anthracene chemisorption, preferably by the feedback controlled loop method of Lyding et al., [Lyd98]. B-chloro-2,3-benzo-5,6-benzo-7-bora-norborna-2,5-diene vapor at a pressure of 1-100 picoTorr is contacted with the specifically dehydrogenated Si(100):2×1 surface for a time sufficient for isolated molecules to specifically chemisorb thereto.

Example IVa: $C_{dia}(111)$ Halogenated

A clean, flat hydrogenated $C_{dia}(111)$ surface is briefly subjected to plasma etching with hydrogen plasma for a period sufficient only for a small fraction (e.g. 1%) of surface hydrogens to be abstracted (yielding $H_2$ molecules and tertiary surface radicals.) Plasma is cleared, and the surface is exposed to $I_{2(g)}$ to yield an unstable surface iodination (other halogens, e.g. $Br_2$, $Cl_2$, $F_2$, may be used when lower reactivity is preferred, or, in the case of $F_2$, to yield a modification useful as a monodentate ligand.)

Example IVb: $C_{dia}(111)$ Supported Ethyne/Ethide Tool Fabrication

The product from Example IVa is contacted with a dilute solution of sodium acetylide (NaCCH, or other metal acetilide, including e.g. LiCCLi) preferably in a polar solvent such as dioxane or methyl ether to facilitate halide bond-dissociation and $S_N1$ reaction.

Example V: $C_{dia}(111)$ Supported Base Tool Fabrication

The product from Example IVa is contacted with a dilute solution of sodium amide or ammonia base, preferably in a polar solvent such as dioxane or methyl ether to facilitate halide bond-dissociation and $S_N1$ reaction. If a sufficient excess concentration of sodium amide is used, is deposited amines, being more acidic than sodium amide, will be deprotonated to yield RNHNa or RHN⁻ to significant extent, so conditions may be optimized according to whether or not this is desired for a given tool use. For direct deprotonation of ethyne tools using deprotonation tools, RHN is most preferred.

Example VI: $C_{dia}(111)$ Supported Ligand Tool Fabrication

The product from Example IVa is contacted with a solution of an aliphatic ester of glycine, such as the glycine

51 methyl ester preferably in the presence of a hindered base such as triisopropyl amine, preferably in a polar solvent such as dioxane or methyl ether to facilitate halide bond-dissociation and SN1 reaction. Optionally, the product is treated with a nucleophile such as sodium hydroxide (e.g. at pH 9) to hydrolyze the ester to yield a surface bound carboxylate.

Example VII: $C_{dia}(111)$ Supported Metal Ligand Complex Tool Fabrication

The product from Example VI is contacted with a solution of Cu(I)Cl in a polar solvent for a sufficient time for binding Cu(I) to surface-linked carboxylate, rinsed and then contacted with a disproportionation solution comprising Cu(I) Acetate and Cu(II)Acetate, rinsed and then contacted with a solution of Cu(II)Acetate. Most surface carboxylates should be involved in Cu(II)Acetate complexes (R—N-Glycinate $(Cu(II)_2Acetate_3)$ useful as an oxidation tool.

Example VIIIa: $C_{dia}(111)$ Supported Ethynyl Radical Tool Fabrication

A product from Example IVb prepared using sodium acetylide is contacted with a solution of Cu(I)Acetate, Cu(II)Acetate, and an amine base analogous to [Cli63] but omitting any dissolved ethynylic species, to yield the oxidized surface-bound ethynyl radical. Note that in these conditions it is likely that copper amide species are generated via disproportionation of Cu(I) to Cu(O) and Cu(II) with the binding of the neutral metal to nitrogen reducing the barrier to deprotonation of nitrogen, e.g. by other amines or ammonia or hydroxyls arising from disproportionation of water. Density functional calculations (not shown) predict that metal bound amide RNHCu$^+$N is a sufficiently strong base to deprotonate ethyne tools complexed (eta-2) with Cu(I) (e.g. bound by a diamine ligand.) Cu(II)Acetate is then contacts with the deprotonated ethyne. A further improvement may be readily realized by situating these species on nanopositioned supports and preforming the foregoing reaction under positional control, which is made straightforward by the methods and means of the present invention.

Example VIIIb: $C_{dia}(111)$ Supported Ethide Tool Nanofabrication

A product from Example IVb prepared using sodium acetylide is mounted in an opposed STM on a first surface. A product from Example V prepared using sodium amide at higher is concentration is mounted on a second surface opposed to said first surface, and the relative positions of modification sites are determined. A solution of Cu(I)Acetate is optionally added as a catalyst. Amine/amide modification sites are contacted to ethyne modification sites to permit deprotonation of ethyne modifications to yield ethide modifications. If Cu(I)Acetate was used, extensive rinsing of samples is done, including ammonia to remove copper.

Example VIIIc: $C_{dia}(111)$ Supported Ethynyl Radical Tool Nanofabrication

A product from Example VII is mounted in an opposed STM on a first surface. A product from Example VIIIb is mounted on a second surface opposed to said first surface, and the relative positions of modification sites are determined. (R—N-Glycinate$(Cu(II)_2Acetate_3)$ modification sites are contacted to ethide modification sites, whereby ethide modifications or a predetermined fraction and spatial

52 distribution thereof are oxidized to ethyne radical modifications, useful as hydrogen abstraction tools and halogen abstraction tools.

Example VIIId: $C_{dia}(111)$ Supported Ethynyl Radical Tool Nanofabrication

A product from Example VII is mounted in an opposed STM on a first surface, and the relative positions of modification sites are determined. At modification sites desired to be transformed to radicals, direct electrooxidation is performed using the STM tip, at a positive bias, preferably above +2V or at leased pulsed to such a bias, whereby ethide modifications or a predetermined fraction and spatial distribution thereof are oxidized to ethyne radical modifications, useful as hydrogen abstraction tools and halogen abstraction tools.

Example IX: $C_{dia}(111)$ Supported Ligand Tool Nanofabrication

A clean, flat hydrogenated $C_{dia}(111)$ surface is mounted in an opposed STM on a first surface. A product from Example VIIIc or Example VIIId is mounted on a second surface opposed to said first surface, and the relative positions of modification sites are determined. Pairs of adjacent $C_{dia}$ (111) hydrogens are abstracted, in patterns suitable for forming all-trans-all-s-trans-polyene omega binding ligands for binding polyenes of desired length, most preferably in most extended conformation, drawn taught by ligands. The sample is removed to a different chamber away from ethyne radicals, and the surface comprising dehydrogentated sites (surface radicals) is exposed to $I_{2(g)}$ to yield an unstable surface iodination (other halogens, e.g. $Br_2$, $Cl_2$, may be used when lower reactivity is preferred.) Gas is flushed with inert gas, e.g. Argon, and then the sample is contacted with $(NH_2)_3AlBr$ vapor or a solution thereof, preferably in a polar solvent such as dioxane or methyl ether to facilitate halide bond-dissociation and $S_N1$ reaction, to form R(NH$_2$)AlBr(NH$_2$). Preferably, amines are further deprotonated, e.g. using a base tool as from Example V is used similar to use in Example VIIIc to remove protons from nitrogens to yield R(NH)AlBr(NH).

Example X: $C_{dia}(III)$ Supported Polyene Addition Tool

A product from Example IX is contacted with a solution or vapor of all-trans-Li(CH)$_n$Li. Solvent, if any is removed, and the sample is thermally annealed to facilitate trapping of the desired ligand relative configuration (aluminum atoms in closest possible configuration) and also taught spanning of ligands by the polyene transmetalating thereonto. Multiple thermal annealing cycles may be performed to ensure displacement and migration of LiBr away from loaded tool.

Example XI: $C_{dia}(110)$ Preparation for Polyene Addition

A clean, flat hydrogenated $C_{dia}(110)$ surface is mounted in an opposed STM on a first surface, with the $1\bar{1}0$ crystallographic axis of the $C_{dia}(110)$ in predetermined orientation. A product from Example VIIIc or Example VIIId, preferably with a large surface sparsely populated with ethyne radical modifications is mounted on a second surface opposed to said first surface, and the relative positions of oxidized modification sites (i.e. ethynyl radicals useful for hydrogen abstraction) are determined. At a location on said hydrogenated $C_{dia}(110)$ surface to which it is desired to add a 110 row of carbons, hydrogens are abstracted by contacting an unused ethynyl radical therewith, recording the usage of the ethynyl radical used so it is not attempted to reuse same without regeneration thereof, and repeating the foregoing for other hydrogens at said location, and, according to the precise reaction mechanism desired, optionally also abstracting target atom adjacent hydrogens (see FIGS. 3A and 3B for two important alternatives) by performing similar steps therefor.

Example XII: $C_{dia}(110)$ Polyene Addition

A product from Example XI mounted in an opposed STM on a first surface, with the crystallographic axis of the $C_{dia}(110)$ in predetermined orientation is translated into facing juxtaposition with a product from Example X mounted in predetermined orientation on a second surface opposed to said first surface such that the long axis of the polyene thereon is parallel to the 1$\bar{1}$0 axis of said product from Example XI. If they are not already known, position of loaded polyene binding tool mounted on said second surface is first determined and necessary trajectory for positioning said polyene binding tool relative to dehydrogenated target site is computed. Said loaded polyene binding tool is translated into facing juxtaposition with said target site and advanced thereto and contacted therewith, as necessary pressure is applied to drive polyene carbons to form bonds with surface target atoms; pressures applied may exceed GPa but preferably are more than at least 100 MPa (due to the small contact areas involved, these represent only modest forces.) Opposed surfaces are then withdrawn from each other, breaking metal-carbon atoms and leaving polyene adducted to surface target atoms as a saturated, hydrogenated row (see FIG. 3E for a series of images of AM1 predicted optimal structures of a reaction like the foregoing but with a nitrogen substituted polyene to yield a product substituted by nitrogen at a predetermined site). The foregoing may be repeated at adjacent rows or other desired sites to fabricate up bulk diamondoid materials or diamond nanostructures.

Example XIIa: Diamond Color Center Fabrication, Fabrication of Component Devices for Quantum Computation and Information Storage Color centers comprise an atomic substitution (e.g. nitrogen substituting for a carbon atom) adjacent to an atomic vacancy. Desirable color centers may additionally comprise isotopic carbon substitution (e.g. $^{13}C$) at positions near or adjacent to vacancies or atomic substitutions, whereby nuclear spin may be coupled to electron spin. Such features may be fabricated at precisely desired positions in a nanostructure or bulk material, e.g. in predetermined patterns, as in Example XI but using atomically substituted polyene. Substitution may be internal or terminal. In a convenient case, substitution is terminal, e.g. N-substitution (1-aza-polyene or 1-imene-polyene) and a second polyene is similarly added along the same 110 trough colinear to the substituted polyene but displaced by one carbon atom to leave the desired vacancy. Further polyenes are similarly added to surround the substitution and vacancy. Where isotopic substitution is desired, polyene reactants must be provided with corresponding position substituted with the desired isotope. Although various schemes for heterofunctional terminally modified polyenes with isotopic substitution at a non-central position may accomplish this, especially using heterometallic metal ligands complex pairs for binding thereof in a binding tool, most target structures and device designs could either tolerate additional isotopic substitutions more than about 600 pm away from that most strongly coupled to a color center. In this case, a symmetrically substituted polyene having both terminal carbons isotopically substituted facilely suffices. Color centers are found to display long spin coherence times supporting longlived entangled states and so hold great promise as information storage means for quantum computation. Similarly, such structures and compositions may serve as components in spintronic devices.

Example XIIb: Diamond Color Center Fabrication, Fabrication of Component Devices for Quantum Computation and Information Storage, from Non-Colinearly Placed Precursors Similar structures as those fabricated in Example XIIIa may be fabricated again through polyene addition but forming a vacancies between colinear polyene adducts along a 110 trough by shifting addition by one atom to leave a gap and adding a second, atomically substituted polyene with the substituted atom adjacent to the vacancy; alternatively, said atomically substituted polyene may be deposited first and polyenes for forming a gap may be deposited with terminal carbons thereof targeting carbon atoms of said atomically substituted polyene adjacent to the substituted atom and leaving a vacancy or gap where there would otherwise be an atom bonded to the substituted atom in bulk diamond.

Example XIIc: Diamond Color Center Fabrication, Fabrication of Component Devices for Quantum Computation and Information Storage Similar structures as those fabricated in Example XIIa and XIIb, color centers may be fabricated from one or more substituted cumulene deposited as in embodiments of [Rab08] or similarly from carbon dimers and substituted carbon dimers as in [Rab08], with the additional reactant of $^{13}C$ monosubstituted carbon dimers being useful in the later case where isotopic substitution is also desired.

Example XIII: Loaded Polyene Addition Tool from α,ω-dihalo-n-alkyl Precursors

A α,ω-dihalo-n-alkyl compound is treated with an alkaline or alkaline earth metal (e.g. Li, Mg, etc.) to form a terminally dimetallated intermediate. This is contacted (either as vapor or in solution) with the product of Example IX or an analogous binding tool bound to a structural support positioned by positioning means to become bound thereto via transmetallation. Preferably, thermal annealing or rinsing or flowing of a gas stream is performed to displace any Alkaline halide salt which remains bound. Hydrogen abstraction tools, such as prepared in Example VIIId are used in similar to use in Example XI but to abstract hydrogens from the supported-ligand-bound n-alkyl chain, preferably from pairs of adjacent carbon atoms starting either with a terminal carbon or a carbon adjacent thereto in the alkyl chain, such that, in the preferred case of paired abstraction steps from adjacent carbons. double bonds are formed upon intersystem crossing. Note, however, that abstraction could instead be done on alternating carbon atoms or in arbitrary order, probably without ill effects, although care should be taken to avoid contact between an active abstraction tool and a radical site or unsaturated site to avoid undesired bond formation through radical attack. Clearly, numerous atomic and isotopic substitutions may be achieved by providing the correspondingly substituted a,w-dihalo-n-alkyl precursors, which in conventional syntheses is generally simpler than for polyenes and their derivatives. Further advantages are that alkyl compositions are generally more stable than polyenes, more readily available, and terminal substitutions are sufficiently simple to realize and are also at present commercially available.

Example XIIIb: Tool to Tool Transfer of Reactants or Intermediates

A loaded tool as prepared in Example XIII comprising metals of a first type, e.g. Magnesium, may be facingly juxtaposed to a similar unloaded tool prepared in Example IX having metals of a second type, e.g. Aluminum, capable of causing transmetallation thereonto of the reactant loaded in Example XIII now juxtaposed therewith. Accordingly, one binding tool may be used to prepare and transport reactants or precursors thereof and transfer reactants so transported to binding and deposition tools at a site of use in deposition operations.

Example XIV: Convergent Synthesis or Polyaromatic Compounds

Figure 5B:
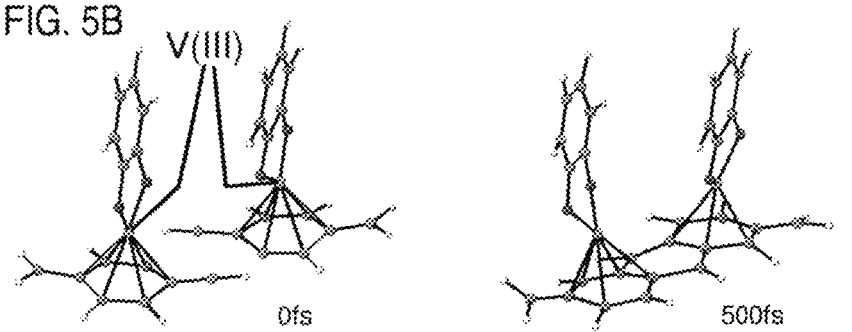
FIG. 5 illustrates various examples of methods and means for convergent fabrication and assembly of graphenoid nanostructures according to these aspects of the present invention. Note the formation of multiple aromatic rings in a single step and without rotation about bonds. Calculations are optimization where times are not indicated, and in all of FIG. 5 were performed using PM6 as implemented in cp2k. Note also the curvature imparted by Co(II) binding, suitable for bending graphene into configurations suitable for convergent assembly into carbon nanotubes. Note also that upon reaction, Co(III)catecholate changes in preference to eta-2 binding, presumably due to change in electronic state due to reaction. Note that the third panel of FIG. 5D follows one electron reduction of the structure shown in the second panel of FIG. 5D, which speeds the final ring closure.
In FIG. 5A, starting separation of radical centers is 268 pm; in the remainder of starting structures, average separations are 290 pm. The system in FIG. 5A is monocationic triplet; dicationic quintuplet in FIG. 5B; dicationic nonalpet in FIG. 5C; neutral quintuplet and then monocationic quadruplet in FIG. 5D, all of which follow from ground states of isolated reactants or are ground states.
Figure 5C:
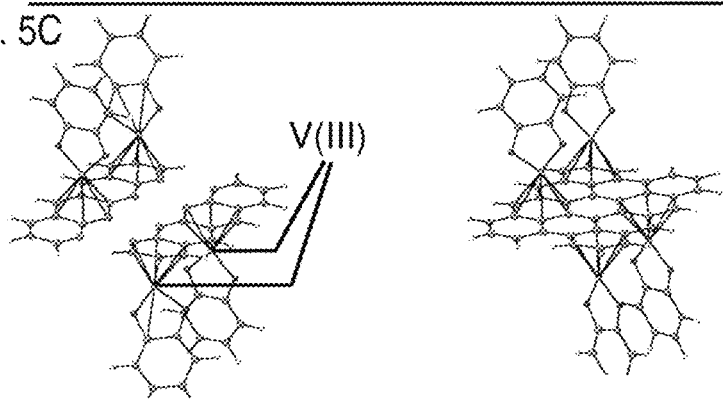
Figure 5D:
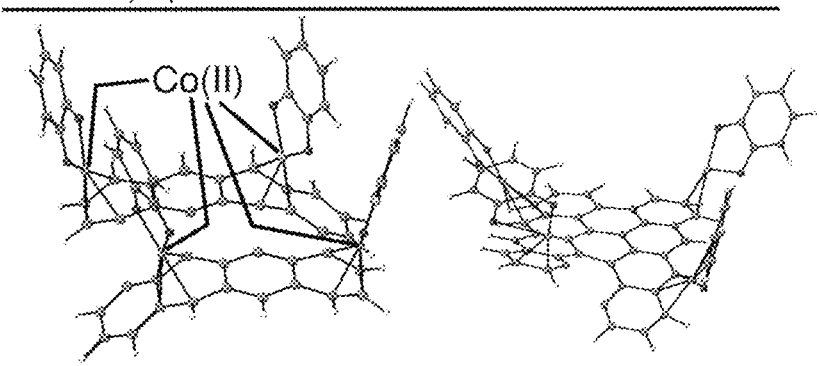
Figure 5A:
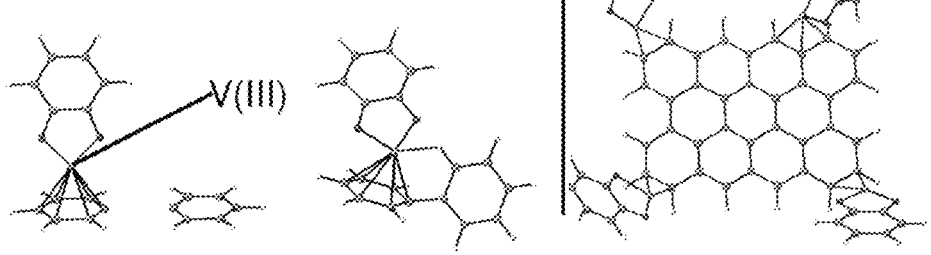
Figure 6A:
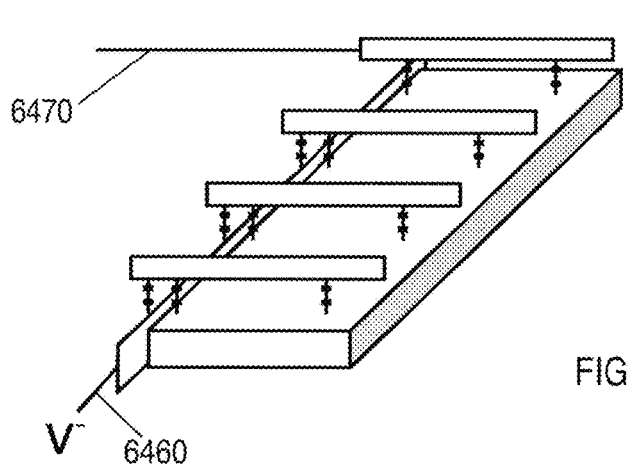
FIG. 6A depicts one of two surface supported arrays of conductors electrically in communication to a common conductor via electrical linkages (e.g. of diacetylene composition) for a comb-type capacitive actuator, schematically shown in FIG. 6B, which may additionally feature a position controlled electrical switch based on sliding contact between conductors 6470 and 6475, contact closed by translation of the subject actuator, schematically shown in FIG. 6C in closed position.
Figure 6B:
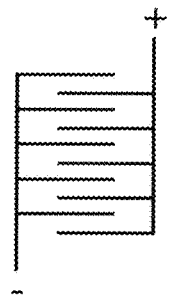
FIG. 6D depicts a complete comb-type capacitive actuator comprising two facingly juxtaposed supported arrays of conductors (6420 which are e.g. of graphenoid composition) rigidly linked to electrically insulating support members 6430 (e.g. of diamond or β-silicon-carbide composition) by links 6440 (e.g. of diacetylene composition) with oppositely biased electrical contacts 6460 and 6465 and switch contacts 6470 and 6475.
Figure 6C:
Figure 6D:
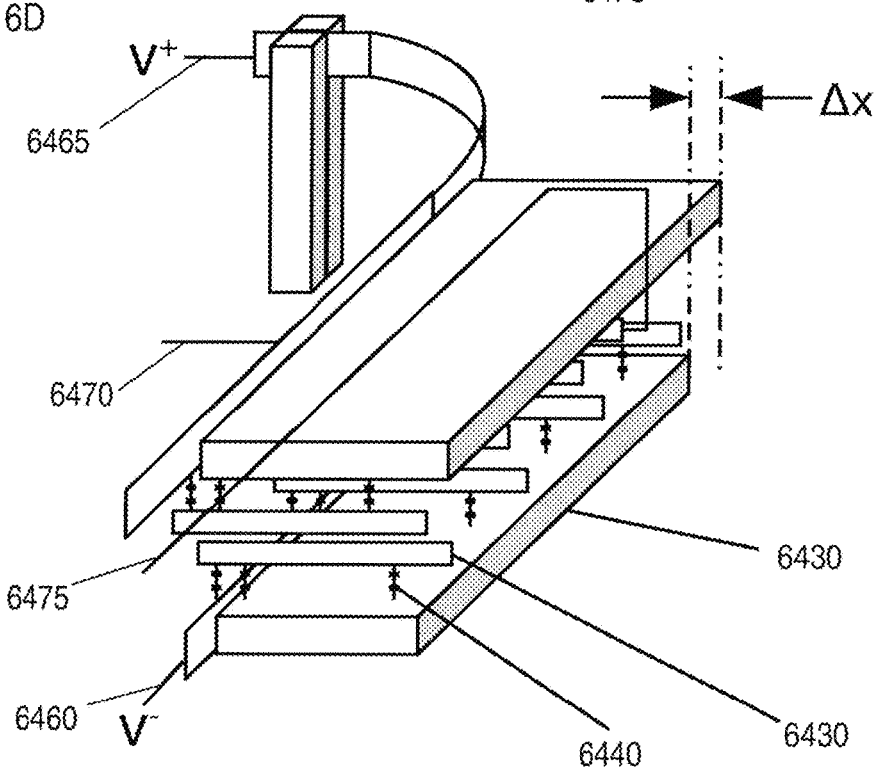

Parylene vapor is heated to dissociation to p-xylylene in the presence of a nanopositioned support-bound V(III)catecholate complex or Cr(II)catecolate complex. A boron radical situated on a said nanopositioned support located to face one of the xylylene double bonds to associate therewith, whereby said xylylene is bound in a definite orientation in a heterobinuclear complex, whereby positions of methene hydrogens of said xylylene are held in a fixed and predetermined location in space. A first abstraction tool (e.g. an ethynyl radical (e.g. as prepared in Example VIIId) is used to abstract a hydrogen from the position on xylylene ortho to the methene not bound by boron. A second abstraction tool (e.g. as prepared in Example VIIId) is used to abstract a hydrogen from the methene not bound by boron. The foregoing is performed with an additional set of ligands and tools on a second p-xylylene molecules, preferably in tandem with the foregoing. Structural members supporting ligands are translated by nanopositioning means causing radical sites to be contacted to form bonds yielding a product comprising a newly formed aromatic ring, as shown in FIG. 5B, i.e. a new aromatic ring is formed in a single step from two reactants, substantially without any bond rotations. The obtained product features exocyclic methenes suitable for further reactions to form products themselves suitable for further reactions to form extended polyaromatic compounds without internal gaps or voids.

Example XV: Graphenoid Addition to Diamondoid

A hydrogenated Cdia(111) surface of a sample is subjected to H-abstraction at desired sites using nanopositioned ethyne radical tools and ethyne modification as in preceding examples to yield ethyne modifications at sites where linkage to graphenoid members is desired. Graphenoid members are modified with ethyne groups at sites to which linkage to diamondoid member is desired. Graphenoid members are manipulated by nanopositioned V(III)Catecholate cation facially bound, e.g. as in FIG. 5C and translated such that ethynes desired to react together to form diacetylene linkages are held in close proximity. Conditions are adjusted to cause reaction of colocalized ethynes to yield diacetylene linkages (e.g. flowing into the chamber a solution capable of catalyzing an Eglinton reaction thereof, e.g. following [Cli63].). Products such as those shown in FIG. 3H are thus fabricated. As desired, bilayer structures may be fabricated. As desired, bilayers may be crosslinked, e.g. as shown in FIG. 3H, e.g. by abstracting selected hydrogens and contacting with a crosslinking reagent comprising at least two unsaturations.

Example XVI: Graphene Supported Catecholate Ligand Assembly 4-methyl-Catechol is used as a reactant in the fabrication of graphene to yield 1,2-dihydroxyl substitution at a desired edge location. For this, 4-methyl-Catecholate may be bound as a ligand to a nanopositioned Al(III)Caetechol in a dicatecholate complex, or to one of the supported A(III) complexes shown in FIG. 3N operatively coupled to nanopositioning means. The reactant is additionally bound facially by a nanopositioned V(III)Caetechol, e.g. similarly to FIG. 5B. Hydrogen is abstracted from position 5 and from the methyl group, and this reactant is reacted with another reactant comprising one or more aromatic rings and preferably also one or more exocyclic methenes from which hydrogens have been abstracted, e.g. as in FIG. 5B. The resulting 1,2-dihydroxy functionalized aromatic compound is then preferably modified to comprise two or more ethyne functionalities along an edge and linked as in Example XV to a $C_{dia}(111)$ surface to yield a supported and stably oriented ligand useful, e.g. for binding metals for binding aromatic rings for causing convergent fabrication of graphenoid materials as taught herein.

Example XVII: $C_{dia}(111)$ Supported Graphene Actuators $C_{dia}(111)$ is linked to graphenoid members as in Example XV, said graphenoid members for serving as wires and electrodes for comb-type actuators as depicted in FIG. 6. Electrical contacts analogous to vias of conventional circuits may be formed between graphenoid ribbons by diacetylene or acetylene linkages. Diamondoid supported graphenoid actuator members are manipulated as taught in [Rab08] and facingly juxtaposed with graphenoid members interdigitated as shown; alternatively, manipulation may be via the communication of bound facial metal complexes supported by nanopositioning means. As desired, the device thus formed may be charged to facilitate release of one actuation member from the manipulator, yielding a device as shown in FIG. 6.

Example XVII: $C_{dia}(111)$ Actuator Supported Graphene Supported Ligand

One or more graphenoid members of Example XVI is prepared from reactants comprising catecholate reactants as in Example XVI, fabricated to bear oxygens at a desired predetermined site thereon, is used as a graphenoid member as in Example XV to form an actuator as in Example XVII for nanopositioning the supported catecholate ligand thus created.

Example XVIII: $C_{dia}(111)$ Actuator Supported Graphene Supported Ligand Metal Complex A product obtained in Example XVII is contacted with a solution comprising a metal cation such as V(III) solvated with dioxane, forming a catecholate-type ligand-metal complex therewith. The obtained complex is useful for binding to aromatic species, manipulating same and modifying the reactivity of same, and also performing reactions and fabrication and assembly operations as taught herein.

Example XIX: β-Silicon-Carbide Fabrication $X(SiH_2CH_2)_nX$ where X is a halide is treated with an alkaline metal to yield α,ω-metalated intermediate, and then caused to bind (as in) to a tool as prepared in Example IX and dehydrogenated to yield the conjugated polycarbosilene analogous to a polyene as done for n-alkyl precursors in Example XIII. A target site on a hydrogenated (110) surface of a β-Silicon-Carbide body is prepared by hydrogen abstraction as done for $C_{dia}(110)$ in Example XI. The tool-bound conjugated polycarbosilene is used to add the unsaturated fragment loaded thereon to said target site, as done for conjugated polyene deposition onto $C_{dia}(110)$ in Example XXII but accounting for differences in lattice constant. Alternatively, a bare (110) surface of a β-Silicon-Carbide body may be used, particularly for smaller bodies less likely to undergo any long-range surface reconstructions.

Figure 11:
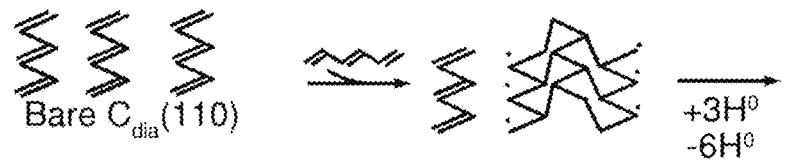
FIG. 11 depicts the addition of a conjugated polyene to an edge of a $C_{dia}(110)$ surface forming a structure resembling a 2×1 reconstructed (100) surface perpendicular to the (110) surface.
Figure 12:
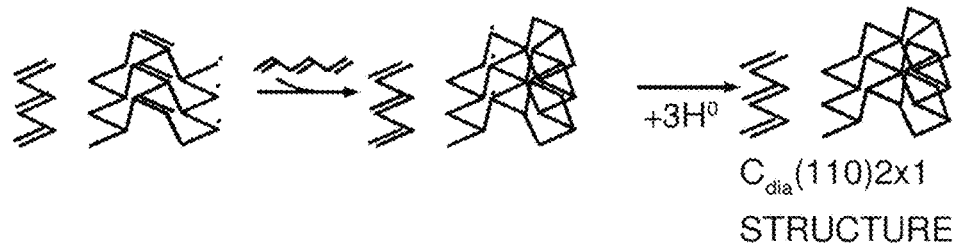
FIG. 12 depicts convergent fabrication of articles comprising voids including internal voids. Blocks of sacrificial material or alternatively passive or passivated spacers, preferably which display attractive surface interaction with the material being fabricated, are interposed between the material, preferably in linear subassemblies as shown, which are then bonded to other linear (or alternatively onto planar) subassemblies, whereafter spacers or sacrificial materials are removed. Articles comprising voids may then be stacked onto other such articles or onto articles without voids for forming extended 3-dimensional structures.
Figure 12:
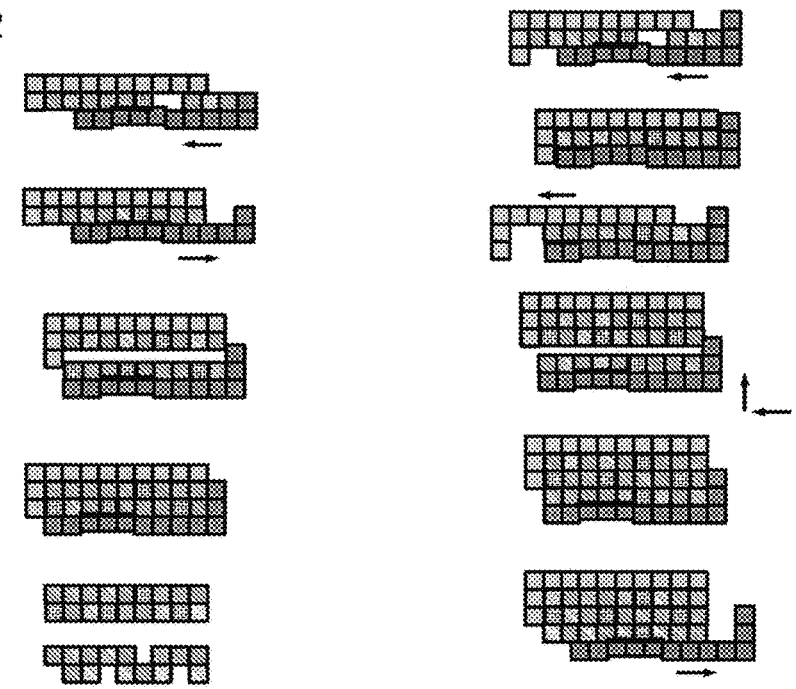
Figure 13:
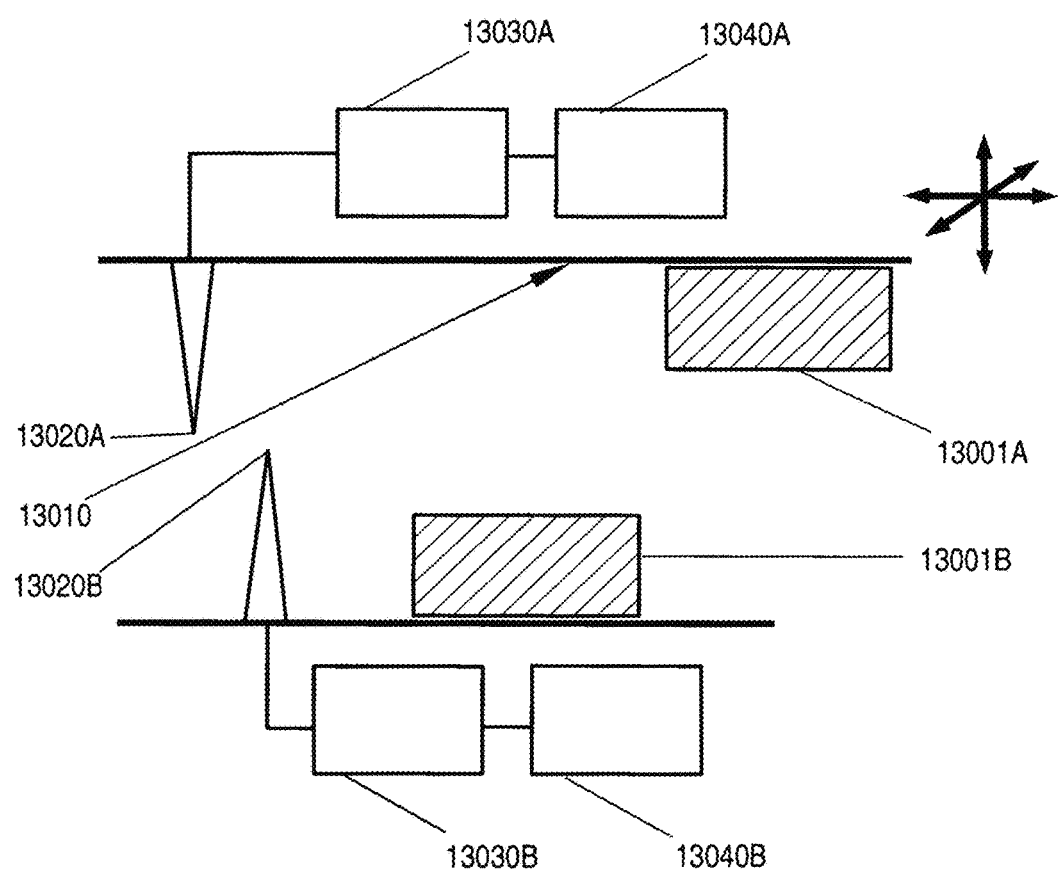
FIG. 13 depicts a simplified opposed STM apparatus featuring tips or probes on opposing surfaces such that two samples/workpieces may be imaged and modified using the respective opposed tip, and the two samples may be contacted with each other under precise positional control. Samples/workpieces may be mounted while in opposing contact to ensure proper relative alignment. Such an apparatus may additionally be fitted with valved inlets for admitting vapors. The opposed STM system depicted comprises a 3-dimensional nanopositioning stage 13010 and opposed tips 13020A and 13020B useful for performing surface modifications on workpieces 13001A and 13001B and verifying and/or determining the precise location of modifications or other surface features (e.g. via microscopic imaging or mapping) on a first workpiece 13001A or second workpiece 13001B which may themselves be mutually juxtaposed whereby surface modifications on a first workpiece may in turn interact with a desired surface site on a second workpiece. Each tip is in electrical communication with a picoammeter 13030A and 13030B and bias generator 13040A and 13040B for STM imaging and surface modification. The opposed STM configuration shown enables a single desired interaction to be effected by positioning stage 13010 without causing additional undesired interactions.

Example XX: β-Silicon-Carbide Tools for Carbon Dimer and Cumulene Binding and Deposition, Hydrogen Abstraction, Oxidation, Use Thereof, Systems Comprising, and Operation of Systems Comprising Same A β-Silicon-Carbide body is prepared according to Example XIX comprising a (100) face of Silicon atoms, e.g. as shown for fabrication of diamondoid (100)2×1-like structures depicted in FIG. 11. Hydrogens from polycarbosilene on said face are abstracted to binding sites for cumulene comprising dehydrogenated (100)2×1 silicon dimers as in [Rab08], or binding sites for carbon dimers comprising two adjacent colinear silicon dimers comprising distal silicon atoms which bear hydrogen passivation and comprising proximal silicon atoms from which hydrogen is abstracted to form the desired binding site as in [Rab97] and [Rab08]. Such carbon dimer binding tools may additionally be used as tools for nanomanipulation as in [Rab97] and [Rab08]. Tools thus fabricated may be fabricated and/or assembled onto structural members in communication with nanopositioning means and used for carbon deposition operations, as in [Rab97] and [Rab08] and elsewhere herein. For fabrication of base tools and hydrogen abstraction tools, two hydrogens are abstracted (e.g. by FCL as by [Lyd98] or using a hydrogen abstraction tool from an Example herein) from a single (100) silicon dimer on the at a site for forming this tool, and this site is contacted with 1,3-butadiyne (e.g. as vapor or bound to a binding tool or in solution) whereby a [2+2] cyclization product thereof (as found by) with the bare silicon dimer is obtained. The projected ethyne which result is treated as in foregoing examples to yield an ethide (base) or ethynyl radical and used as in foregoing examples. Ethides so formed may be used as nucleophilic attachment sites for linking other molecules or chemical functionalities to predetermined sites on β-Silicon-Carbide bodies, including haloalkylcarboxylic acids such as 2-bromoacetic acid or 3-bromopropionic acid, serving as ligands especially for participating in $Cu_2Ac_4$ complexes especially for use as an oxidation reagent, or ethide may be reacted with haloamines such as $ClNH_2$ or azaalkylhalides such as 3-chloro-azacyclopentane for forming nitrogen containing tools which may be treaded with $NaNH_2$ to form amide base tools, for example. β-Silicon-Carbide bodies fabricated as in Example XIX may be fabricated using polycarbosilene precursors comprising atomic substitutions (e.g. B, N, P) for effecting doping, whereby semiconductivity may be imparted in a precisely positionally controlled manner for forming conductive paths and switching devices such as transistors and whereby members may be used for electrooxidation, e.g. of tools or of bound reactants or of workpieces. Similarly, comb-type actuators may be similarly fabricated and assembled, including with tools of the present Example situated at precise locations thereon. Similarly, switching means may be combined as in prior art to form programmable computational means having program and information storage means, which in turn may control switching means controlling actuators and nanopositioning means for nanomanipulation and positional mechanosynthesis, current flow to electrodes for electrooxidation and electroreduction. Note that in this example, tools for performing all of the necessary mechanosynthesis operations for positional mechanosynthesis of diamondoid materials are prepared on one or more β-Silicon-Carbide bodies, which additionally are adapted for use as nanopositioning means and control means. Combining the foregoing with an energy source and/or energy conversion and/or energy storage means as available through prior art or herein, and also a program for controlling operations for fabricating and assembling this class of system, which is in essence a straightforward set of instructions for moving tools to perform the methods taught herein to fabricate and assemble a system of desired design, yields a system operatively capable of diamondoid mechanosynthesis and nanoassembly. As per foregoing Examples, diamondoid tools for fabrication of β-Silicon-Carbide structures may be fabricated using the systems of the present Example, and further incorporated in such systems. Accordingly, fabrication and assembly systems capable of producing systems capable of performing fabrication and assembly are enabled, including for the fabrication of two or more distinct material compositions, thus enabling self- or allo-replicating systems capable of fabrication and assembly with atomic precision. Operatively linking the foregoing with means for transporting precursor materials or raw materials from one or more storage locations and delivering same to binding tools or deposition tools or reagent tools, and/or with means for obtaining from environmental sources and processing one or more raw materials into a form useful for positional mechanosynthesis, nanofabrication and/or nanoassembly including by the convergent methods taught herein, said means preferably being fabricated and assembled by systems of the present example, enables fabrication and assembly of such systems from stored precursors or raw materials occurring in the environment.

Geometric increase in number of such systems producing similarly capable system enables the construction of systems for performing a variety of useful functions, said systems having overall dimensions ranging from below one micron to exceeding 1000 km (and in the case of graphenoid space elevator cables fully extended, exceeding 10,000 km or even 30,000 or 36,000 km) and having areas up to or exceeding 1,000,000 km², such as for capturing and converting solar energy, converting wave energy (e.g. via pistons as shown herein or by other devices fabricated by methods and means of the present invention) and/or wind energy (especially high altitude wind energy as taught herein) growing crops or algea, providing potable water, constructing dwellings and architectural constructions, and capturing and converting pollutants including $CO_2$. Given that actuator velocities may exceed 100 m/s and fabrication reactions typically complete in under 1 ps, require motions of under 10 nm for the finest operations, operation rates of greater than 10 MHz or even 1 GHz are feasible, and since generally an arbitrarily high degree of parallelism is utilized, facilitated by self- or allo-replication, short system doubling times or generation times may be realized, such as under 1 day or even under 1 hour, or for simple and small systems under 1 second, within a relatively short time even 1,000,000 km$^2$ or larger systems or supersystems for performing desired functions may be constructed. From 1 m$^2$ replicating systems, about 60 doublings are required to cover $10^{18}$ m$^2$ or 1,000,000 km$^2$ with useful devices or systems. Conservatively estimating the doubling time of a 1 m×1 m×10 cm (when unexpanded) system as 12 hours or 1 hour yields construction times for 1,000,000 km$^2$ supersystems on the order of 1 month or 3 days, respectively.

Example XXI

Systems deployed in the ocean or floating on the ocean surface according to foregoing embodiments preferably also comprise means for retrieving manganous or polymetallic nodules, and more preferably means for extracting metal values from same. Preferably, said means for retrieving manganese or polymetallic nodules comprises a cable or umbilical or conveyor belt or conveyor chain of length greater than 1000 m, and more preferably greater than 6000 m. Preferably, said means for retrieving manganese or polymetallic nodules comprises a grasping means for grasping manganese or polymetallic nodules and more preferably means for recognizing nodules operatively coupled to said grasping means. Preferably, said means for recognizing nodules comprises sensing means selected from: sound imaging or sonar, tactile sensing, whiskers for tactile profiling, metal detector means. Preferably, said means for retrieving nodules comprise graphenoid articles, and more preferably comprise a graphene cable, rope, belt or chain.

Example XXII

A vast array of simple structures may be fabricated and assembled according to the present invention, including a very large subset of known devices and systems established in a wide range of useful arts; these may be combined into supersystems comparable in complexity to conventional chemical processing plants or the like. A system such as that of Example XXI or Example XX may comprise structures serving as flotation means may be fabricated via methods and means of the present invention and combined with any combination of the foregoing to enable the facile construction of ocean or aquatic based facilities for energy conversion, materials processing, pollutant capture and conversion, water purification (e.g. filtration, distillation, and especially combined action distillation at reduced pressure) aquaculture, mariculture, agriculture, hydroponic agriculture, and/or human habitation up to and including floating cities (which are thereby self-sufficient) which preferably may further comprise means of propulsion and may further include means for watertight enclosure to enable submersion, e.g. to avoid turbulent weather or conditions.

Example XXIII

Methane clathrates may be collected mechanically e.g. by digger devices, or alternatively methane released by cold seeps or liberated by arctic lakes or melting tundra may be captured by sheets, e.g. graphene sheets, operatively coupled to collecting ducts and pumping means to obtain methane, especially methane which poses a danger of liberation to the atmosphere and potentially driving climate forcing. Collection may be accomplished by bubbling a gas stream which may contain methane to be captured through chilled liquid water under conditions suitable for methane clathrate formation to occur, with collection either by settling due to gravity or by filtration after sufficient time for crystals to grow, preferably in a continuous process. This may be converted to CO and $H_2$ via steam methane reforming, preferably in heated reactors comprising MgO walls which may optionally further be coated with protective surfaces such as silicon carbide (fabricated and assembled e.g. according to the present invention) with suitable catalysts e.g. on reactor walls or provided as an aerosol in a fluid stream. Heat to drive the desired reaction may be obtained either by solar concentrating means or, less preferably, by combustion of methane if no other heat source is convenient. CO and $H_2$ yielded may be optionally separated and may further be combined to yield methanol. Methanol may either be reacted with more CO to yield acetic acid directly or be halogenated using hydroiodic acid, contacted with metallic sodium and $CO_2$ to yield acetate. Thus, two species which pose danger to the climate may be combined to yield a useful feedstock. More preferably, collected methane is boiled off, dehumidified, and utilized as a feedstock for cationic or metal catalyzed or Lewis-acid catalyzed reactions disclosed herein (e.g. as in Example XXIVc below) for production of esters, polyketones, polyenes, diamond, graphene, β-SiC, etc. more preferably with concurrent energetic yield, and most preferably combined with at least 1 mole-percent $CO_2$ in the foregoing process.

Example XXIIIb

Atmospheric methane may be captured concurrent to $CO_2$ capture in a high altitude Marks generator with collection of deposited droplets as liquid followed by degassing, boiling off methane or filtering for clathrates. Methane thus captured may be used as in Example XXIII.

Example XXIVa

Acetate or acetic acid, e.g. produced as in Example XXIII, is esterified to a hydroxyl, thiol, selenol or tellurol or other heteroatom situated on a nanomanipulator, e.g. a graphenoid structural member, preferably linked via one or more aliphatic carbons such as a methylene, in communication with positioning means. Under conditions suitable for aldol reactions or Claisen condensation, a base tool is contacted with a hydrogen of the alpha carbon of the acetyl group to yield a carbanion. Said carbanion is constacted with the carboxy carbon of another molecule esterified to a similar nanomanipulator, whereby said another molecule is displaced from said similar nanomanipulator and extended by two carbons. A second hydrogen on the alpha carbon deprotonated and reacted previously is removed with a second base tool, and the protonated base may be contacted with the beta hydroxyl, whereby dehydration is facilitated. The foregoing steps are repeated to generate conjugated polyenes of desired length under mechanical control, from acetic acid or acetate feedstocks, most preferably comprising carbon atoms arising from methane clathrates, cold seeps and/or carbon dioxide, most preferably collected from the environment.

Example XXIVb

Polyene species of desired length are synthesized according to Example XXIVa with the modification that said another molecule is an acetyl or an n-alkanoate with a hydrogen of the terminal methyl group removed (using a base tool) and bound by a metal held by a ligand situated on a structural support which preferably is under positional control by nanopositioning means. Operations are preferably conducted by positioning reactants/intermediates such that the product is all-trans, all s-transoid polyene, bound on one terminus by a positionally controlled ligand bound metal and at the opposite terminus via an ester bond, and intermediates and products are drawn under moderate tension to preserve the desired conformation. Most preferably, said ligand binding said metal bound to said terminal methyl is oriented relative to the polyene and in relation to the terminal ester such that the metal-carbon bond is like that of the surface bound polyenes of FIG. 2 or 3A-G or obtained in Example XII.

Example XXIVc

Dilute methane vapor or an individual methane molecule admitted to an evacuated vessel or volume wherein are situated at least one of a Lewis base or nucleophile (e.g. a deprotonated thiol, deprotonated selenol, deprotonated tellurol, deprotonated hydroxyl) situated on a support or linker bound to a structural member and a Lewis Acid or electrophile (e.g. Zinc(II) or Cadmium(II) or Magnesium(II) or other cation bound to a ligand comprising a deprotonated acetylacetonate ligand skeleton or an ethylene diamine ligand skeleton or a deprotonated ethylene diamine ligand skeleton, situated on a support or linked via a linker to a structural member. These constitute a deprotonation tool and an electron withdrawing tool, respectively. Preferably, said ligand skeleton is in communication with nanopositioning means. Methane used is most preferably obtained from oceanic methane clathrates, permafrost methane clathrates, cold seeps, peat bogs or peat, or other environmental sources, whereby these may be prevented from release to the atmosphere. A methane molecule binds either said Lewis Acid or nucleophile or said Lewis base or electrophile, forming a methane loaded tool, and if not yet present, the other of the foregoing not having methane bound thereto is translated into proximity with the methane loaded tool, such that said methane molecule is situated between said Lewis base or nucleophile and said Lewis base or nucleophile, with weak bonding to both; this may be accomplished either by direct translation using nanopositioning means in communication with supports or structural members, or, for linker bound deprotonation tools and/or electron withdrawing tools, simply permitting (if it does not initially obtain) linker motion and passive diffusion to permit contact between the two types of tools and a bound methane molecule, although in this case linker length and location should be predefined to prevent direct bonding of these. Depending on the exact tool used, spectator ions (e.g. deprotonated carboxylates such as 2-Methyl-2-nitrile-propionate or more preferably a skeleton thereof bound to a support or nanopositioner, tertiary amines such as tetramethylamine or more preferably a skeleton thereof bound to a support or nanopositioner) are favorably located in proximity [e.g. within 300-2000 pm] of other catalysts and reagents to stabilize the singlet ground state against electron tunneling, although in some instances the triplet state will also undergo the desired reaction.) Upon contact of the three species (deprotonation tool, methane molecule and electron withdrawing tool) methane is deprotonated and forms a bond with said electron withdrawing tool, e.g. as in methyl Grignard or Barbier reagents, whereby a tool loaded with a methyl carbanion is obtained. Note that calculations predict this reaction to be favorable independent of which type of tool methane first binds. Additional cycles of this reaction may be performed on the same carbon atom after it has been used as a nucleophile, whereby secondary, tertiary and quaternary substitutions on a methane-derived carbon atom are enabled at low or moderate temperatures. A notable feature of this reaction is that in many instances it completes quickly and cleanly even at low temperatures (many calculations by various methods find no energetic barrier.) Note that because this reaction is exothermic, energy liberated if this reaction is run at moderate or elevated temperatures may be recovered and converted, e.g. by conduction of liberated heat (e.g. via a heat pipe) to a heat engine or pyroelectric. Note that Zn, and Al are predicted to perform best according to relevant criteria, but this reaction, which depends on charge separation, could operate with varying effectiveness with other metals or even clusters, colloids or quantum dots or nanowires serving as one or both of the charged reactants.

Example XXIVd

Figure 14A:
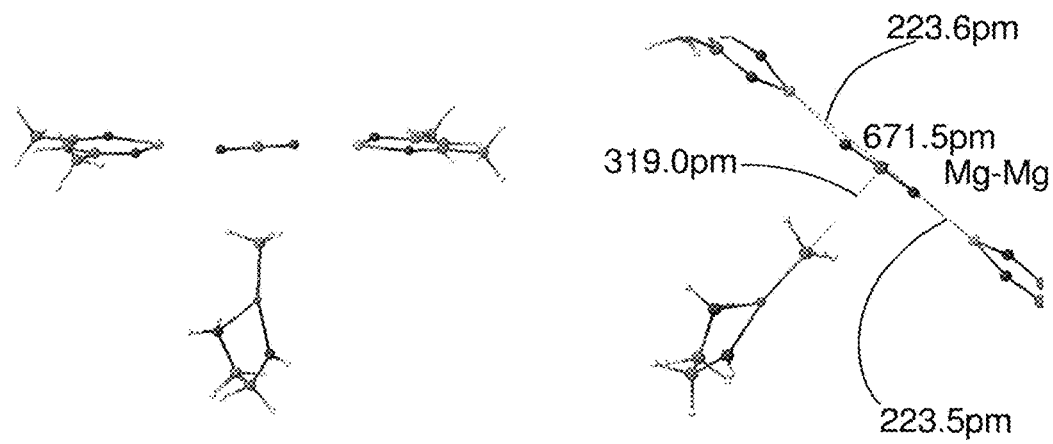
FIG. 14A for views of a starting geometry for this reaction, and FIG. 14B for the product (FIG. 14A-B are AM1 geometries, subjected to optimization using cp2k to reveal a minimal energy reaction path for the exothermic reaction, rendered using Jmol.)

Two ligand-metal complexes, each having a net formal charge of at least +1, (e.g. Zn(II), each bound by a single acetylacetonate ligand skeleton, each ligand skeleton situated on independent nanopositioning means) are situated such that the metal centers are about 300-600 pm apart, with space empty therebetween in an enclosed vessel or volume, which is preferably evacuated. At least one $CO_2$ molecule is admitted, whereupon oxygens bind to metals and is suspended therebetween. Preferably, $CO_2$ is $CO_2$ obtained from the environment or from industrial processes, most preferably from dissolved $CO_2$ or carbonate species from an ocean, whereby atmospheric buildup of $CO_2$ and also ocean acidification may be counteracted. As a result, the $CO_2$ carbon bears a partial positive charge and is activated as an electrophile and held in a $CO_2$ containing complex in communication with nanopositioning means. FIG. 14A shows such a complex as a reactant in the reaction of the following Example.

Example XXIVe

Figure 14B:
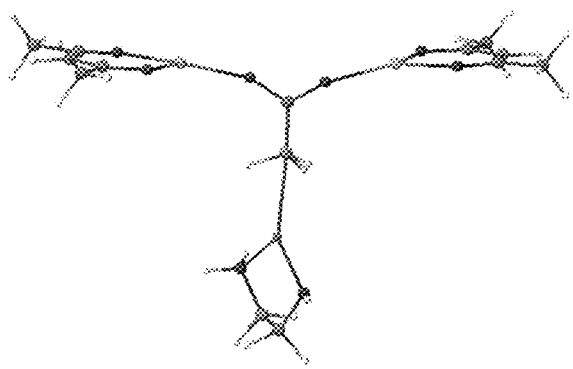
FIG. 14 shows methods and means for reaction of methane and $CO_2$ to acetate, polyketides and polyenes, suspended between metals of ligand metal complexes, which are preferably borne by nanomanipulation means.
Figure 14C:
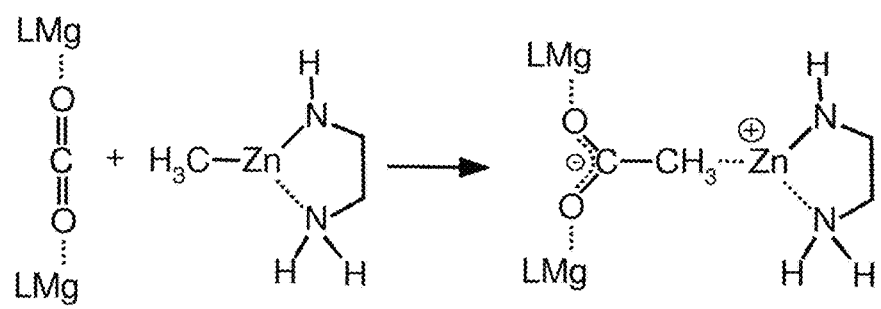
Figure 15:
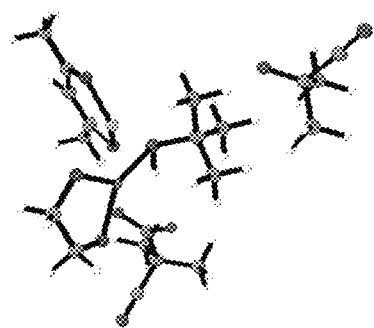
FIG. 15 shows nanopositioned dehydration of a tertiary alcohol reaction to an alkane. This reaction is particularly useful for the conversion of polycyclic polyols to graphenoid structure, and also works on secondary alcohols, and is thus useful for conversion of polyketones to polyenes.
Figure 15:
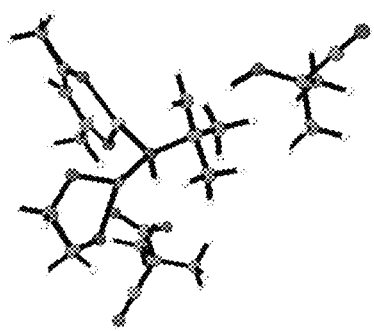
Figure 15:
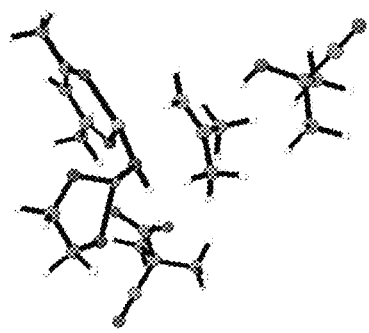
Figure 15:
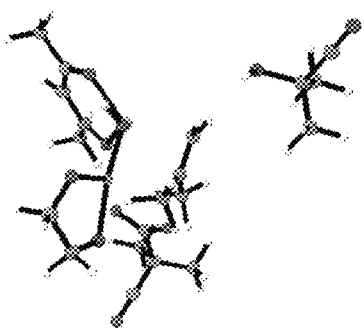

A tool loaded with a methyl carbanion obtained in Example XXIVc and the $CO_2$ containing complex obtained in Example XXIVd are translated relative to each other to advance said methyl carbanion towards said $CO_2$ carbon, whereupon a covalent bond forms therebetween with release of the electron withdrawing tool from the intermediate and liberation of heat, to yield an acetate molecule bound in a complex suspended between two nanopositioning means. In this process, positioning is conducted such that contact between the carbanionic methyl carbon and the metal centers of the $CO_2$ containing complex is avoided. Note that the acetate carbonyl carbon remains activated as an electrophile due to binding of the oxygens by cations in the complex. See FIG. 14A for views of a starting geometry for this reaction, and FIG. 14B for the product.

Example XXIVf

One of the nanopositioning means in communication with one of the ligand-metal portions of said acetate containing complex in communication with nanopositioning means obtained in Example XXIVe is withdrawn and replaced with a ligand-metal complex having a neutral formal charge (e.g. Mg(II)catecholate or the corresponding ligand skeleton) in communication with independent nanopositioning means, preferably in concerted motions of the withdrawing and replacement complexes. The resulting complex has a neutral formal charge. Alternatively, an oxygen of the acetate molecule from which a metal ligand complex has been or is concurrently being withdrawn may be protonated (e.g. using an acid tool) to obtain an acetic acid containing complex having a formal positive charge. Optionally, a metal ion in either a neutral or positively charged metal ligand complex situated on nanopositioning means is contacted with the protonated acetic acid oxygen, whereby an acetic acid containing complex bearing a hydroxyl activated as a leaving group is obtained.

Example XXIVg

A deprotonation tool situated on nanopositioning means is advanced towards hydrogens of the alpha carbon of the acetate in the complex obtained in Example XXIVf to obtain the deprotonated alpha carbanion in a resulting alpha-carbanionic acetate containing complex with a formal charge of −1 situated between two nanopositioning means.

Example XXIVh

The alpha-carbanionic acetate containing complex situated between two nanopositioning means obtained in Example XXIVg and the activated acetic acid containing complex suspended between two nanopositioning means, preferably of type bearing a hydroxyl activated as a leaving group, obtained in Example XXIVe are relatively translated towards each other such that the carbanionic carbon in the complex from Example XXIVg contacts and is able to form a bond with the carbonyl carbon in the acetic acid containing complex bearing a hydroxyl activated as a leaving group from Example XXIVe. In the case of a hydroxyl activated as a leaving group, a nanopositioner-ligand-metal-hydroxide is withdrawn. Note that this case is particularly preferable because the oxygen deriving from the carbonyl to which the carbanion bonded is bound by a neutral metal-ligand, which is more easily withdrawn after this reaction. Where non-protonated acetate containing complexes are used instead as the nucleophilic reactant, contacting an oxygen bonded to the carbon to which the carbanion has added with a metal is cation (e.g. bound by a further ligand in communication with nanopositioning means) facilitates this oxygen leaving, which may also be facilitated by withdrawing the nanopositioning means to which the respective ligand-metal binding same oxygen to tension the bond which is desired to sever for this reaction. The product is a beta-keto four carbon carboxylate species including a terminal methyl which is alpha to a carbonyl (i.e. an alpha carbon.)

Example XXIVi

A product complex from Examples XXIVe-h may be deprotonated at terminal methyl groups alpha to carbonyls using an base tool to yield a terminal carbanion. A product complex from Examples XXIVe-h may be protonated at a carboxyl oxygen using an acid tool to yield a highly activated electrophilic carboxyl as in Example XXIVf. As in the preceding examples, these are relatively translated to advance said carbanion to said electrophilic carboxyl to form a bond therebetween. Complexes comprising polyketides, most preferably but not necessarily linear polyketides may be so obtained.

Example XXIVj

A first complex comprising a polyketide obtained in Example XXIVi is activated or deprotonated and added to a second complex comprising a polyketide obtained in Example XXIVi (which may have the same or a different structure or length as said first complex of this Example) or instead a complex from Examples XXIVe-g which has been deprotonated at an alpha carbon by a nanopositioned base tool, by advancing the carbanion and activated carbonyl towards each other, to yield larger polyketide products of predetermined defined structure.

Example XXIVk

Figure 9:
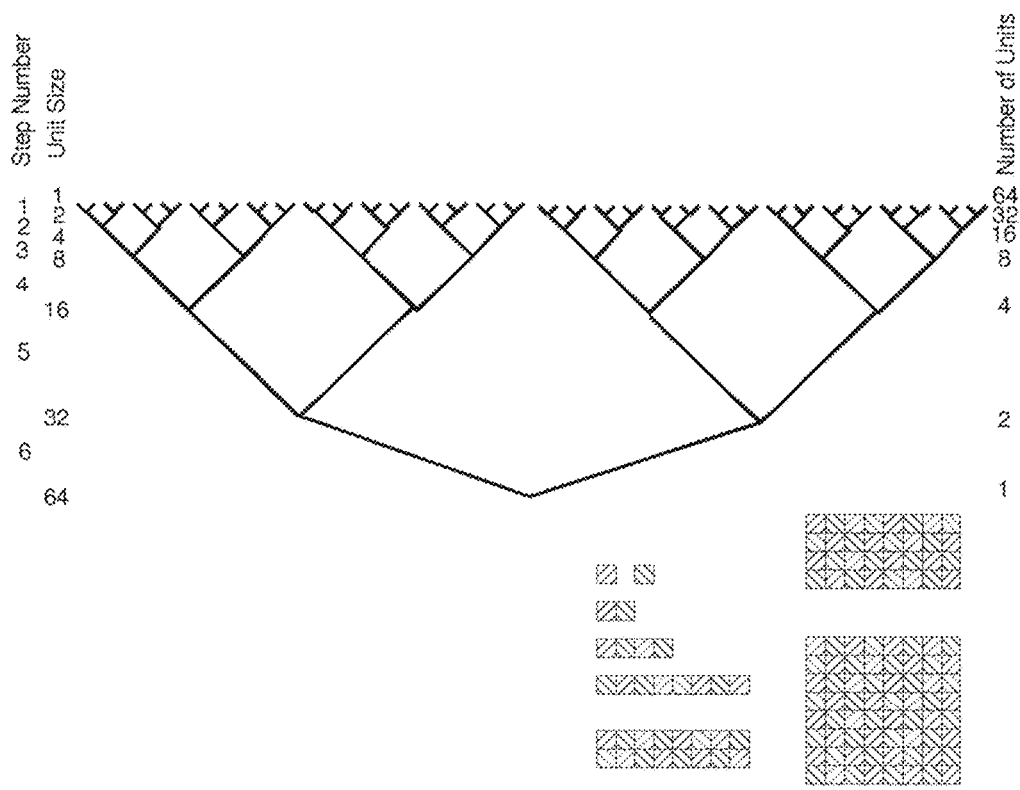
FIG. 9 depicts the logic of convergent fabrication, showing one example of numbers of precursors and intermediates at succeeding steps for strict regular binary additions.
Figure 7:
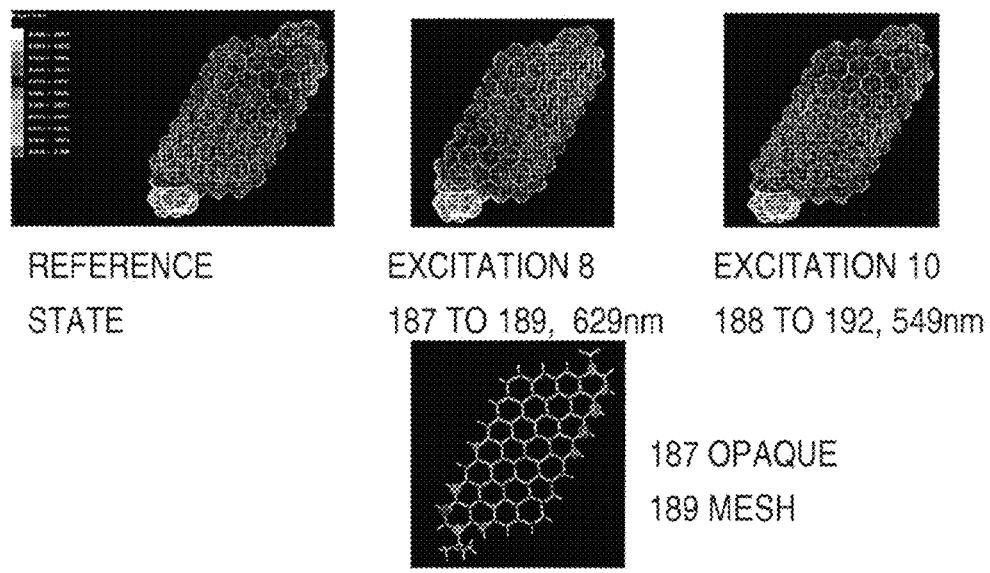
FIG. 7 illustrates predicted excitations of a graphenoid structure which may be fabricated according to the present invention and comprise trimethylamine and carboxylate functions is distally located to impose a dipole. Such structures are useful as absorber moieties for photovoltaic devices and optoelectronics devices. Shown are predicted charge surface density maps for the reference state and two strong excitations predicted by ZINDO-Cl spectral calculations for singlet excitations (as implemented in ArgusLab 4.01.) Charge densities of excited states of interest show favorable locations for forming electrical contacts to absorber moieties) for photovoltaic and optoelectronic applications) of which the structure shown is an example. Bottom panel shows orbital maps for orbitals 187 and 189 for comparison to excited state 8, predicted for absorption of a 629 nm wavelength photon.

Repetitive cycles of Example XXIVj are performed, preferably in convergent fashion and most preferably in maximally convergent fashion in analogy to FIG. 9. to yield extended polyketide products, most preferably linear polyketides for dehydration to linear polyenes of predetermined length suspended between nanopositioning means and added to specifically dehydrogenated or bare diamond 110 surface or specifically dehydrogenated or bare Si:SiC [3C](110) target sites.

Example XXIVl

Examples XXIVj-k and any incorporated preceding examples are performed with at least one reactant in at least one reaction comprising an atomic substitution or functional group substituent (e.g. using preformed precursors obtained through conventional synthesis) to obtain extended polyketide products featuring atomic substitutions or functional group substituents of predetermined desired type at predetermined locations, e.g. in predetermined sequence for linear products, most preferably linear polyketides featuring atomic substitutions or functional group substituents in predetermined sequence, which may further be subjected dehydration to linear polyenes of predetermined length suspended between nanopositioning means and added to specifically dehydrogenated or bare diamond 110 surface or specifically dehydrogenated or bare Si:SiC[3C](110) target sites.

Example XXIVm

Polyketides obtained in the foregoing examples are dehydrated as follows: a hydrogen atom from $Li_1H_1$ bound to a ligand skeleton such as dimethylpyrazine or 1,4-dioxane, or other hydrogen containing recuction tools in communication with nanopositioning means, is contacted to a carbonyl which is beta to a second carbonyl has a cation bound oxygen at the position of the polyketide to be dehydrated, to form a secondary oxide $(R^1C(O)CH_2C(O^-M^+L^k)R^2)$. One or two additional cations, preferably metals in positively charged ligand-metal complexes positioned by nanopositioning means, are contacted to the oxide oxygen atom, and a base tool (e.g. a deprotonated ethylene base tool, e.g. from a tool comprising a phenylacetylene skeleton deprotonated as in [Rab07,Rab08] positioned via nanopositioning means) is advanced towards a hydrogen atom between the carbonyl being dehydrated and the carbonyl at the respective beta position. Calculations predict this to vigorously dehydrate the desired site when the oxygen to be removed is bound by 3 cations or has been protonated and further bound by 1 or 2 cations. When the polyketide is drawn tight to restrict to linear conformation, the product is a trans-alkene at the desired location, ($R^1C(O)CH=CHR^2$).

Example XXIVn

Repetitive cycles of Example XXIVm, preferably starting at one terminus, most preferably successively at adjacent carbonyls, are performed on linear polyketides suspended drawn tight between two independent nanopositioning means (most preferably, ligand-bound metals bind with ligand skeletons oriented such that metal bonds are directed to properly constrain and orient polyenes suspended therebetween in a defined orientation (constrained e.g. as if the metal atoms continue the linear all-s-transoid-all-trans pattern), to yield a linear all-s-transoid-all-trans polyene, which is useful for addition to specifically dehydrogenated or bare diamond 110 surface or specifically dehydrogenated or bare Si:SiC[3C](110) target sites as disclosed herein.

Example XXIVo

Figure 16A:
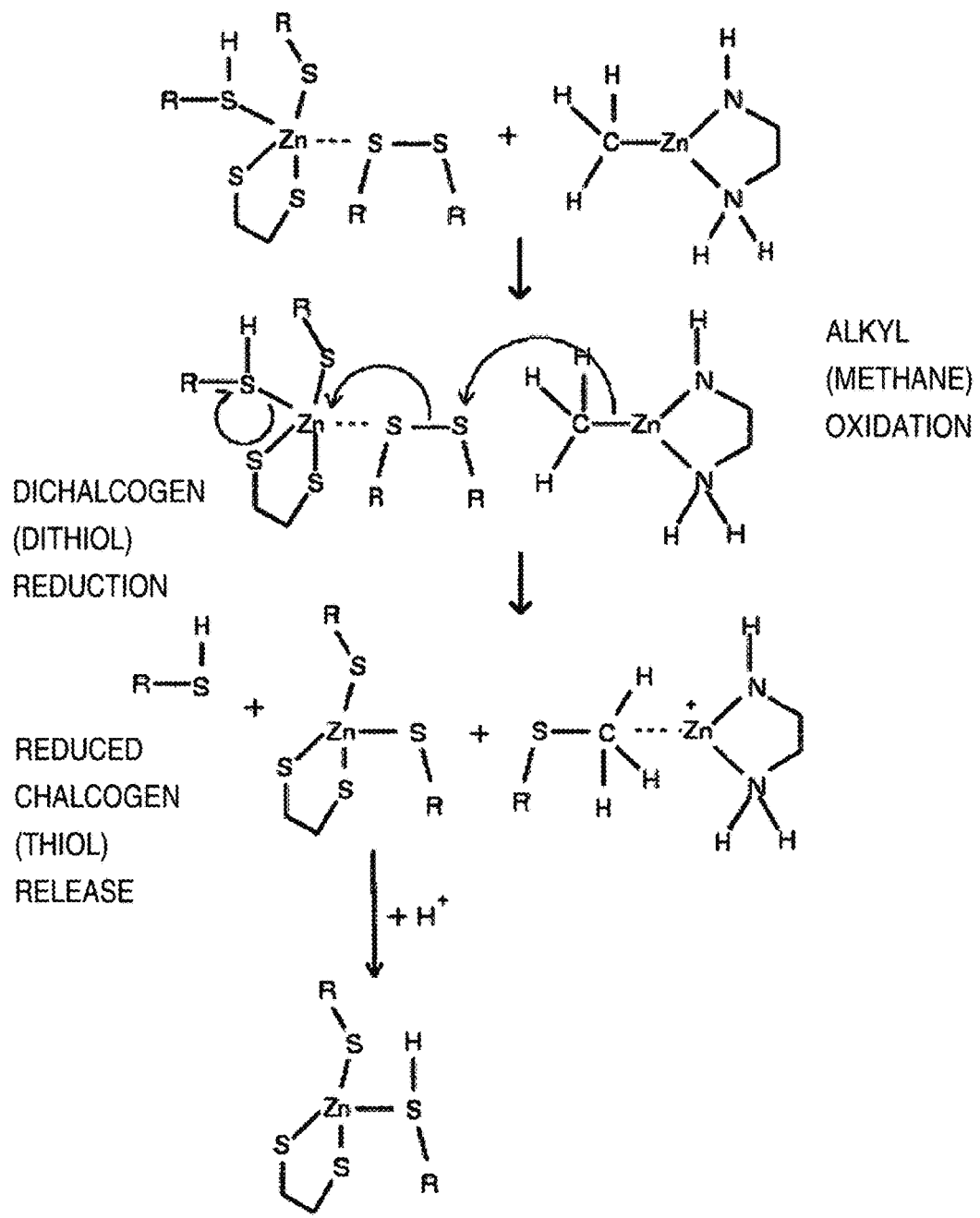
FIG. 16 illustrates reactions of alkyls including methane, yielding activated methyl groups which further react with dichalcogens, dithiols, especially activated dithiols to yield compounds such as thioethers, which may further react with alcoholates or oxides to yield carbon compounds activated as electrophiles such as ketals. Resultant chalcogenides, thiols or thiolated may be reacted together to liberate molecular hydrogen as shown in FIG. 16D, a reaction which is predicted by a variety of methods to be rapid and energetically favorable (data not shown.)
FIG. 16E shows conversion of thioethers and thioketals to ethers and ketals.
FIG. 16F shows a variety of metal-ligand combinations useful for these reactions and for exchanging chalcogens and dichalcogens (e.g. dithiols, diselenides, ditellurides, mixed dichalcogens, etc.) Note that carbon binding and activation is also predicted to operate effectively on larger alkyls including secondary and tertiary alkyl cargons. Note that although these reactions are most preferably performed in vacuo, these reactions will generally also expected to function in liquid methane.
Figure 16B:
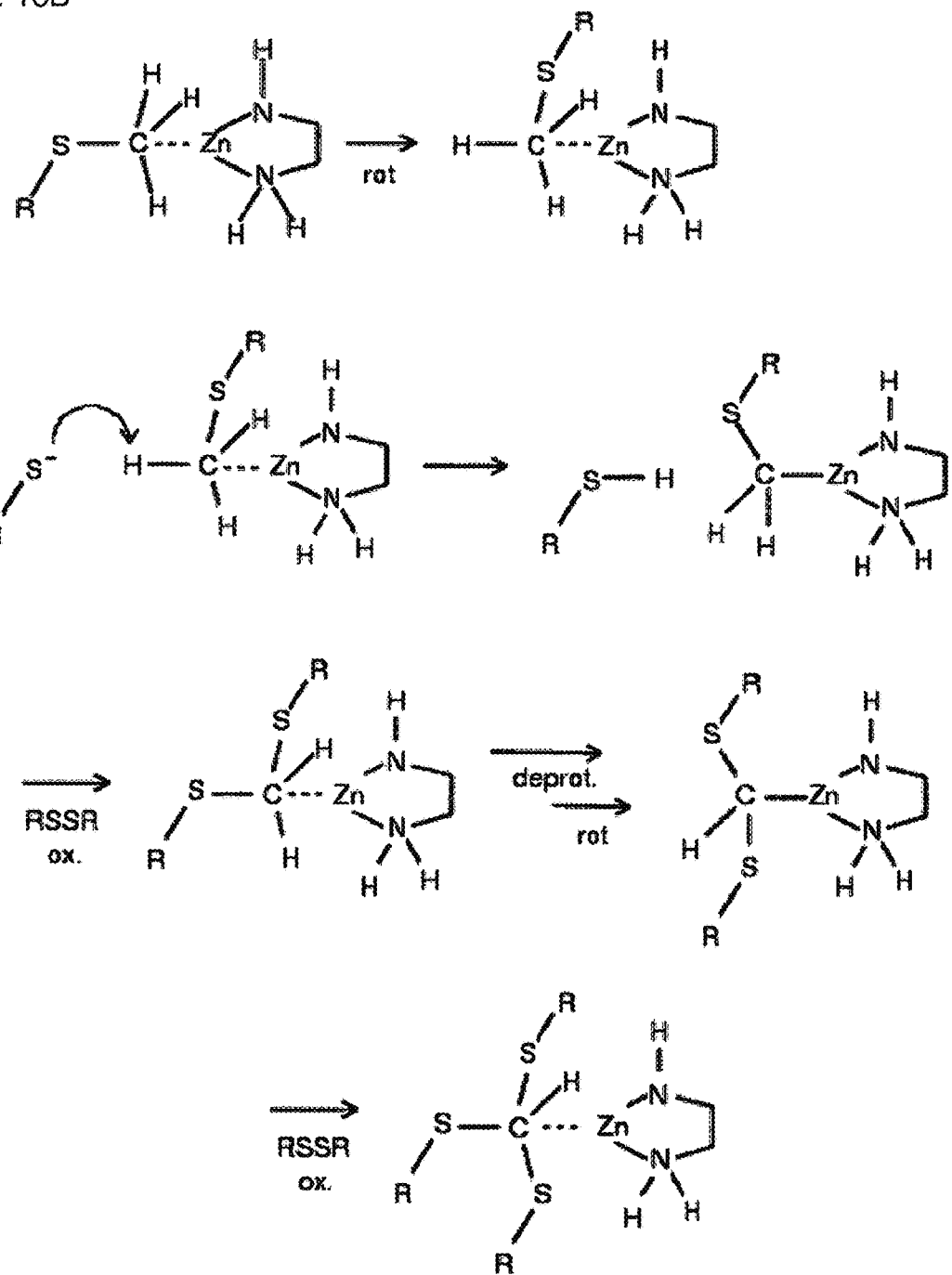
Figure 16C:
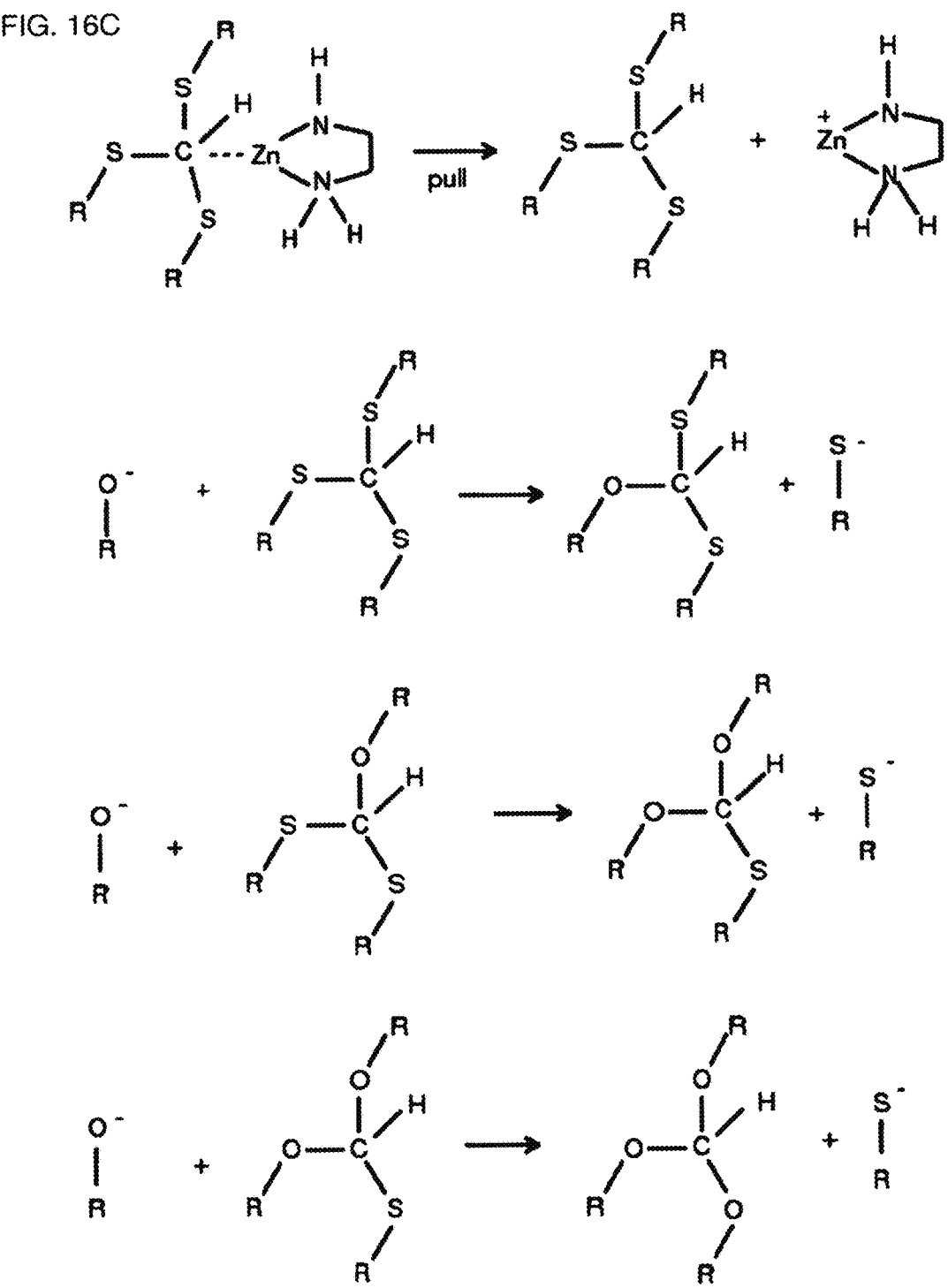
Figure 16D:
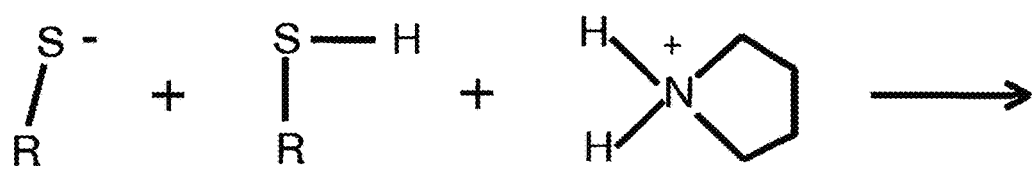
Figure 16D:
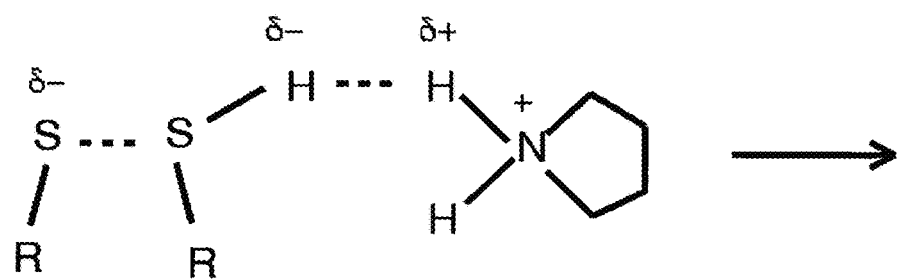
Figure 16D:
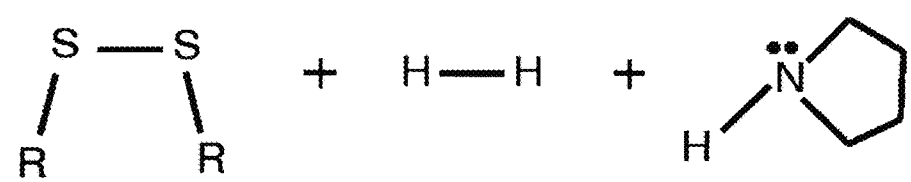
Figure 16F:
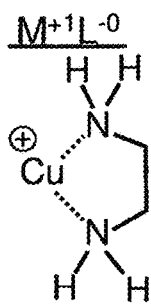
Figure 16F:
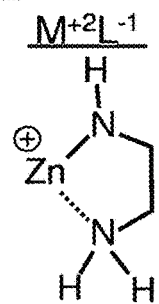
Figure 16F:
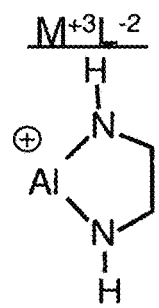
Figure 16F:
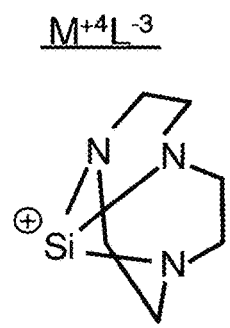
Figure 16F:
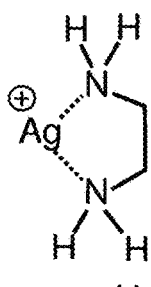
Figure 16F:
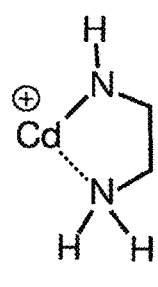
Figure 16F:
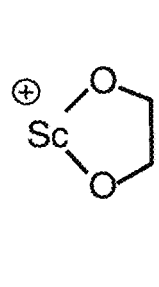
Figure 16F:
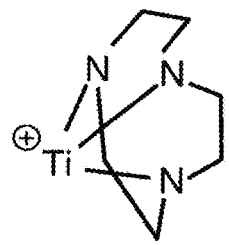
Figure 16F:
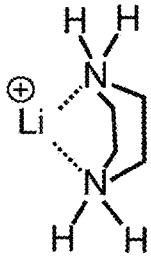
Figure 16F:
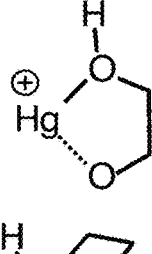
Figure 16F:
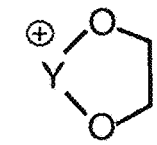
Figure 16F:
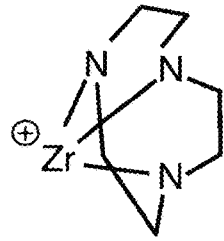
Figure 16F:
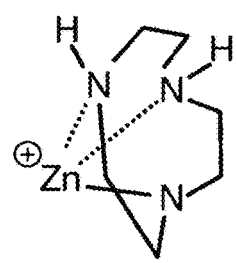
Figure 16F:
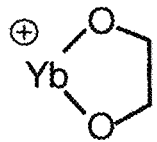
Figure 16F:
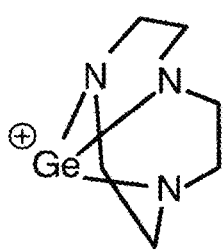
Figure 16F:
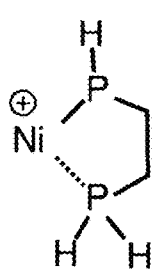
Figure 16F:
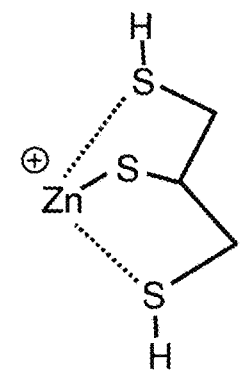
Figure 16F:
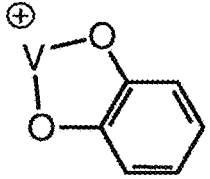
Figure 17:
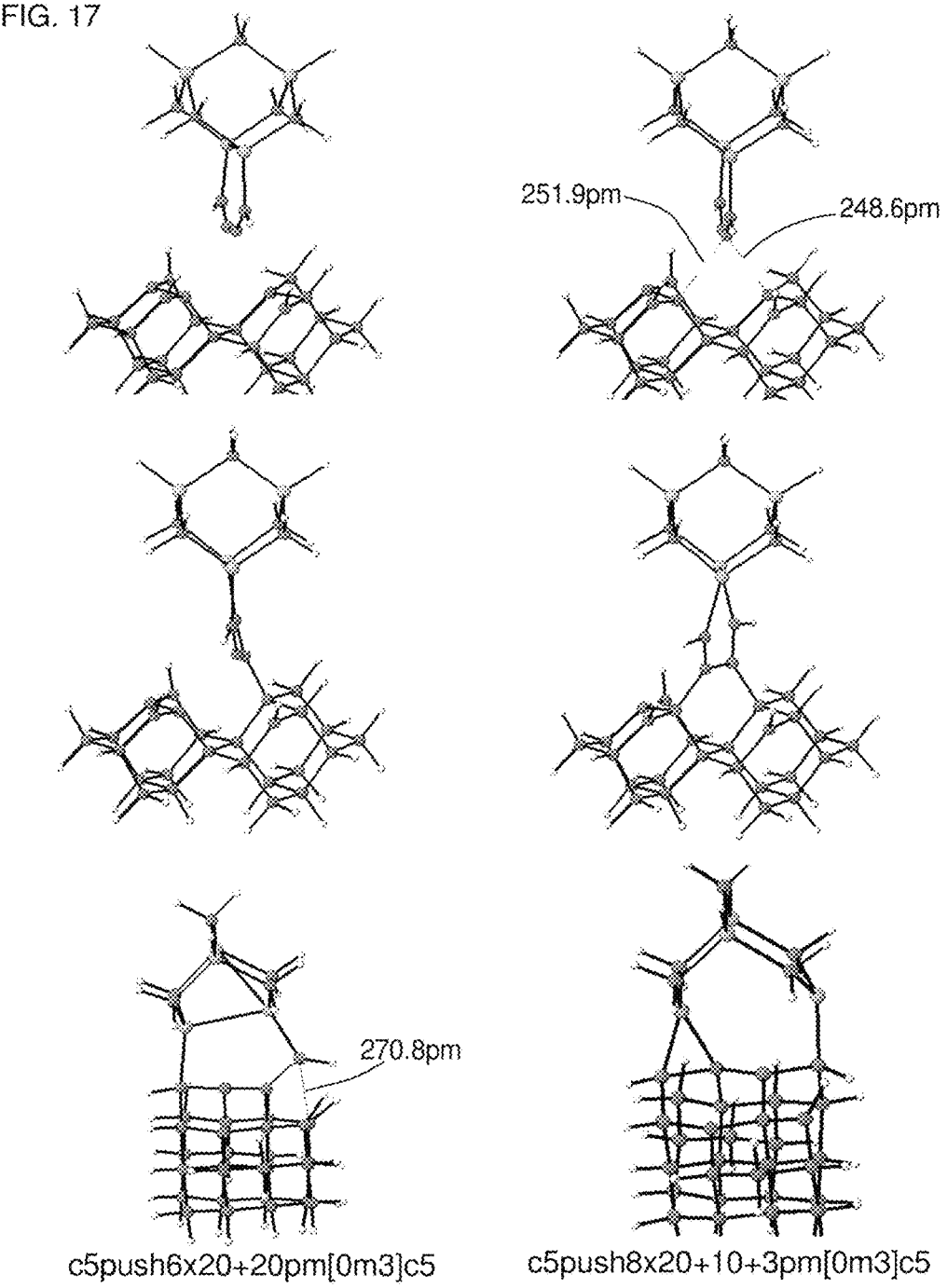
FIG. 17 illustrates the positional addition of butyne bound to a dehydrogenated surface silicon dimer of Si:β-SiC(100) 2×1 or a nanopositioned tool comprising this molecular structure to a dehydrogenated target site on a diamond (110) surface. This is similar to the Si and Ge based butyne binding tools of FIGS. 16a-d and 18 of [Rab08]. Said butyne may be loaded onto said silicon dimer by an intermediate binding tool, e.g. comprising one or more metals, especially Ni, as in FIG. 18 of [Rab08] onto Ge surface dimer of Ge(100)2×1 (note that Ge could substitute for Si in the present binding tool and constitutes an alternative tool embodying this aspect of the invention). The present Si:β-SiC(100)2×1 surface silicon dimer binding tool improves over the Ge surface dimer of Ge(100)2×1 tool in mechanosynthetic operations due to greater strength. Shown are AM1 optimization calculations performed with PC-GAMESS 7.01.
Figure 18A:
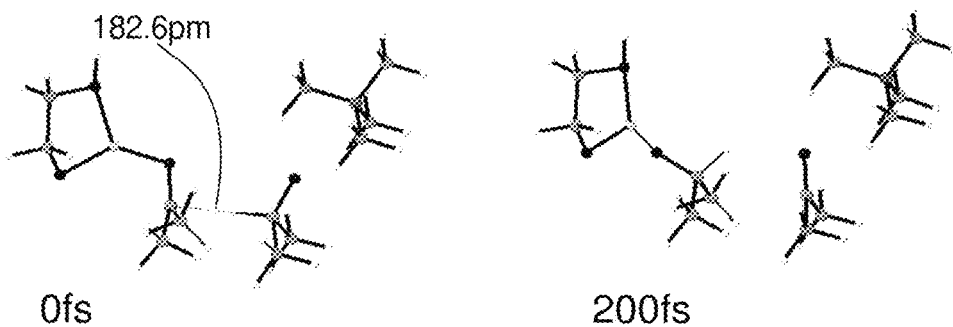
FIG. 18A shows a nanopositioned metal and counterion directed hydride exchange reaction whereby a deprotonated secondary alcohol reduces the carbon of a metal bound ketone, useful for conversion of polyketides to polyols, alkanes and/or polyenes. Ligands, ions and reactants are positioned individually by independent nanopositioning means.
Figure 18B:
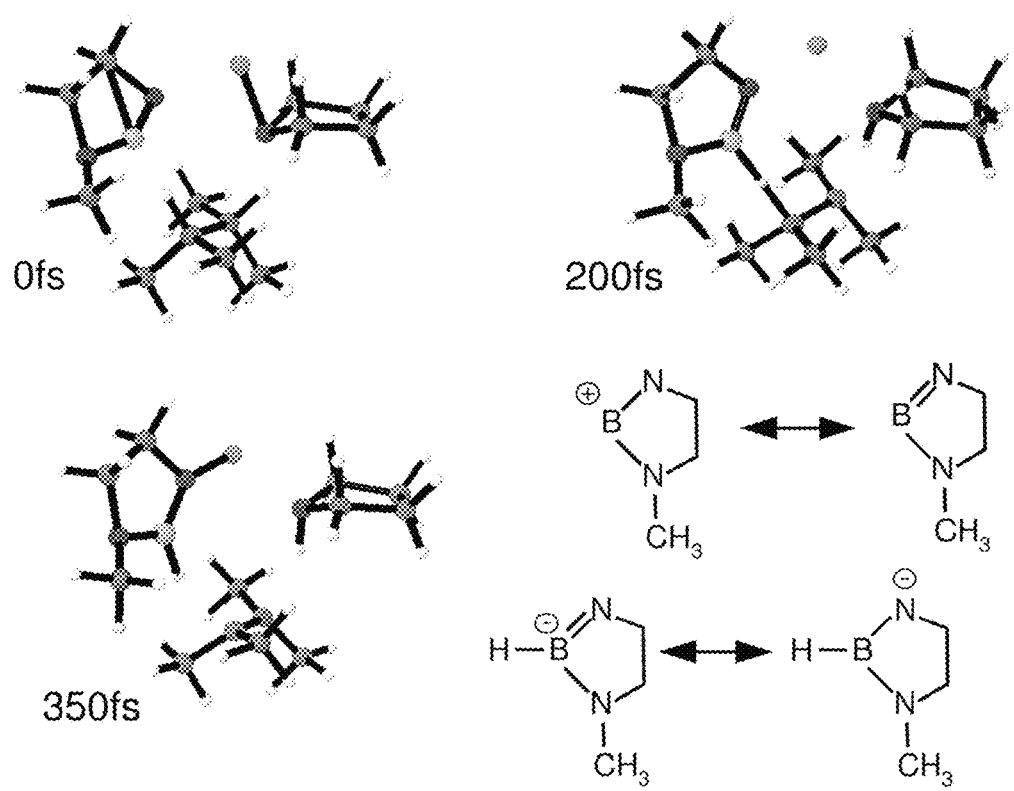
FIG. 18B shows the oxidation of adjacent tertiary carbons, which here model a nydrogenated diamond (110) surface pair to be dehydrogenated. A Lewis-acid tool and a base tool operate in concert at adjacent carbons only, facilitating reliable targeting of sites to be dehydrogenated to yield surface unsaturation, e.g. for subsequent carbon dimer or polyene or poly-yne addition.

Deprotonated metal-bound methyl group from Example XXIVc (e.g. $CH_3Zn^{+2}L^{-1}$) is contacted with a sulfur atom of a dithiol (each sulfur atom of which is preferably covalently bound to a separate nanopositioner whereby each may be controllably positioned, and preferably the sulfur atom distal from said methyl group is either protonated or in contact with a cation such as an ionized metal, e.g. especially $Zn^{+2}L^{-1}$ or polarized by a positive electrical field whereby nucleophilic attack on the disulfide is promoted) most preferably as shown in FIGS. 16A and 16E. Thereby a methyl ether is formed and the dithiol is reduced, directly or indirectly yielding a thiol or thiolate. Sulfur containing products may be recycled to the dithiol as shown in FIG. 16D with liberation of molecular hydrogen.

Example XXV

The polyene from Example XXIVb, m or n, suspended between two positioning means with ligands directed as in and drawn tight, is abutted with a hard tool surface such as a diamond tool surface. This is then positioned relative to a target site and pressed against a bare, partially dehydrogenated or stepped diamond 110 surface analogous to any Example XII. See, for example, FIGS. 2G-I, and also FIGS. 2E-F for obtaining this from carbon dimer precursors. (Note that positions of dehydrogenated sites and orientation of bonds to be formed may be straightforwardly deduced from exact knowledge of workpiece structure and positions at which previous hydrogen abstraction operations were performed; hence reactants are positioned accordingly consistent with desired addition product.) Preferably said tool surface is of a width exactly matching the length of said polyene, with said polyene positioned across the width of said tool surface with said ester and said metal extending past the edges of said surface, such that only the polyene and not the ester or the metal are pressed onto the workpiece; most preferably, said polyene is of a length exactly matching that of the workpiece surface along the trough over which addition is done, plus or minus any terminal carbons in the row thus added which are required in the desired product or succeeding intermediate structure—fabrication of a complicated workpiece may thus be conducted from precursors which correspond to entire rows of Pandey chains, including with predetermined sequences of atomic substitutions (e.g. B, N, P, etc.) or, for desired positions of precursors ultimately resulting in surface regions, functional substituents (e.g. hydroxyls, thiols, selenols, tellurols, methyls, boranyls, phenylenes, ethynes, nitriles, amines, phosphines, carboxyls, etc.) including pluralities thereof which may further be form fused ring systems comprising a segment of the polyene chain to be added over a 110 trough (e.g. acetylacetonate fused via three alternating polyene carbons) most preferably with addition to a partially dehydrogenated surface with surface atoms near functional groups remaining passivated to prevent unwanted reactions with functional groups during addition (see, for example, FIGS. 3J-K for examples of additions of polyenes having atomic and functional substitutions which may or may not include fused rings, but note that in this Example polyenes to be added are suspended between positioning means.) Note that alternatively polyenes may be suspended between fixed arms or structural members serving as suspension means, rather than two independent positioning means. Most preferably, ligand-bound metals bind polyene to be added, with metal bonds directed to properly orient polyenes suspended therebetween in a defined orientation (constrained to be the case e.g. as if the metal atoms continue the linear all-s-transoid-all-trans pattern, and the chain abuts said counterpressure surface) and the distance between metal atoms is such that polyene suspended therebetween is drawn tight to avoid rotations deviating from planar all-s-transoid-all-trans conformation.

Example XXVI

Figure 8A:
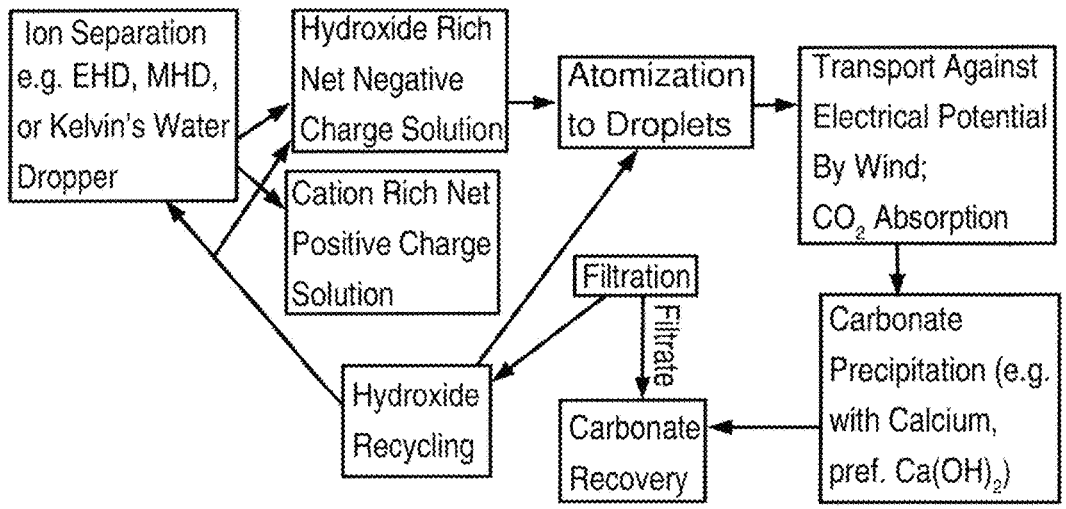
FIG. 8 depicts devices and systems for conversion of wind energy to electricity and mechanical work, either or both via entrainment of charged aerosols in a windflow ascending an electrical potential gradient and/or by turning a fan or turbine, and including adaptations thereof for tandem $CO_2$ and/or pollutant capture and for operation at high altitude, which is preferable because of greater wind velocity and more consistent availability of wind, and also combination with solar energy conversion means lofted above cloud-cover with concentrating means such as reflectors or lenses or instead photovoltaics, any or all of which may optionally be mounted on solar tracking means or heliostats and enclosed within a transparent shell or fuselage and lofted above cloud-cover, and moored via tethers, cables or umbilicals including electrical transmission means or wires for delivering electrical power to a ground station or marine or aquatic vessel, and optionally also sets of conduits for circulating electrolyte and/or carbonate solutions. Cables or umbilicals may be carbon nanotubes or ropes made therefrom or composite materials comprising carbon nanotubes especially crosslinked therewith, may be grapheneoid, may be carbon fiber of conventional fabrication, may be ultrahigh molecular weight polyethylene (UHMWPE), or dynema or vectran or may be basalt filaments or fibers or ropes made therefrom, or colossal carbon tubes or ropes of colossal carbon tubes or other high strength fibers or wires or ropes or any combination of the foregoing. Shells may be graphene, UHMWPE, fabric of carbon fibers or composites thereof, e.g. with UHMWPE, or diamond or polymethylmethacrylate or other high strength and preferably lightweight material or any combination of the foregoing. Preferably, such devices and systems further comprise lightning protection means as is common for aircraft.
Figure 8A:
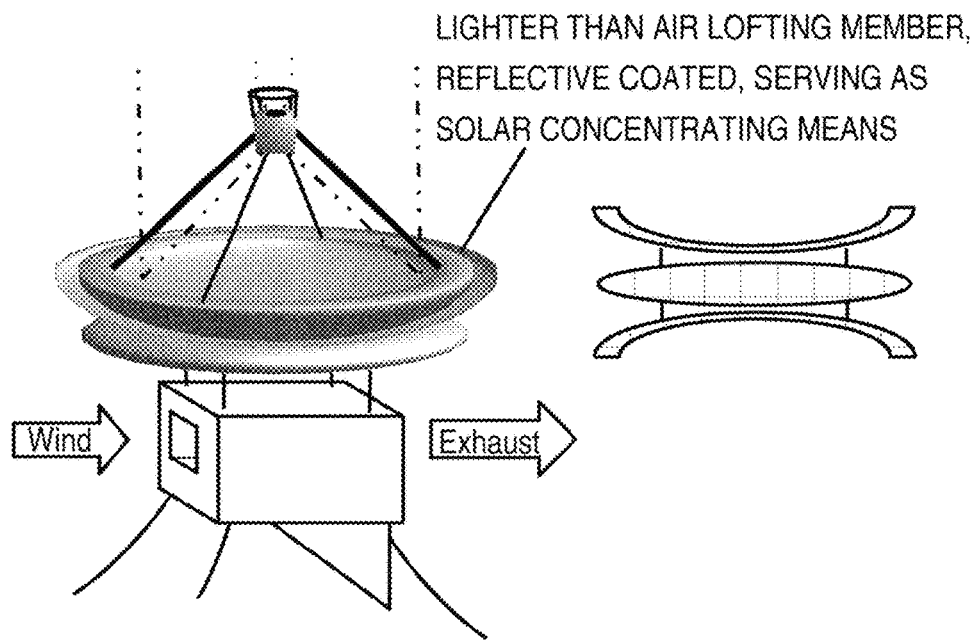
Figure 8B:
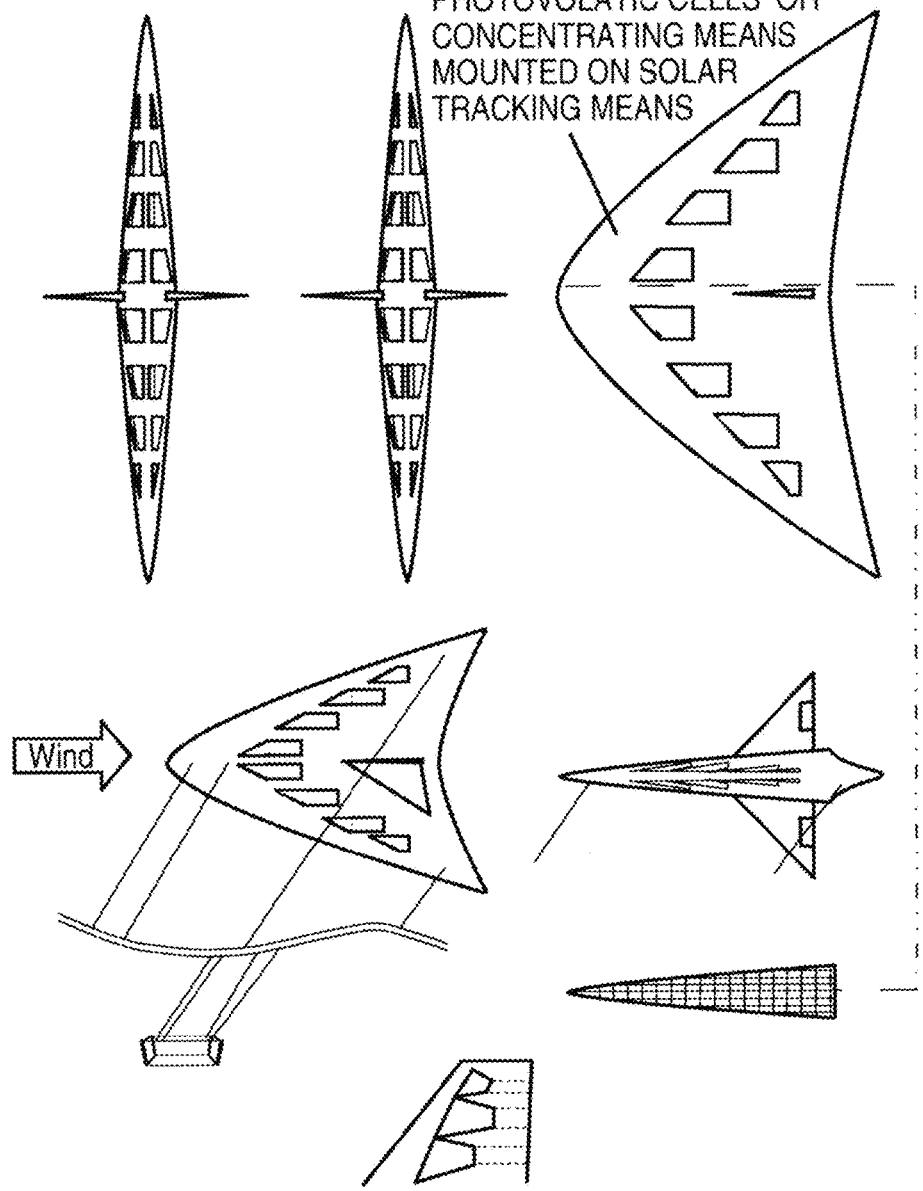
Figure 8C:
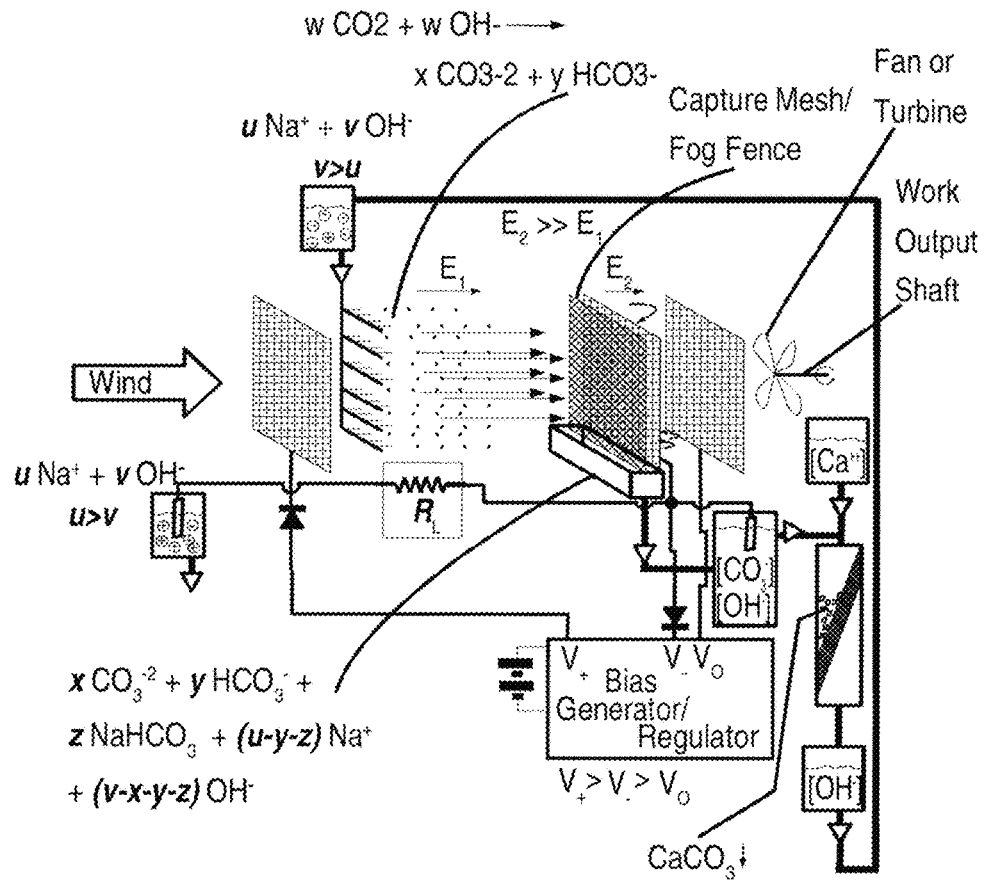
Figure 8C:
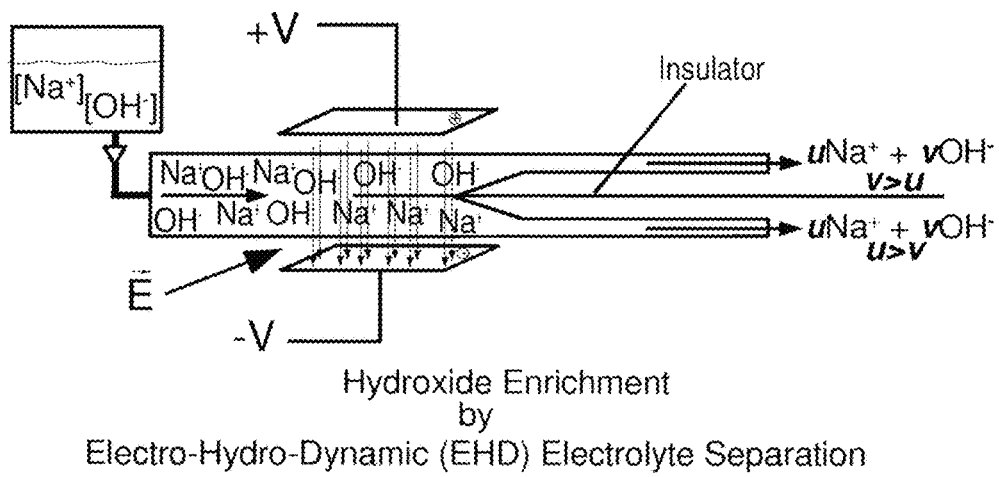

The wind energy conversion subsystem adapted for concurrent $CO_2$ capture illustrated in FIGS. 8B-C is fabricated featuring skin which may comprise one or more of diamondoid, graphene, graphite, TiC, ScN, VN, β-SiC, polyketides, polyenes, polyphenylene, TaC, HfC, $Hf_xTa_yC$, aluminum, or steel. The subsystem preferably comprises one or more evacuated (or at least enclosing a reduced pressure and/or density gas), cellular, membrane-bounded structure, with interpenetrateing channels or interstices exposed to atmospheric pressure for providing buoyancy and serving as lofting means or lighter-than air structures, said membrane preferably being supported by an internal skeleton or structural framework to prevent collapse against atmospheric pressure, said membrane being of diamondoid, TiC, ScN, VN, β-SiC, or most preferably graphenoid material, and said internal skeleton or structural framework being of MgO, W, TiC, ScN, VN, β-SiC, diamond, diamondoid, graphene, graphite, carbon nanotubes, polyketides, polyenes, polyphenylene, TaC, HfC, $Hf_xTa_yC$, aluminum, steel, of sufficient thickness to support said membrane across areas exposed to atmospheric pressure. In a preferred example, said cellular structure comprises linear rods composed of edge-sharing regular tetrahedra. (where shared edges balance stresses on edge framework structures, said tetrahedra having membranes or skins of graphene enclosing evacuated volumes, said tetrahedra having sides preferably less than 1 cm in length and most preferably under 1 mm in length, said framework structure having maximum thickness less than 1 mm 0.2 mm or more preferably under 0.1 mm, with rods comprising 100, 1000 or 10000 or more of these, said subsystems comprising a plurality of such rods. Preferably, graphene skins comprise fewer than 10 graphene layers, more preferably consist of 2 or 1 graphene layers. Note that the foregoing both minimizes material usage, imparts fault tolerance against defects or puncture, and minimizes mass required for displacement of atmosphere.

Accordingly, methods, means, devices, systems and supersystems for solving two or more global problems, converting materials, converting energy, producing structures heretofore difficult or impossible to produce, all with unprecedented facility, scales and economies, are enabled.

Figure 10A:
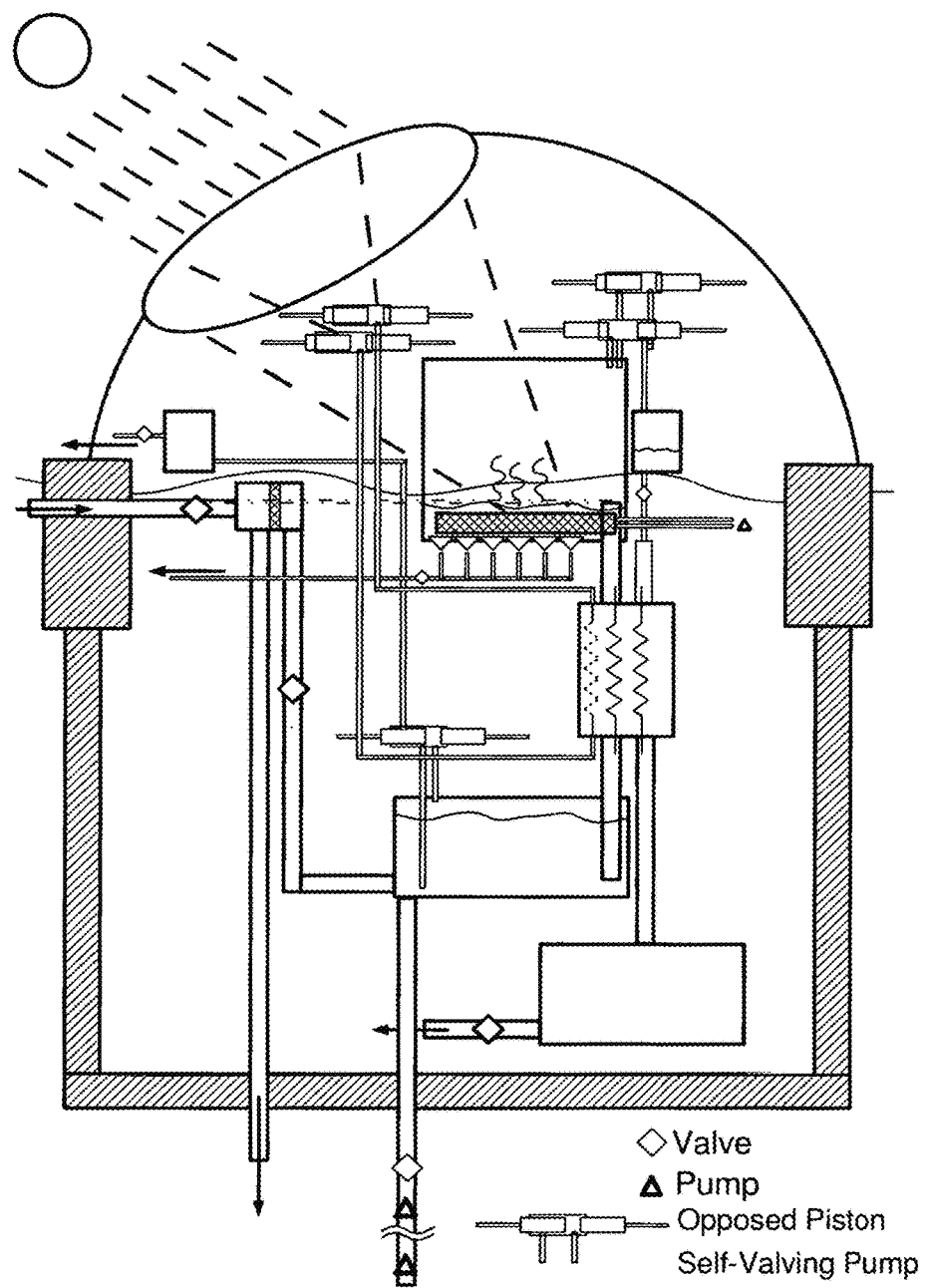
FIG. 10A depicts a system which may be fabricated and assembled according to the present invention, said system for capturing, concentrating and converting solar energy via a heat engine, distilling seawater to potable or otherwise useful form and also recovering solutes from seawater, distillation optionally availing vapor compression driven by said heat engine powered by solar energy, obtaining dissolved gases from seawater, said system situated in a floating vessel. Concentrating means may be situated on solar tracking means.
Figure 10E:
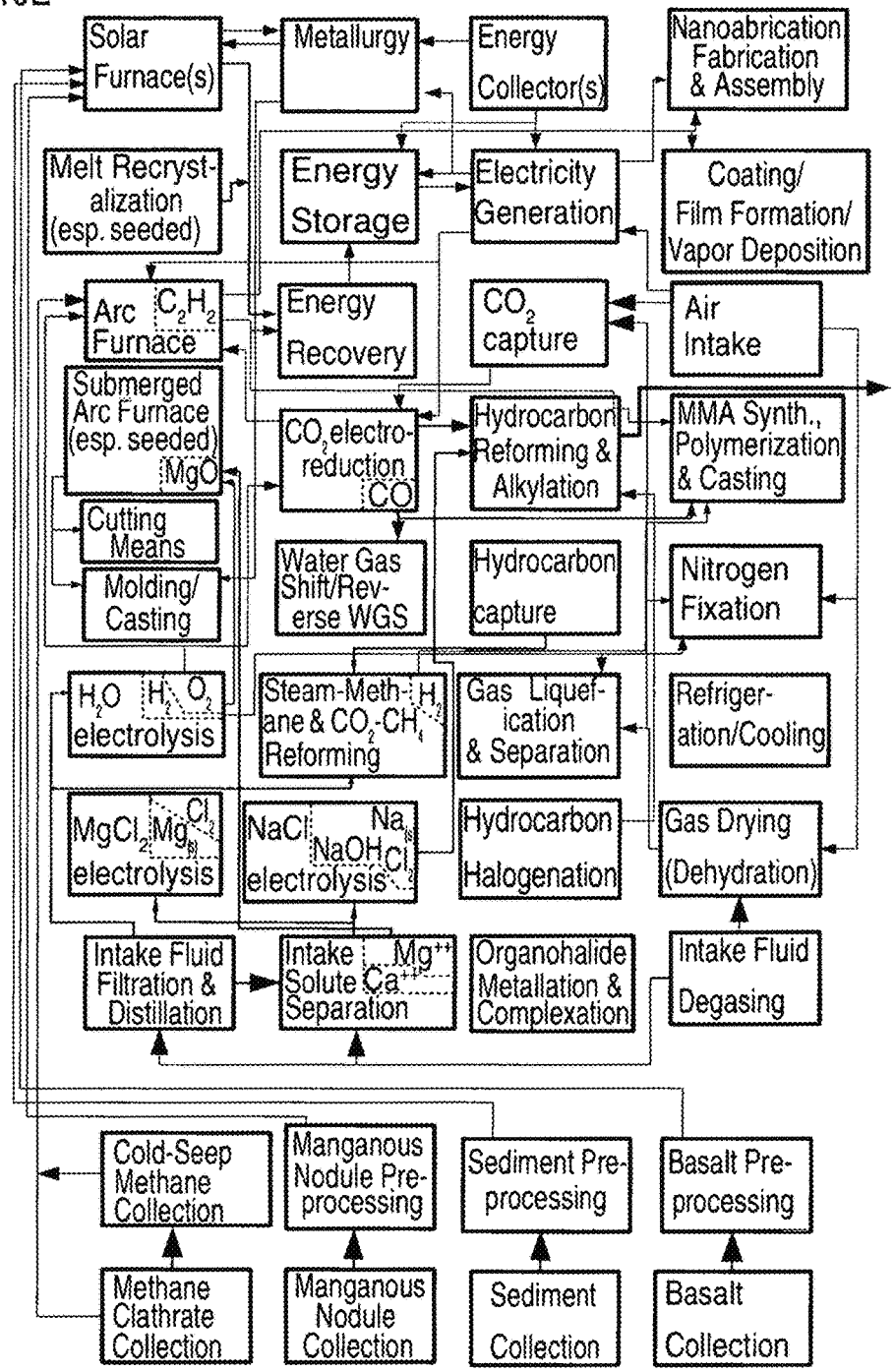
FIG. 10E depicts a functional block diagram of a system for capturing and converting energy, processing various forms of matter from ambient or environmental sources including abundant materials such as salts from seawater including magnesium, including basalts and manganese nodules or polymetallic nodules, conversion of $CO_2$ to organic feedstocks, capture of methane and other hydrocarbons for lake or ocean seeps or from clathrates, purification of water, and for performing various fabrication and assembly operations on matter collected or processed, including both bulk fabrication and assembly operations and nano-structure fabrication and assembly operations. Advantages attained with this class of system include flexibility of material source and generality of capability, and enhanced utilization of energy and prevention of waste by maximizing the utilization of by-products in other operations of the system. Note that most modules only require relatively simple structural means such as vessels, pistons and chambers which may also serve as pumps or valves, conduits which may also house filtration media or catalyst beds or form counterflow heat exchangers, and simple electrical and thermal devices.
Figure 10F:
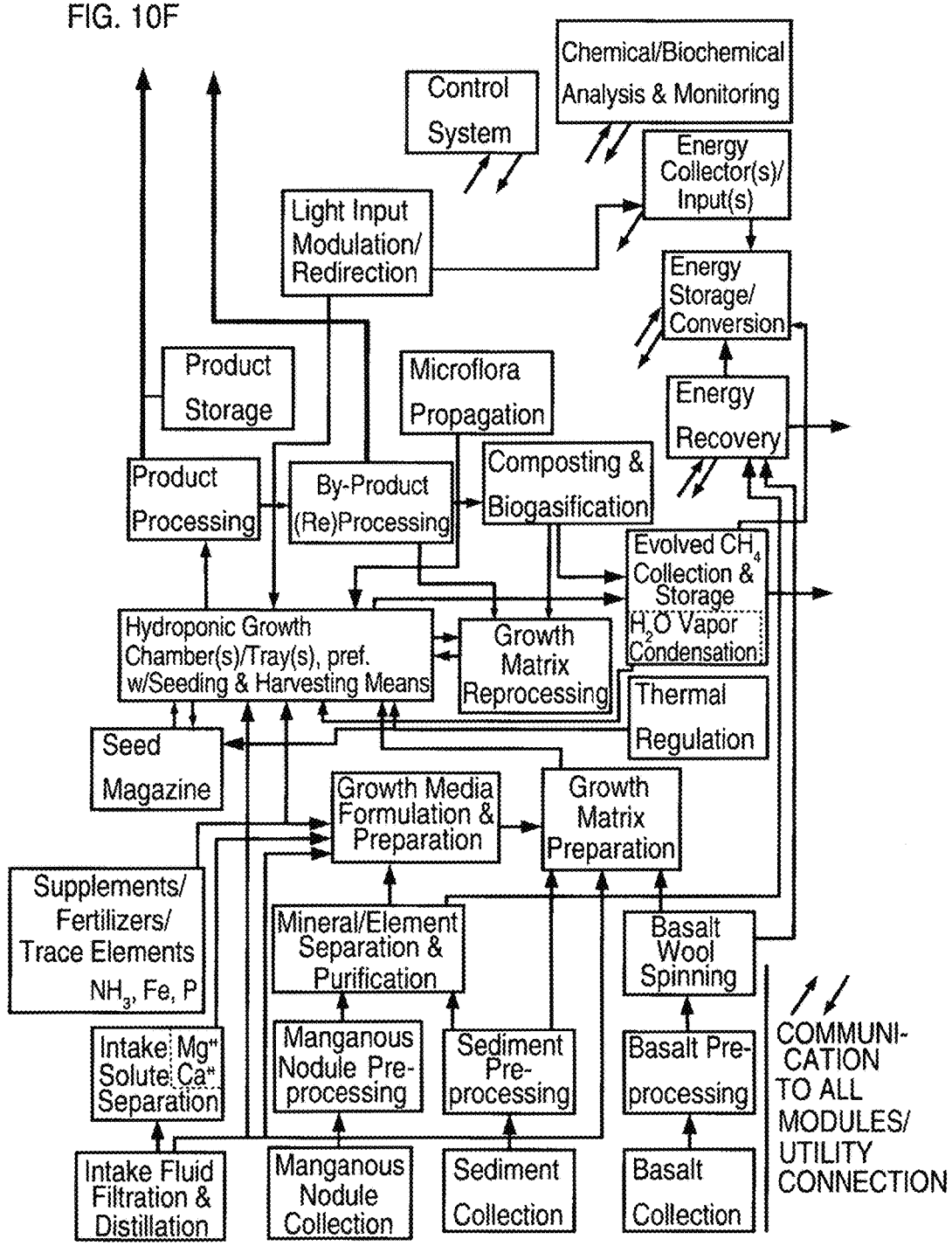
FIG. 10F shows a functional block diagram of a system adapted for hydroponic growth of crops including food crops, for processing inputs to same from abundant sources and for processing products and by-products of grown plant material. Such a system may be combined with flotation means as in FIG. 10C-D whereby crops may be grown over the surface area of the ocean, particularly by means fabricated by self-reproducing systems such as of the present invention, with concurrent exploitation of and wave energy and also wind as in FIG. 8 especially with concurrent $CO_2$ capture and conversion and also optionally solar energy over the same area (especially with crops which grow well in shaded or partially shaded conditions.) As products of self-reproducing systems, which may be scaled exponentially in number and/or size, large areas (from hectares to square kilometers to millions of square kilometers) may be utilized efficiently and at substantially reduced costs, particularly due to the emphasis in the present invention of processing of a wide variety of readily avail-able material resources for the construction of such systems. Doubling times for area utilized may be short, such that extensive systems covering over 1% of the surface area of the Earth may be deployed in under five years, conservatively estimated (calculation not shown.)

Subsets of the various fabrication methods and means of the present invention may be used to fabricate and assemble any devices or systems of prior art or of future development, in most instances improving same through improved precision, improved materials, improved efficiency, reduced defects, reduced effort and reduced cost. Among these are devices and systems useful especially as subsystems of systems of the present invention for the processing of raw materials and pollutants and the conversion and storage of energy. A trivial example is use of MgO bodies featuring conduits for circulating heat transfer fluid therethrough as thermal energy storage means. Other examples are the teaching of U.S. Pat. Nos. 2,594,998, 3,080,583 (Submarisle [Undersea Island]), U.S. Pat. No. 3,863,455 (Floatable Breakwater), U.S. Pat. No. 4,136,994 (Floating Breakwater), U.S. Pat. Nos. 5,124,012, 5,814,224, 6,372,017, 2,954, 333, 4,115,218, 3,055,821, 4,176,023, 6,372,017, 5,108,972, 4,678,761, 6,767,530, 3,902,329, 3,938,924, 2,632,206, 2,750,631, 3,793,927 2,177,557, 6,790,317, PP06169, 5,031,359, 4,327,239, 4,388,280, 5,500,149, 5,431,855, 5,346,679, 4,847,231, 7,062,913, US Patent Application Publication No. 20080086946, European Patent EP0297076, International Patent Application WO01/055049, [Moh05], [She98] and [Pen03], and references in the foregoing, are incorporated herein by reference, useful as subsystems of the classes of systems of the present invention depicted in FIGS. 10A, E-G and methods for the operation thereof.

REFERENCES

[Afz04] Afzali-Ardakani, A.; Kagan, C. R.; Murray, C. B.; Sep. 23, 2004; filed Mar. 21, 2003. "Solution processed pentacene-acceptor heterojunctions in diodes, photodiodes, and photovoltaic cells and methods of making same," U.S. Patent Application Publication No. US 2004/0183070 A1

[Afz06] Afzali-Ardakani, A.; Kagan, C. R.; Murray, C. B.; Feb. 16, 2006; filed Oct. 22, 2004. "Solution processed pentacene-acceptor heterojunctions in diodes, photodiodes, and photovoltaic cells and methods of making same," U.S. Patent Application Publication No. US 2006/0032530 A1

[Bha05] Bhadeshia, H. K. D. H.; 2005. "Large Chunks of Very Strong Steel," *Mat. Sci. & Tech.* 21:1293. Also ref. 11 therein.

[Cli63] Clifford, A. A.; Waters, W. A.; 1963. *Journal of the Chemical Society* (London) 1963:3056-3062.

[Col97] (a.) Collins, C. M.; 1997. "Self reproducing fundamental fabricating machines (F-Units)," U.S. Pat. No. 5,659,477. (b.) Collins, C. M.; 1997. "Self reproducing fundamental fabricating machine system," U.S. Pat. No. 5,764,518.

[Fei72] Feillolay, A.; Eucas, M.; 1972. "The Solubility of Helium and Methane in Aqueous Tetrabutylammonium Solutions at 25° and 35°", *Journal of Physical Chemistry* 76(21):3068.

[Hua04] Huang, H. G.; Lu, X.; Xiang, C. L.; Teo, T. L.; Lai, Y. H.; Xu, G. Q.; 2004. *Chem. Phys. Lett.* 398:11; see also reference 9 therein.

[Lu04] Lu, X.; Zhu, M.; Wang, X.; Zhang Q.; 2004. *J. Phys. Chem. B* 108:4478.

[Lyd98] J. W. Lyding; et al.; 1998. *Applied Surface Science* 130-132:221-230.

[Moo56] Moore, J. H., M.; 1956. "Artificial Living Plants," *Scientific American,* 195:118.

[Mos01] Moses, M.; 2001. "A PHYSICAL PROTOTYPE OF A SELF-REPLICATING UNIVERSAL CONSTRUCTOR," Thesis, University of New Mexico. http://home.earthlink.net/~mmoses152/SelfRep.doc

[Mer97] Merkle, R. C.; 1997. "Convergent assembly." *Nanotechnology* 8:18-22. http://www.zyvex.com/nanotech/convergent.html

[Mer97b] Merkle, R. C.; 1997. "A proposed 'metabolism' for a hydrocarbon assembler." *Nanotechnology* 8:149-162.

[Mer03] Merkle, R. C.; Parker, E. G.; Skidmore, G. D.; 2003. U.S. Pat. No. 6,510,359, filed 11 May 2000.

[Moh05] Moheimani, N. R.; 2005. "THE CULTURE OF COCCOLITHOPHORID ALGAE FOR CARBOND DIOXIDE BIOREMEDIATION," Thesis presented for the degree of Doctor of Philosophy of Murdoch University.

[Pen03] Peng, Zhiyong; 2003. "A NOVEL HYDROGEN AND OXYGEN GENERATION SYSTEM." Thesis Submitted to the Graduate Faculty of the Louisiana State University and Agricultural and Mechanical College In partial fulfillment of the requirements for the degree of Master of Science in Chemical Engineering.

[Rab97] Rabani, E. M.; 1997. WO 97/006468.

[Rab07] Rabani, E. M.; 2007. Provisional U.S. Patent Application Ser. No. 60/901,966, filed 18 Feb. 2007

[Rab08] Rabani, E. M.; 2008. U.S. patent application Ser. No. 12/070,489, filed 18 Feb. 2008

[She98] Sheehan, J. et al.; 1998. "A Look Back at the U.S. Department of Energy's Aquatic Species Program—Biodiesel from Algae. Close-Out Report." NREL/TP-580-24190.

[Sto06] Stolaroff, Joshuah K.; 2006. "Capturing $CO_2$ from ambient air: a feasibility assessment" Thesis In Partial Fulfillment of the Requirements for the Degree of Doctor of Philosophy, Carnegie Mellon University (Defended Aug. 17, 2006.)

All citations, and teachings therein, are incorporated herein by reference, particularly teachings disclosed therein necessary or useful for forming precursors or intermediates used in the present invention and associated techniques therefor. Specific embodiments and examples detailed are described for illustration rather than limitation. The appended claims will be understood to comprehend any equivalents, including those not presently known in the relevant arts where these may be operatively substituted. The present invention is limited only by the breadth of the appended claims.

Whereforth, I claim:

1. A system or subsystem for fabricating articles of two or more different materials including systems or subsystems for fabricating articles of said two or more different materials, for removing at least one molecular or ionic raw material from the environment, and for utilizing said molecular or ionic raw material as a feedstock for fabrication of at least one of said different materials, said system or subsystem comprising:

means for converting energy selected from the group consisting of: a Marks generator; a turbine; a wave generator comprising a turbine; a wave generator comprising a cylinder and a piston; a wave generator comprising a cylinder and a valve; and, solar energy conversion means comprising a reflector or a lens or a photovoltaic device or a heliostat;

means for removing a molecular or ionic raw material from the environment is selected from the group consisting of: a cable, an umbilical, a conveyor belt, a conveyor chain, and, a conduit through which a gas or liquid stream is flowed;

a first molecular binding tool for binding one molecule of said molecular or ionic raw material removed from the environment;

a second molecular tool or a second molecular binding tool for binding a single reagent molecule or a single reactant molecule or intermediate; and, means for contacting said one molecule of said molecular or ionic raw material removed from the environment bound to said first molecular binding tool to said second molecular tool or said single reagent molecule or a single reactant molecule or intermediate bound to a said second molecular binding tool, wherein:

said means for contacting is selected from the group consisting of: actuators and nanopositioning means;

said first molecular binding tool and said second molecular tool or a second molecular binding tool for binding a single reagent molecule or a single reactant molecule or intermediate A are in communication with said means for contacting;

wherein said first molecular binding tool comprises at least a ligand skeleton, and said first molecular binding tool and said second molecular tool or said second molecular binding tool for binding a single reagent molecule or a single reactant molecule or intermediate are situated on one or more structural members of said system or subsystem; and, wherein said molecular or ionic raw material is at least one raw material selected from the group consisting of: seawater or material dissolved therein; atmospheric carbon dioxide; carbonate from seawater; carbon dioxide dissolved in seawater; methane from a cold seep; methane from oceanic methane clathrates; methane from permafrost; $CH_4$, $CO_2$, carbonates, silicates, hydrocarbons, ammonium halides, sulfides, selenides, tellurides, metal ions, transition metal ions, lanthanide ions, and actinide ions, metal hydroxides, ions found in evaporite, sand, manganous nodules and polymetallic nodules.

2. A system or subsystem according to claim 1 wherein said two or more different materials comprise:
graphene and at least one halite material;
diamondoid and graphenoid materials;
diamondoid and β-Silicon-Carbide materials;
β-Silicon-Carbide and graphenoid materials;
β-Silicon-Carbide and at least one halite materials;
or,
diamondoid and at least one halite materials.

3. A system or subsystem according to claim 1, further comprising recorded instructions for and instruction execution means for fabricating and assembling a desired product in a process utilizing said feedstock.

4. A system or subsystem according to claim 1 further comprising the use of a second raw material wherein said second raw material is at least one raw material selected from the group consisting of: seawater or material dissolved therein; sand; basalt; manganese nodules or polymetallic nodules; carbon dioxide; rock; methane; naturally occurring hydrocarbons; molecular hydrogen; and, inert gases.

5. A system or subsystem according to claim 1 wherein at least one of said two or more different materials comprise at least one material selected from the group consisting of: MgO, MgS, W, TiC, TiN, ScN, VN, β-SiC, diamond, graphene, carbon nanotubes, polyketides, polyenes, polyphenylene, TaC, HfC, ZrC, and tantalum hafnium carbides.

6. A system or subsystem for fabricating articles of two or more different materials Including systems or subsystems for fabricating articles of said two or more different materials, for removing at least one of $CH_4$, $CO_2$ or carbonate from the environment, and for utilizing at least one of $CH_4$, $CO_2$ or carbonate as a feedstock for fabrication of at least one of said different materials, said system or subsystem comprising:

means for removing at least one of $CH_4$, $CO_2$ or carbonate from the environment, comprising an intake through which a fluid stream is flowed;

a first molecular binding tool for binding one molecule of said $CH_4$, $CO_2$ or carbonate removed from the environment;

a second molecular tool or a second molecular binding tool for binding a single reagent molecule or a single reactant molecule or intermediate; and, means for contacting said one molecule of said $CH_4$, $CO_2$ or carbonate removed from the environment bound to said first molecular binding tool to said second molecular tool or said single reagent molecule or a single reactant molecule or intermediate bound to a said second molecular binding tool, wherein:

said means for contacting is selected from the group consisting of: actuators and nanopositioning means;

said first molecular binding tool and said second molecular tool or a second molecular binding tool for binding a single reagent molecule or a single reactant molecule or intermediate are in communication with said means for contacting; and, wherein said first molecular binding tool comprises at least a ligand skeleton, and said first molecular binding tool and said second molecular tool or said second molecular binding tool for binding a single reagent molecule or a single reactant molecule or intermediate are situated on one or more structural members of said system or subsystem.

7. A system or subsystem according to claim 6 featuring an intake situated at least 200 meters above ground level.

8. A system or subsystem according to claim 6 comprising a lofted structure.

9. A system or subsystem according to claim 6 comprising a lofted structure featuring an evacuated volume for reducing the density of said lofted structure.

10. A system or subsystem according to claim 9 wherein said evacuated volume for reducing the density of said lofted structure is bounded by a skin or membrane supported by an internal structural framework, and at least one of said skin or membrane or said internal structural framework comprises at least one material selected from the group consisting of: MgO, W, TiC, ScN, VN, β-SiC, diamond, diamondoid, graphene, graphite, carbon nanotubes, polyketides, polyenes, polyphenylene, TaC, HfC, tantalum hafnium carbides, aluminum, and, steel.

11. A system or subsystem according to claim 1 wherein said first molecular binding tool comprises two ligand skeletons each binding a metal and the two metal centers spaced between about 300 and 600 picometers apart with an accessible void therebetween for binding a $CO_2$ molecule.

12. A system or subsystem according to claim 1 wherein said first molecular binding tool or said second molecular tool comprises: a Lewis acid, a thiolate base tool, an ethoxide base tool, a selenide base tool, or a telluride base tool.

13. A system or subsystem according to claim 1 wherein said first molecular binding tool or said second molecular tool chemically activates said one molecule for undergoing a desired reaction.

14. A system or subsystem according to claim 1, wherein a product produced comprising atoms from a said molecular or ionic raw material is contacted as a first said intermediate with a second product produced comprising atoms from a said molecular or ionic raw material as a second intermediate, and said first and said second intermediate are each bound to a binding tool which at least comprises a ligand skeleton.

15. A system or subsystem according to claim 1 wherein said first molecular binding tool or said second molecular tool comprises a metal ion, transition metal ion, lanthanide ion, or an actinide ion.

16. A system or subsystem according to claim 14 wherein said first molecular binding tool or said second molecular tool comprises an atom or ion selected from the group consisting of: Zn, Mg, Al, Sc, V, Co, Cr, Fe, Mn, Ti, Zr, Nb, W, Si, Cu, Ag, Cd, Sc, Li, Hc, Y, Yb, Ge, Sn, Pb, Ni, and B.

17. A system or subsystem according to claim 1 wherein said molecular or ionic raw material is selected from the group consisting of: $CH_4$, $CO_2$, carbonates, silicates, hydrocarbons, ammonium halides, sulfides, selenides, tellurides, metal ions, transition metal ions, lanthanide ions, and actinide ions, metal hydroxides, ions found in evaporite, sand, manganous nodules and polymetallic nodules.

18. A system or subsystem according to claim 14 wherein:
said first said intermediate is selected from the group consisting of: a conjugated polyene, a conjugated polycarbosilene, a conjugated polyene comprising an atomic substitution, a conjugated polycarbosilene comprising an atomic substitution, a conjugated polyene comprising a ligand atom or ligand skeleton substituent, and 4-methyl-Catechol; and,
said second intermediate is selected from the group consisting of: a diamond nanostructure, a β-SiC nanostructure, and a graphenoid nanostructure.

19. A system or subsystem according to claim 14 wherein said first said intermediate and said second intermediate are selected from the group consisting of: diamond nanostructures, β-SiC nanostructures, graphene nanostructure, poly[n]acenes, branched poly[n]acenes, poly-p-phenylenes, and branched poly-p-phenylenes.

20. A system or subsystem according to claim 6 wherein said first molecular binding tool chemically activates said one molecule of said $CH_4$, $CO_2$ or carbonate for undergoing a desired reaction.

21. A system or subsystem according to claim 6 further comprising means for converting energy selected from the group consisting of: a Marks generator; a turbine; a wave generator comprising a turbine; a wave generator comprising a cylinder and a piston; a wave generator comprising a cylinder and a valve; and, solar energy conversion means comprising a reflector or a lens or a photovoltaic device or a heliostat.

22. A system or subsystem according to claim 6 wherein said means for removing $CH_4$ or $CO_2$ or carbonate from the environment comprises aerosolized droplets of solutions selected from the group consisting of: hydroxide solutions, amine solutions, tetrabutylammonium solutions, calcium hydroxide solutions, and ammonium solutions.

23. A process for fabricating articles of two or more different materials including systems or subsystems for fabricating articles of said two or more different materials, for removing at least one of $CH_4$, $CO_2$ or carbonate from the environment, and for utilizing at least one of $CH_4$, $CO_2$ or carbonate as a feedstock for fabrication of at least one of said different materials, comprising:
removing at least one of $CH_4$, $CO_2$, or carbonate from the environment with an intake through which a fluid stream is flowed;
binding one molecule of said $CH_4$, $CO_2$, or carbonate removed from the environment with a first molecular binding tool;
providing a second molecular tool or a second molecular binding tool for binding a single reagent molecule or a single reactant molecule or intermediate; and,
contacting said one molecule of said $CH_4$, $CO_2$, or carbonate removed from the environment bound to said first molecular binding tool with said second molecular tool or with said single reagent molecule or with said single reactant molecule or said intermediate bound to said second molecular binding tool, wherein said contacting is performed with actuators or nanopositioning means;
wherein said first molecular binding tool comprises at least a ligand skeleton, and said first molecular binding tool and said second molecular tool or said second molecular binding tool for binding a single reagent molecule or a single reactant molecule or intermediate are situated on one or more structural members of a system or subsystem for fabricating articles or two or more different materials.

24. A process according to claim 23 further comprising the steps of:
providing a first system or subsystem for fabricating articles of two or more different materials including systems or subsystems for fabricating articles of said two or more different materials, for removing at least one molecular or ionic raw material from the environment, and for utilizing said molecular or ionic raw material as a feedstock for fabrication of at least one of said different materials;
fabricating, using said first system or subsystem, at least a second product system or subsystem for fabricating articles of two or more different materials;
providing, to said second product system or subsystem, instructions for the fabrication of one or more product articles; and,
using said second product system or subsystem to fabricate product articles of two or more different materials.

25. A process for fabricating articles of two or more different materials including systems or subsystems for fabricating articles of said two or more different materials, for removing at least one molecular or ionic raw material from the environment, and for utilizing said molecular or ionic raw material as a feedstock for fabrication of at least one of said different materials, said process comprising:
converting energy using a means for converting energy selected from the group consisting of: a Marks generator; a turbine; a wave generator comprising a turbine; a wave generator comprising a cylinder and a piston; a wave generator comprising a cylinder and a valve; and, solar conversion energy means comprising a reflector or a lens or a photovoltaic device or a heliostat;

removing a molecular or ionic raw material from the environment using a means for conveying said molecular or ionic raw material selected from the group consisting of: a cable, an umbilical, a conveyor belt, a conveyor chain, and, a conduit through which a gas or liquid stream is flowed;

binding one molecule of said molecular or ionic raw material removed from the environment with a first molecular binding tool;

providing a second molecular tool or a second molecular binding tool for binding a single reagent molecule or a single reactant molecule or intermediate; and, contacting said one molecule of said molecular or ionic raw material removed from the environment bound to said first molecular binding tool to said second molecular tool or said single reagent molecule or single reactant molecule or intermediate bound to said second molecular binding tool, wherein said contacting is performed with actuators or nanopositioning means, wherein:

said first molecular binding tool comprises at least a ligand skeleton, and said first molecular binding tool and said second molecular tool or said second molecular binding tool for binding a single reagent molecule or a single reactant molecule or intermediate are situated on one or more structural members of a system or subsystem for fabricating articles of two or more different materials; and, wherein said molecular or ionic raw material is at least one raw material selected from the group consisting of: seawater or material dissolved therein; atmospheric carbon dioxide; carbonate from seawater; carbon dioxide dissolved in seawater; methane from a cold seep; methane from oceanic methane clathrates; methane from permafrost; $CH_4$, $CO_2$, carbonates silicates, hydrocarbons, ammonium halides, sulfides, selenides, tellurides, metal ions, transition metal ions, lanthanide ions, and actinide ions, metal hydroxides, ions found in evaporite, sand, manganous nodules and polymetallic nodules.

26. A process according to claim 25 further comprising the steps of: providing a first system or subsystem for fabricating articles of two or more different materials including systems or subsystems for fabricating articles of said two or more different materials, for removing at least one molecular or ionic raw material from the environment, and for utilizing said molecular or ionic raw material as a feedstock for fabrication of at least one of said different materials;

fabricating, using said first system or subsystem, at least a second product system or subsystem for fabricating articles of two or more different materials;

providing, to said second product system or subsystem, instructions for the fabrication of one or more product articles; and, using said second product system or subsystem to fabricate product articles of two or more different materials.

27. A system or subsystem according to claim 1 further comprising:

flotation means comprising inverted open chambers with pistons trapping air or other gases above the water level, and;

a subsystem selected from the group consisting of: a subsystem for the distillation of water; a subsystem for the cultivation of algae; and a subsystem for mariculture.

* * * * *